US011791711B2

(12) United States Patent
Dent

(10) Patent No.: US 11,791,711 B2
(45) Date of Patent: Oct. 17, 2023

(54) SAFETY SHUT-DOWN SYSTEM FOR A SOLAR ENERGY INSTALLATION

(71) Applicant: Koolbridge Solar, Inc, Wrightsville Beach, NC (US)

(72) Inventor: Paul Wilkinson Dent, Pittsboro, NC (US)

(73) Assignee: Koolbridge Solar, Inc., Wrightsville Beach, NC (US)

( * ) Notice: Subject to any disclaimer, the term of this patent is extended or adjusted under 35 U.S.C. 154(b) by 494 days.

(21) Appl. No.: 16/559,326

(22) Filed: Sep. 3, 2019

(65) Prior Publication Data

US 2020/0059166 A1    Feb. 20, 2020

Related U.S. Application Data

(63) Continuation of application No. 16/233,556, filed on Dec. 27, 2018, now Pat. No. 10,666,161, which is a
(Continued)

(51) Int. Cl.
*H02M 1/32*    (2007.01)
*H02M 7/537*    (2006.01)
(Continued)

(52) U.S. Cl.
CPC ............... *H02M 1/32* (2013.01); *H02J 3/00* (2013.01); *H02J 3/007* (2020.01); *H02J 3/38* (2013.01);
(Continued)

(58) Field of Classification Search
CPC .......... H02M 7/537; H02M 1/32; H02M 1/36; H02M 7/53871; H02J 3/005; H02J 3/383;
(Continued)

(56) References Cited

U.S. PATENT DOCUMENTS 3,340,457 A    9/1967  Schmitz
3,805,141 A    4/1974  Pompa, Jr. et al.
(Continued)

FOREIGN PATENT DOCUMENTS

CN    101350569 A    1/2009
CN    202444440 U    9/2012
(Continued)

OTHER PUBLICATIONS

Intersil, George E. Danz, HIP4080, 80V High Frequency H-Bridge Driver, Application Note. AN9324.4, Mar. 2003.
(Continued)

*Primary Examiner* — Carlos Amaya
(74) *Attorney, Agent, or Firm* — COATS & BENNETT, PLLC

(57) ABSTRACT

A DC to AC converter system for solar energy installations reduces cost by eliminating low-frequency power transformers. One DC input polarity is selectively switched to an output terminal when the instantaneous AC output from a second output terminal is desired to be of the opposite polarity, while the other DC input polarity is used to form an approximation to a segment of a sine wave of the desired polarity at the second output terminal. Switching transistors in H-bridge circuits, with a reservoir capacitor across each H-bridge circuit, may be equivalently configured into a first and second bank of series-connected transistors connected across the DC source, with the reservoir capacitors connected in a nested fashion. The DC to AC converter approximates a sine wave by summing integer multiples of a voltage step size at different times, or may output a desired voltage value by jittering between higher and lower voltage values.

17 Claims, 35 Drawing Sheets

Related U.S. Application Data continuation of application No. 14/749,339, filed on Jun. 24, 2015, now Pat. No. 10,205,324, which is a continuation of application No. 14/062,884, filed on Oct. 24, 2013, now Pat. No. 9,735,703, which is a continuation of application No. 13/103,070, filed on May 8, 2011, now Pat. No. 8,937,822.

(51) Int. Cl.
| | |
|---|---|
| *H02M 1/36* | (2007.01) |
| *H02M 7/5387* | (2007.01) |
| *H02J 3/00* | (2006.01) |
| *H02J 3/38* | (2006.01) |
| *H02J 7/00* | (2006.01) |
| *H02J 7/35* | (2006.01) |
| *H02J 9/06* | (2006.01) |
| *H02H 3/16* | (2006.01) |

(52) U.S. Cl.
CPC ............ *H02J 3/388* (2020.01); *H02J 7/0068* (2013.01); *H02J 7/35* (2013.01); *H02J 9/061* (2013.01); *H02M 1/36* (2013.01); *H02M 7/537* (2013.01); *H02M 7/53871* (2013.01); *H02H 3/16* (2013.01); *H02J 2300/00* (2020.01); *H02J 2300/22* (2020.01); *Y02A 30/00* (2018.01); *Y02B 10/10* (2013.01); *Y02E 10/56* (2013.01)

(58) Field of Classification Search
CPC .. H02J 7/0068; H02J 3/007; H02J 3/00; H02J 3/38; H02J 7/35; H02J 9/061; H02J 2300/00; H02J 2300/22; Y02A 30/00; Y02B 10/10; H02H 3/16; Y02E 10/56
See application file for complete search history.

(56) References Cited

U.S. PATENT DOCUMENTS

| | | | |
|---|---|---|---|
| 3,891,211 A | 6/1975 | Diefenbach | |
| 3,958,174 A | 5/1976 | Studtmann et al. | |
| 4,084,220 A | 4/1978 | Akamatsu | |
| 4,180,853 A | 12/1979 | Scorso, Jr. et al. | |
| 4,204,268 A | 5/1980 | Vivirito | |
| 4,320,449 A | 3/1982 | Carroll | |
| 4,803,611 A | 2/1989 | Sashida et al. | |
| 4,882,120 A | 11/1989 | Roe et al. | |
| 5,029,064 A | 7/1991 | Ball | |
| 5,168,439 A | 12/1992 | Kumar et al. | |
| 5,226,077 A | 7/1993 | Lynn et al. | |
| 5,270,636 A | 12/1993 | Lafferty | |
| 5,285,372 A | 2/1994 | Huynh et al. | |
| 5,373,433 A | 12/1994 | Thomas | |
| 5,400,237 A | 3/1995 | Flanagan et al. | |
| 5,424,894 A | 6/1995 | Briscall et al. | |
| 5,479,086 A | 12/1995 | Konstanzer | |
| 5,499,178 A | 3/1996 | Mohan | |
| 5,625,276 A | 4/1997 | Scott et al. | |
| 5,680,302 A | 10/1997 | Iwata et al. | |
| 5,714,869 A | 2/1998 | Yamechika et al. | |
| 5,726,505 A | 3/1998 | Yamada et al. | |
| 5,757,633 A | 5/1998 | Bowles | |
| 5,898,585 A | 4/1999 | Sirichote et al. | |
| 5,930,128 A | 7/1999 | Dent | |
| 5,991,645 A | 11/1999 | Yuen et al. | |
| 6,005,788 A | 12/1999 | Lipo et al. | |
| 6,051,954 A | 4/2000 | Nagao et al. | |
| 6,112,158 A | 8/2000 | Bond et al. | |
| 6,154,379 A | 11/2000 | Okita | |
| 6,545,885 B2 | 4/2003 | Nishimura et al. | |
| 6,545,887 B2 | 4/2003 | Smedley et al. | |
| 6,750,391 B2 | 6/2004 | Bower et al. | |
| 6,927,955 B2 | 8/2005 | Suzui et al. | |
| 6,930,897 B2 | 8/2005 | Jungreis et al. | |
| 7,046,534 B2 | 5/2006 | Schmidt et al. | |
| 7,057,485 B2 | 6/2006 | Preusse et al. | |
| 7,082,040 B2 | 7/2006 | Raddi et al. | |
| 7,088,601 B2 | 8/2006 | Tracy | |
| 7,138,730 B2 | 11/2006 | Lai | |
| 7,164,263 B2 | 1/2007 | Yakymyshyn et al. | |
| 7,339,287 B2 | 3/2008 | Jepsen et al. | |
| 7,411,802 B2 | 8/2008 | Victor et al. | |
| 7,474,016 B2 | 1/2009 | Wang et al. | |
| 7,576,449 B2 | 8/2009 | Becker et al. | |
| 7,616,467 B2 | 11/2009 | Mallwitz | |
| 7,710,752 B2 | 5/2010 | West | |
| 7,817,450 B2 | 10/2010 | Fornage | |
| 7,843,714 B2 | 11/2010 | Bremicker et al. | |
| 7,957,168 B2 | 6/2011 | Zacharias et al. | |
| 8,023,288 B2 | 9/2011 | Engel et al. | |
| 8,184,460 B2 | 5/2012 | O'Brien et al. | |
| 8,278,892 B2 | 10/2012 | Friebe et al. | |
| 8,441,820 B2 | 5/2013 | Shen et al. | |
| 8,456,865 B1 | 6/2013 | Bianchi et al. | |
| 8,482,155 B2 | 7/2013 | Choi et al. | |
| 8,576,591 B2 | 11/2013 | Phadke | |
| 8,582,331 B2 | 11/2013 | Frisch et al. | |
| 8,736,102 B1 | 5/2014 | Gao et al. | |
| 8,736,111 B2 | 5/2014 | Song et al. | |
| 8,837,178 B2 | 9/2014 | Fornage | |
| 8,937,822 B2 | 1/2015 | Dent | |
| 8,963,372 B2 | 2/2015 | Takano et al. | |
| 8,963,512 B2 | 2/2015 | Takano | |
| 9,048,740 B2 | 6/2015 | Gray et al. | |
| 9,093,922 B2 | 7/2015 | Ceu | |
| 9,172,296 B2 | 10/2015 | Seymour et al. | |
| 9,263,183 B2 | 2/2016 | Chapman et al. | |
| 9,455,645 B1 | 9/2016 | Zhou et al. | |
| 9,583,946 B2 | 2/2017 | Fornage | |
| 9,806,628 B2 | 10/2017 | Chapman et al. | |
| 10,180,695 B1 | 1/2019 | Bikulcius | |
| 10,784,710 B2 | 9/2020 | Dent | |
| 2002/0047455 A1 | 4/2002 | Dhyanchand et al. | |
| 2002/0171436 A1 | 11/2002 | Russell | |
| 2003/0094929 A1 | 5/2003 | Pendell | |
| 2003/0094931 A1 | 5/2003 | Renyolds | |
| 2003/0169548 A1 | 9/2003 | Clarey et al. | |
| 2003/0179063 A1 | 9/2003 | Preusse et al. | |
| 2004/0100149 A1 | 5/2004 | Lai | |
| 2005/0001598 A1 | 1/2005 | Belokon et al. | |
| 2005/0056021 A1 | 3/2005 | Belokon et al. | |
| 2005/0073292 A1 | 4/2005 | Hastings et al. | |
| 2005/0139259 A1 | 6/2005 | Steigerwald et al. | |
| 2005/0174813 A1 | 8/2005 | Dou et al. | |
| 2005/0180083 A1 | 8/2005 | Takahara et al. | |
| 2005/0275368 A1 | 12/2005 | Sippola et al. | |
| 2005/0275386 A1 | 12/2005 | Jepsen et al. | |
| 2006/0158037 A1 | 7/2006 | Danley et al. | |
| 2007/0047277 A1 | 3/2007 | Konishi et al. | |
| 2007/0095062 A1 | 5/2007 | Chertok | |
| 2007/0278988 A1 | 12/2007 | De et al. | |
| 2007/0292724 A1 | 12/2007 | Gilchrist | |
| 2008/0192519 A1 | 8/2008 | Iwata et al. | |
| 2008/0291706 A1 | 11/2008 | Seymour et al. | |
| 2009/0003024 A1 | 1/2009 | Knaup | |
| 2009/0073726 A1 | 3/2009 | Babcock | |
| 2009/0086520 A1 | 4/2009 | Nishimura | |
| 2009/0103340 A1* | 4/2009 | Bremicker .......... H02M 7/5387 363/123 |
| 2009/0161392 A1 | 6/2009 | Zhang et al. | |
| 2009/0184706 A1 | 7/2009 | Durie et al. | |
| 2009/0206666 A1 | 8/2009 | Sella et al. | |
| 2009/0207543 A1 | 8/2009 | Boniface et al. | |
| 2009/0244947 A1 | 10/2009 | Fornage | |
| 2009/0296434 A1 | 12/2009 | De Rooij et al. | |
| 2010/0064424 A1 | 3/2010 | Hsu et al. | |
| 2010/0071744 A1 | 3/2010 | Peurach et al. | |
| 2010/0091529 A1 | 4/2010 | Jackman et al. | |
| 2010/0133914 A1 | 6/2010 | Kang et al. | |
| 2010/0135051 A1 | 6/2010 | Mallwitz | |
| 2011/0013438 A1 | 1/2011 | Frisch et al. | |
| 2011/0019316 A1 | 1/2011 | Zhan et al. | |

(56) References Cited

U.S. PATENT DOCUMENTS

| | | |
|---|---|---|
| 2011/0037600 A1 | 2/2011 | Takehara et al. |
| 2011/0043160 A1 | 2/2011 | Serban |
| 2011/0088741 A1 | 4/2011 | Dunton et al. |
| 2011/0090607 A1 | 4/2011 | Luebke et al. |
| 2011/0096581 A1* | 4/2011 | Hallak ............... H02M 1/34 363/132 |
| 2011/0140520 A1 | 6/2011 | Lee |
| 2011/0140535 A1 | 6/2011 | Choi et al. |
| 2011/0198936 A1* | 8/2011 | Graovac ............... B60L 58/14 363/71 |
| 2011/0255316 A1 | 10/2011 | Burger et al. |
| 2011/0285354 A1 | 11/2011 | Iwasa |
| 2011/0292705 A1 | 12/2011 | Fornage |
| 2011/0301772 A1 | 12/2011 | Zuercher et al. |
| 2012/0007459 A1 | 1/2012 | Mondal et al. |
| 2012/0048325 A1 | 3/2012 | Matsuo et al. |
| 2012/0049637 A1 | 3/2012 | Teichmann et al. |
| 2012/0112557 A1 | 5/2012 | Sager |
| 2012/0113695 A1 | 5/2012 | Chivite Zabalza et al. |
| 2012/0113696 A1 | 5/2012 | Voigtlaender |
| 2012/0228938 A1 | 9/2012 | Thieringer et al. |
| 2012/0242145 A1 | 9/2012 | Espeut, Jr. |
| 2013/0057997 A1 | 3/2013 | Dent |
| 2013/0058144 A1 | 3/2013 | Hiramatsu et al. |
| 2013/0070494 A1 | 3/2013 | Rotzoll |
| 2013/0155741 A1 | 6/2013 | Takano |
| 2013/0181655 A1 | 7/2013 | Yokoyama et al. |
| 2013/0181703 A1 | 7/2013 | Ausserlechner |
| 2013/0245614 A1 | 9/2013 | Seebruch |
| 2013/0250624 A1 | 9/2013 | Fornage |
| 2013/0320929 A1 | 12/2013 | Walker et al. |
| 2013/0322136 A1 | 12/2013 | Ceu |
| 2014/0049198 A1 | 2/2014 | Ooyama et al. |
| 2014/0062206 A1 | 3/2014 | Bryson |
| 2014/0084702 A1 | 3/2014 | Chapman et al. |
| 2014/0153303 A1 | 6/2014 | Potharaju |
| 2014/0266289 A1 | 9/2014 | Della Sera et al. |
| 2015/0008748 A1 | 1/2015 | Deboy et al. |
| 2015/0043110 A1 | 2/2015 | Dent |
| 2015/0207401 A1 | 7/2015 | Zhang et al. |
| 2015/0217656 A1 | 8/2015 | Loftus et al. |
| 2015/0229131 A1 | 8/2015 | Gerhardinger |
| 2015/0295413 A1 | 10/2015 | Dent |
| 2015/0349708 A1 | 12/2015 | Moslehi |
| 2016/0036235 A1 | 2/2016 | Getsla |
| 2016/0065090 A1 | 3/2016 | Dent |
| 2016/0224083 A1 | 8/2016 | Dent et al. |
| 2016/0226560 A1 | 8/2016 | Dent |
| 2016/0261226 A1 | 9/2016 | Hamilton et al. |
| 2016/0276837 A1 | 9/2016 | Manjrekar |
| 2018/0006601 A1 | 1/2018 | Dent |
| 2018/0026550 A1 | 1/2018 | Dent |

FOREIGN PATENT DOCUMENTS

| | | |
|---|---|---|
| DE | 10221592 A1 | 12/2003 |
| DE | 102008018497 A1 | 10/2009 |
| EP | 2544354 A2 | 1/2013 |
| EP | 2698894 A2 | 2/2014 |
| EP | 2053730 B1 | 6/2015 |
| EP | 2291906 B1 | 4/2016 |
| GB | 1433402 A | 4/1976 |
| GB | 2483879 B | 3/2012 |
| JP | 2006238630 A | 9/2006 |
| WO | 02093655 A1 | 11/2002 |
| WO | 2006081531 A2 | 8/2006 |
| WO | 2010055713 A1 | 5/2010 |
| WO | 2010061392 A1 | 6/2010 |
| WO | 2010082265 A1 | 7/2010 |
| WO | 2010130273 A1 | 11/2010 |
| WO | 2012054492 A1 | 4/2012 |
| WO | 2012066493 A2 | 5/2012 |
| WO | 2012105737 A1 | 8/2012 |
| WO | 2012140495 A2 | 10/2012 |
| WO | 2016033394 A1 | 3/2016 |
| WO | 2016204830 A1 | 12/2016 |

OTHER PUBLICATIONS

Tolbert, L. et al., "Multilevel Converters for Large Electric Drives", IEEE Transactions on Industry Applications, Jan./Feb. 1999, pp. 36-44, vol. 35, No. 1.

Schmidt H. et al., "Interactions Between Solar Modules and DC/AC Inverters", Solar Power, Apr. 2007, pp. 1-20.

Patel, H. et al., "Generalized Techniques of Harmonic Elimination and Voltage Control in Thyristor Inverters Part —Harmonic Elimination", IEEE Transactions on Industry Applications, May/Jun. 1973, pp. 310-317, vol. IA-9, No. 3.

Otti, "Power Electronics for Photovoltaics", International Seminar Part 1 of 2, May 25-26, 2009, pp. 1-193, Munich, Germany.

Otti, "Power Electronics for Photovoltaics", International Seminar Part 2 of 2, May 25-26, 2009, pp. 194-363, Munich, Germany.

Otti, "Power Electronics for Photovoltaics", International Seminar Part 1 of 2, Jun. 7-8, 2010, pp. 1-185, Munich, Germany.

Otti, "Power Electronics for Photovoltaics", International Seminar Part 2 of 2, Jun. 7-8, 2010, pp. 186-398, Munich, Germany.

Myrzik, J., "Topological studies regarding the application of step-down/step-up choppers for inverters", Thesis Dissertation for earning the degree of a doctorate in engineering (PhD. Eng.) in the field of electrical engineering at the University of Kassel, May 26, 2000, pp. 29-34.

Earley, M. et al., "NEC 2008 Handbook, Eleventh Edition, International Electrical Code Series", 2008, pp. 1-32, National Fire Protection Association.

Mohan, N. et al., "Power Electronics: Converters, Applications, and Design; Second Edition", 1995, pp. 1-57, John Wiley & Sons, Inc.

Brown, M., "Noise Control and Electromagnetic Interference", Power Supply Cookbook, 1994, pp. 220-225, Motorola.

Liu, Q. et al., EMI Suppression in Voltage Source Converters by Utilizing dc-link Decoupling Capacitors, IEEE Transactions on Power Electronics, Jul. 2007, pp. 1417-1428, vol. 22, No. 4.

U.S. Department of Commerce International Trade Administration, "Electric Current Abroad 1998 Edition", Feb. 2002, pp. 1-30.

Billings, K., "Handbook of Switchmode Power Supplies" 1989, pp. 1-30, McGraw-Hill.

Araujo, S. et al., "Highly Efficient Single-Phase Transformerless Inverters for Grid-Connected Photovoltaic Systems", IEEE Transactions on Industrial Electronics, Sep. 2010, pp. 3118-3128, vol. 57, No. 9.

Ahmed, K. et al., "Passive Filter Design for Three-Phase Inverter Interfacing in Distributed Generation", 2007 Compatibility in Power Electronics, May 29-Jun. 1, 2007, pp. 1-9, Gdansk, Poland.

Petition for Inter Partes Review of U.S. Pat. No. 10,784,710 Pursuant to 35 U.S.C §§ 311-319, 37 C.F.R. § 42 mailed Oct. 8, 2021 in re U.S. Pat. No. 10,784,710 issued Sep. 22, 2020, pp. 1-97, No. IPR2022-00013.

Petition of Ranking and Explanation of Material Differences Between Petitions, Inter Partes Review No. IPR2022-00013 mailed Oct. 8, 2021, pp. 1-7.

"Declaration of R. Jacob Baker, Ph.D.", Exhibit 1002 of Petition for Inter Partes Review of U.S. Pat. No. 10,784,710 Pursuant to 35 U.S.C §§ 311-319, 37 C.F.R. § 42 mailed Oct. 8, 2021, pp. 1-194, No. IPR2022-00013.

Petition for Inter Partes Review of U.S. Pat. No. 10,784,710 Pursuant to 35 U.S.C §§ 311-319, 37 C.F.R. § 42 mailed Oct. 8, 2021 in re U.S. Pat. No. 10,784,710 issued Sep. 22, 2020, pp. 1-95, No. IPR2022-00014.

Petition of Ranking and Explanation of Material Differences Between Petitions, Inter Partes Review No. IPR2022-00014 mailed Oct. 8, 2021, pp. 1-7.

"Declaration of R. Jacob Baker, Ph.D.", Exhibit 1102 of Petition for Inter Partes Review of U.S. Pat. No. 10,784,710 Pursuant to 35 U.S.C §§ 311-319, 37 C.F.R. § 42 mailed Oct. 8, 2021, pp. 1-194, No. IPR2022-00014.

(56) References Cited

OTHER PUBLICATIONS

"Declaration of Dr. James L. Mullins, Ph.D.", Exhibit 1139 of Petition for Inter Partes Review of U.S. Pat. No. 10,784,710 Pursuant to 35 U.S.C §§311-319, 37 C.F.R. §42 mailed Oct. 8, 2021, pp. 1-217, Part 1 of 2, No. IPR2022-00014.
"Declaration of Dr. James L. Mullins, Ph.D.", Exhibit 1139 of Petition for Inter Partes Review of U.S. Pat. No. 10,784,710 Pursuant to 35 U.S.C §§311-319, 37 C.F.R. §42 mailed Oct. 8, 2021, pp. 1-108, Part 2 of 2, No. IPR2022-00014.
Petition for Inter Partes Review of U.S. Pat. No. 10,784,710 Pursuant to 35 U.S.C §§ 311-319, 37 C.F.R. § 42 mailed Oct. 8, 2021 in re U.S. Pat. No. 10,784,710 issued Sep. 22, 2020, pp. 1-93, No. IPR2022-00015.
Petition of Ranking and Explanation of Material Differences Between Petitions, Inter Partes Review No. IPR2022-00015 mailed Oct. 8, 2021, pp. 1-7.
"Declaration of R. Jacob Baker, Ph.D.", Exhibit 1202 of Petition for Inter Partes Review of U.S. Pat. No. 10,784,710 Pursuant to 35 U.S.C §§ 311-319, 37 C.F.R. § 42 mailed Oct. 8, 2021, pp. 1-193, No. IPR2022-00015.
Petition for Inter Partes Review of U.S. Pat. No. 8,937,822 Pursuant to 35 U.S.C §§ 311-319, 37 C.F.R. § 42 mailed Oct. 11, 2021 in re U.S. Pat. No. 8,937,822 issued Jan. 20, 2015, pp. 1-98, No. IPR2022-00007.
Petition of Ranking and Explanation of Material Differences Between Petitions, Inter Partes Review No. IPR2022-00007 mailed Oct. 11, 2021, pp. 1-8.
"Declaration of R. Jacob Baker, Ph.D.", Exhibit 1002 of Petition for Inter Partes Review of U.S. Pat. No. 8,937,822 Pursuant to 35 U.S.C §§ 311-319, 37 C.F.R. § 42 mailed Oct. 11, 2021, pp. 1-308, No. IPR2022-00007.
"Declaration of Dr. James L. Mullins, Ph.D.", Exhibit 1023 of Petition for Inter Partes Review of U.S. Pat. No. 8,937,822 Pursuant to 35 U.S.C §§ 311-319, 37 C.F.R. §42 mailed Oct. 11, 2021, pp. 1-250, Part 1 of 4, No. IPR2022-00007.
"Declaration of Dr. James L. Mullins, Ph.D.", Exhibit 1023 of Petition for Inter Partes Review of U.S. Pat. No. 8,937,822 Pursuant to 35 U.S.C §§ 311-319, 37 C.F.R. §42 mailed Oct. 11, 2021, pp. 1-42, Part 2 of 4, No. IPR2022-0007.
"Declaration of Dr. James L. Mullins, Ph.D.", Exhibit 1023 of Petition for Inter Partes Review of U.S. Pat. No. 8,937,822 Pursuant to 35 U.S.C §§ 311-319, 37 C.F.R. § 42 mailed Oct. 11, 2021, pp. 1-420, Part 3 of 4, No. IPR2022-00007.
"Declaration of Dr. James L. Mullins, Ph.D.", Exhibit 1023 of Petition for Inter Partes Review of U.S. Pat. No. 8,937,822 Pursuant to 35 U.S.C §§ 311-319, 37 C.F.R. §42 mailed Oct. 11, 2021, pp. 1-952, Part 4 of 4, No. IPR2022-00007.
Petition for Inter Partes Review of U.S. Pat. No. 8,937,822 Pursuant to 35 U.S.C §§ 311-319, 37 C.F.R. § 42 mailed Oct. 11, 2021 in re U.S. Pat. No. 8,937,822 issued Jan. 20, 2015, pp. 1-105, No. IPR2022-00008.
Petition Ranking and Explanation of Material Differences Between Petitions, Inter Partes Review No. IPR2022-00008 mailed Oct. 11, 2021, pp. 1-8.
"Declaration of R. Jacob Baker, Ph.D.", Exhibit 1202 of Petition for Inter Partes Review of U.S. Pat. No. 8,937,822 Pursuant to 35 U.S.C §§ 311-319, 37 C.F.R. § 42 mailed Oct. 11, 2021, pp. 1-330, No. IPR2022-00008.
"Declaration of Dr. James L. Mullins, Ph.D.", Exhibit 1223 of Petition for Inter Partes Review of U.S. Pat. No. 8,937,822 Pursuant to 35 U.S.C §§ 311-319, 37 C.F.R. §42 mailed Oct. 11, 2021, pp. 1-250, Part 1 of 4, No. IPR2022-00008.
"Declaration of Dr. James L. Mullins, Ph.D.", Exhibit 1223 of Petition for Inter Partes Review of U.S. Pat. No. 8,937,822 Pursuant to 35 U.S.C §§ 311-319, 37 C.F.R. §42 mailed Oct. 11, 2021, pp. 1-42, Part 2 of 4, No. IPR2022-00008.
"Declaration of Dr. James L. Mullins, Ph.D.", Exhibit 1223 of Petition for Inter Partes Review of U.S. Pat. No. 8,937,822 Pursuant to 35 U.S.C §§ 311-319, 37 C.F.R. § 42 mailed Oct. 11, 2021, pp. 1-420, Part 3 of 4, No. IPR2022-00008.
"Declaration of Dr. James L. Mullins, Ph.D.", Exhibit 1223 of Petition for Inter Partes Review of U.S. Pat. No. 8,937,822 Pursuant to 35 U.S.C §§ 311-319, 37 C.F.R. §42 mailed Oct. 11, 2021, pp. 1-952, Part 4 of 4, No. IPR2022-00008.
Petition for Inter Partes Review of U.S. Pat. No. 8,937,822 Pursuant to 35 U.S.C §§ 311-319, 37 C.F.R. § 42 mailed Oct. 11, 2021 in re U.S. Pat. No. 8,937,822 issued Jan. 20, 2015, pp. 1-105, No. IPR2022-00009.
Petition Ranking and Explanation of Material Differences Between Petitions, Inter Partes Review No. IPR2022-00009 mailed Oct. 11, 2021, pp. 1-8.
"Declaration of R. Jacob Baker, Ph.D.", Exhibit 1102 of Petition for Inter Partes Review of U.S. Pat. No. 8,937,822 Pursuant to 35 U.S.C §§ 311-319, 37 C.F.R. § 42 mailed Oct. 11, 2021, pp. 1-254, No. IPR2022-00009.
Petition for Inter Partes Review of U.S. Pat. No. 8,937,822 Pursuant to 35 U.S.C §§ 311-319, 37 C.F.R. § 42 mailed Oct. 11, 2021 in re U.S. Pat. No. 8,937,822 issued Jan. 20, 2015, pp. 1-79, No. IPR2022-00010.
Petition Ranking and Explanation of Material Differences Between Petitions, Inter Partes Review No. IPR2022-00010 mailed Oct. 11, 2021, pp. 1-8.
"Declaration of R. Jacob Baker, Ph.D.", Exhibit 1402 of Petition for Inter Partes Review of U.S. Pat. No. 8,937,822 Pursuant to 35 U.S.C §§ 311-319, 37 C.F.R. § 42 mailed Oct. 11, 2021, pp. 1-183, No. IPR2022-00010.
"Declaration of Dr. James L. Mullins, Ph.D.", Exhibit 1423 of Petition for Inter Partes Review of U.S. Pat. No. 8,937,822 Pursuant to 35 U.S.C §§ 311-319, 37 C.F.R. § 42 mailed Oct. 11, 2021, pp. 1-250, Part 1 of 2, No. IPR2022-00010.
"Declaration of Dr. James L. Mullins, Ph.D.", Exhibit 1423 of Petition for Inter Partes Review of U.S. Pat. No. 8,937,822 Pursuant to 35 U.S.C §§ 311-319, 37 C.F.R. §42 mailed Oct. 11, 2021, pp. 1-42, Part 2 of 2, No. IPR2022-00010.
Petition for Inter Partes Review of U.S. Pat. No. 8,937,822 Pursuant to 35 U.S.C §§ 311-319, 37 C.F.R. § 42 mailed Oct. 11, 2021 in re U.S. Pat. No. 8,937,822 issued Jan. 20, 2015, pp. 1-61, No. IPR2022-00011.
Petition Ranking and Explanation of Material Differences Between Petitions, Inter Partes Review No. IPR2022-00011 mailed Oct. 11, 2021, pp. 1-8.
"Declaration of R. Jacob Baker, Ph.D.", Exhibit 1502 of Petition for Inter Partes Review of U.S. Pat. No. 8,937,822 Pursuant to 35 U.S.C §§ 311-319, 37 C.F.R. § 42 mailed Oct. 11, 2021, pp. 1-179, No. IPR2022-00011.
"Declaration of Dr. James L. Mullins, Ph.D.", Exhibit 1523 of Petition for Inter Partes Review of U.S. Pat. No. 8,937,822 Pursuant to 35 U.S.C §§ 311-319, 37 C.F.R. §42 mailed Oct. 11, 2021, pp. 1-250, No. IPR2022-00011.
Petition for Inter Partes Review of U.S. Pat. No. 8,937,822 Pursuant to 35 U.S.C §§ 311-319, 37 C.F.R. § 42 mailed Oct. 11, 2021 in re U.S. Pat. No. 8,937,822 issued Jan. 20, 2015, pp. 1-66, No. IPR2022-00012.
"Declaration of R. Jacob Baker, Ph.D.", Exhibit 1602 of Petition for Inter Partes Review of U.S. Pat. No. 8,937,822 Pursuant to 35 U.S.C §§ 311-319, 37 C.F.R. § 42 mailed Oct. 11, 2021, pp. 1-179, No. IPR2022-00012.
"Declaration of Dr. James L. Mullins, Ph.D.", Exhibit 1623 of Petition for Inter Partes Review of U.S. Pat. No. 8,937,822 Pursuant to 35 U.S.C §§ 311-319, 37 C.F.R. §42 mailed Oct. 11, 2021, pp. 1-250, No. IPR2022-00012.
Petition of Ranking and Explanation of Material Differences Between Petitions, Inter Partes Review No. IPR2022-00012 mailed Oct. 11, 2021, pp. 1-8.
PTAB Judgment, Final Written Decision re IPR2022-00013 for U.S. Pat. No. 10,784,710B2; Paper 27, dated Apr. 17, 2023, pp. 1-59.
PTAB Judgment, Final Written Decision re IPR2022-00010 for U.S. Pat. No. 8,937,822B2; Paper 27, dated Apr. 17, 2023, pp. 1-39.
PTAB Judgment, Final Written Decision re IPR2022-00007for U.S. Pat. No. 8,937,822B2; Paper 28, dated Apr. 17, 2023, pp. 1-63.

\* cited by examiner

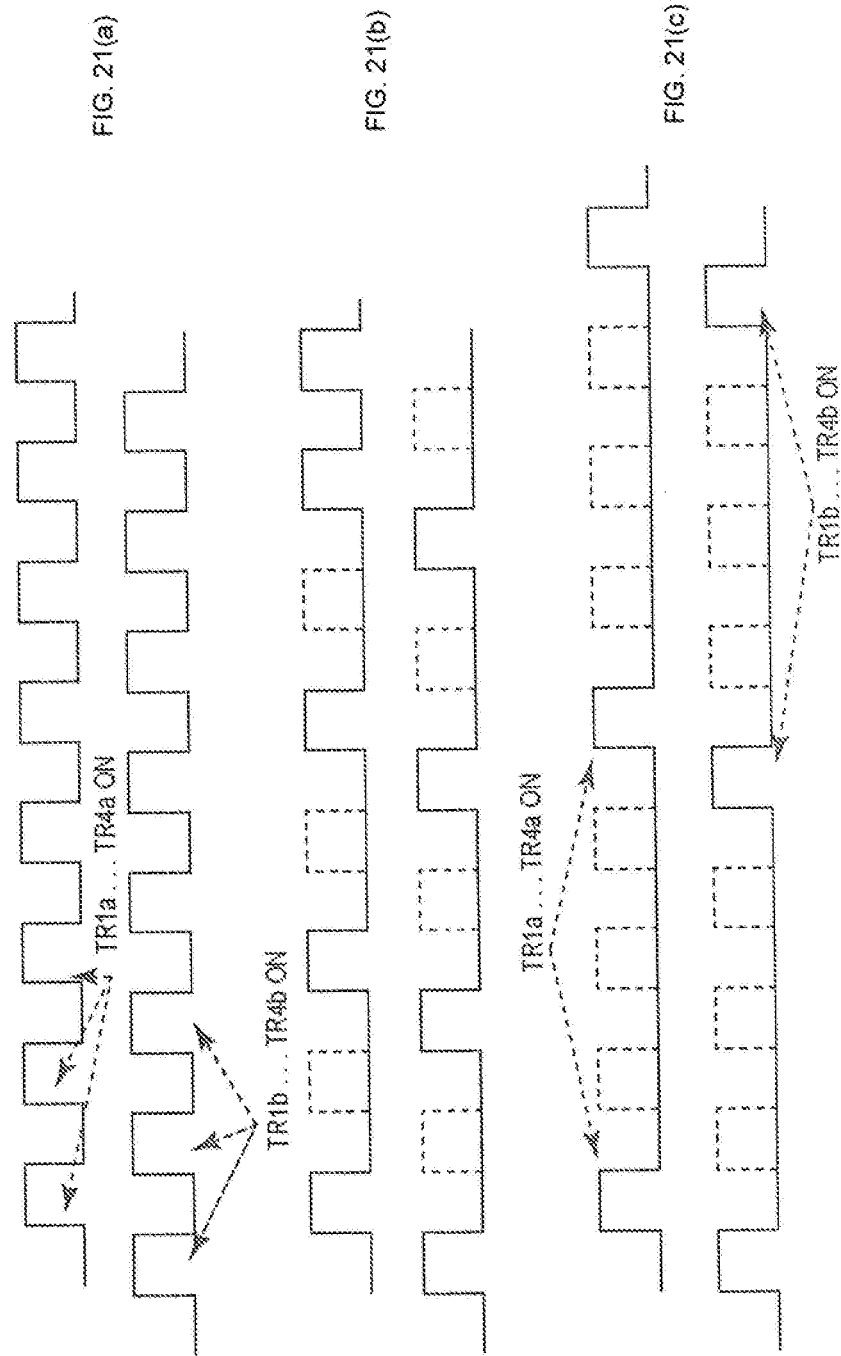

SAFETY SHUT-DOWN SYSTEM FOR A SOLAR ENERGY INSTALLATION

This application is a Continuation application of pending U.S. application Ser. No. 16/233,556, filed 27 Dec. 2018, which is a Continuation application of U.S. application Ser. No. 14/749,339, filed 24 Jun. 2015, now patented as U.S. Pat. No. 10,205,324, which is a Continuation application of U.S. application Ser. No. 14/062,884 filed 24 Oct. 2013, now patented as U.S. Pat. No. 9,735,703, which in turn is a Continuation application of U.S. application Ser. No. 13/103,070 filed 8 May 2011, now patented as U.S. Pat. No. 8,937,822. The disclosures of each of these references are incorporated in their entireties by reference herein.

BACKGROUND

The present invention relates to DC-to-AC convertors for electric power systems. Lower cost, high-power, efficient, DC-to-AC convertors are of interest for solar energy economics. In the prior art, DC-AC inverters are the second highest cost item next to the photovoltaic panels. For high efficiency and low heat dissipation, commutation of DC to produce AC preferably uses solid state switches that are either fully on or fully off, and do not dwell more than a microsecond or so in an intermediate state. Therefore it is more complicated to produce a sine wave that takes on all values between the negative peak and the positive peak. On the other hand, producing a square wave which switches between the positive peak and the negative peak produces a form of AC that is not suitable for all loads.

Various manufacturers provide prior art DC-AC convertors, that fall into one of a few broad classes and operating modes. The class of "modified sine wave" converters maintains both the same rms and the same peak voltage as a sine wave, while still employing only on-off commutation. This is done by switching the voltage between the desired positive peak, zero and the negative peak, spending 50% of the repetition period at zero, therefore achieving both the same peak and the same rms values as a true sine wave, and being compatible with a greater variety of loads.

Still, there are loads that do not tolerate the modified sine wave; for example appliances that present inductive loads, such as induction motors, some cellphone and laptop battery chargers, fluorescent lamps and tumble dryers, and any device with an internal power supply that uses capacitive reactance as a lossless voltage-dropping means, can malfunction on modified sine waveforms. Moreover, there is a potential problem with radio and TV interference due to the high level of harmonics of the modified square wave converter. Such a waveform is therefore not a candidate for coupling solar-generated power into the utility network or into house wiring.

"True sine wave" is another class of prior art DC-AC converter. Linear amplifiers provide the absolute cleanest AC power waveforms, but their inefficiencies cause high heat dissipation in converters of several kilowatts capacity. Moreover, linear amplifiers lose efficiency rapidly when operating into non-unity power factor loads. Some sine wave inverters overcome the problems with linear amplifiers by using digitally-synthesized waveforms, which are multi-step approximations to a smooth sine wave. One example of a step-approximation sine wave inverter is the XANTREX (formerly Trace) SW4048.

In U.S. Pat. No. 5,930,128 by current Inventor, a power waveform generator was disclosed that involved expressing the sinusoidal waveform as a series of numerical samples in a number base comprising a plurality of digits; selecting corresponding digits from each numerical sample and generating therefrom a waveform corresponding to the sequence of each digit, then using combining means to form a weighted combination of the digit-corresponding waveforms, the weights being chosen in relation to the numerical significance of each digit. For example, using a ternary number base, the weighting means would add the digit waveforms in the ratios $1:\frac{1}{3}:\frac{1}{9}$ and could for example be a transformer with these turns ratios.

U.S. Pat. No. 5,373,433 also describes using series connected, turns-ratio weighted transformer coupling of 3-level waveforms to produce a 27-level step approximation to a sine wave. The principle described therein is similar to that used in the aforementioned XANTREX SW4048 inverter. The combining means disclosed in the '128 patent for combining digit-corresponding waveforms was, in a low-frequency case, a series connection of transformers having turns ratios in the ratios of corresponding numerical digits, and in a high-frequency case, comprised a set of quarter wave lines having characteristic impedances in the ratios of corresponding digits.

In a device built in accordance with the '128 patent, the series-connected transformer is the appropriate version for 60 Hz, as ¼ wavelength lines are impractical at 60 Hz; however, the transformers needed for the inventions of the '128 and '533 patents represent a significant fraction of the total cost and weight of medium-power converters, and also account for a few percent loss in total efficiency. Therefore, other solutions that avoid the disadvantages and pitfalls of the above prior art would be useful, and in particular, a solution avoiding these low-frequency transformers would be a benefit.

Transformerless inverters are known in the prior art, particularly for utility-interactive inverters, which use high-frequency switching or pulse width modulation to approximate a sinewave. However, a disadvantage that arises in these prior art converters is the imposition of the high-frequency switching waveform on the solar array, which can capacitively couple through the glass cover upon touching it, potentially causing RF burn to personnel or damage to the solar panel, as well as causing the solar array to radiate substantial radio interference. Thus a design is required that can create a more benign voltage fluctuation on the solar array DC conductors.

Another categorization of convertor relates to whether they are designed to power loads directly, or whether they are designed to feed and sell power back into the electricity grid. A load inverter that can power loads directly is said to operate in standalone mode, and is also called a "standalone inverter", while a grid-tie inverter is said to operate in grid-interactive mode and is also called a "grid-interactive inverter".

For safety and other reasons, the latter have to meet different specifications than the former, especially under fault conditions. In particular, a load inverter should be a constant voltage source, while a grid-tie inverter does not have a constant voltage output but must adapt to the voltage of the grid, and is a current source. Moreover, a load inverter is always used with battery storage, and should maintain efficiency at both light and heavy loads and have low no-load power consumption, so that the battery is not discharged while the inverter is idling at night. Grid-tie inverters however do not have the same a requirement for no-load power consumption, as they do not operate at night.

A complete alternative energy installation may thus comprise a number of functions, including load inverters, grid-tie inverters, load management for manually or automatically transferring load between the utility and alternative energy supplies, storage batteries, battery chargers, circuit breakers, surge protectors and other safety devices to protect equipment and wiring and eliminate the risk of electrical mishaps under conceivable fault conditions. Other than the inverters and the array these additional components are known as "balance-of-system" components.

For high power grid-tie installations, typically 20 kw and above, 3-phase inverters are preferable in order to keep the gauge and cost of wiring down and to assist in maintaining balance between the three phases of the electricity grid. For convertors over 100 Kw, 3-phase is often mandated by the utility company. Three phase inverters using pulse width modulation are known from the art of solid state Motor Drives, but they are not suitable for grid-interactive use for many reasons, and Motor Drives do not need or have ground leak detection on the DC bus, which is internal.

The total cost of balance-of-system components required in an installation can be significant; therefore it is an objective of this disclosure to describe novel designs of inverters, safety devices and automatic load management devices that provide a more efficient and cost effective complete installation, and which achieve cost reductions in the electronics to complement the currently falling cost of photovoltaic panels.

SUMMARY

New methods and apparatus for the conversion of DC power to AC power are disclosed herein, together with smart energy management technology to provide an efficient 'green' energy installation. In a first implementation, a novel DC to AC convertor comprises a waveform generator based on expressing the desired output voltage waveform as a series of numerical samples in a number base, each sample being expressed as a plurality of digits in the number base; one or more high-frequency, bidirectional, isolating DC to DC converters to convert input DC power at a first voltage to a series of relatively floating DC output voltages, the floating voltages being in the same ratio to one another as powers of the number base; switches connected to each of the floating DC supplies and controlled according to a corresponding digit of a numerical sample to generate a corresponding floating output voltage waveform, the floating output waveforms then being directly connected in series to form the desired power output waveform having a desired repetition frequency thereby eliminating the need for further low frequency transformers or other weighting means. In a preferred embodiment, one of the DC voltages may be chosen to equal the input source voltage so that no isolating DC-DC convertor is required for that supply. Preferably it is the supply from which the greatest average power is drawn, which is typically the highest supply voltage corresponding to the most significant digit of the given number base. The DC source, which may be a solar-array-charged battery, is configured to allow its positive and negative terminals to be alternately interchanged so that the positive and negative terminals are alternately connected to the grounded neutral conductor, or reference potential terminal, which facilitates detection of ground leakage faults in the DC circuit using an AC ground leak detector. While one of the DC input conductors is connected to the ground, neutral or reference potential terminal, the other DC input is routed to and processed by circuits which produce the desired output waveform, such as a sine wave, that is output from at least one live or "hot" AC output terminal.

A second implementation couples power produced by a solar array into the electricity grid. In a single-phase, grid-interactive inverter according to the second implementation, a switch connects the negative terminal of the solar array to line neutral and thus to ground, or else to a reference potential terminal, when the required output to the utility grid hot leg is instantaneously positive, and a second switch, which is inhibited from operating at the same time as the first switch, connects the solar array positive terminal to line neutral and thus to the ground or reference potential terminal when the required output to the utility grid hot leg is instantaneously negative. Third and fourth switches alternately connect or disconnect the solar array terminal not connected to line neutral to or from smoothing and inverter hash filters supplying at least one AC output terminal that is connected to the utility hot leg, the pattern of connects and disconnects being determined by a high frequency digital waveform generator such as a delta-sigma modulator, pulse-width modulator or similar, such that the current delivered to the utility approximates a sinusoidal current with low harmonic content. The waveform generator timing is controlled such that the power delivered to the utility substantially equals the solar power available from the array, and such that the delivered current is substantially in-phase with the utility voltage. Output relays connects the inverter to the utility only when certain conditions such as utility voltage limits, array voltage limits and utility frequency limits are satisfied. When the relays are not connecting the inverter to the electric utility, energy originating from the photovoltaic array may be used for other purposes, such as charging a battery for operating a load inverter. The utility connection may be made via a two-pole AC GFCI breaker such that any ground fault on either solar array terminal throws the breaker and isolates the array, preventing electrical mishap. Thus the second inverter configuration may be used alone in grid-interactive mode, or may be used together with the first inverter implementation and a rechargeable battery in order also to provide utility backup in the event of a power outage. Such a bimodal installation may be programmed to prioritize battery charging, and when fully charged, excess solar array power is then fed to the electric utility via the grid-tie inverter.

A three-phase grid-tie inverter according to the second implementation is also described. The three phase inverter comprises switches to connect the negative of the DC source, to one of the set of three phase output terminals for the whole of the period during which it is instantaneously negative relative to a mean voltage or to a ground, neutral or reference potential, while the other terminals of the set of AC output terminals are zero or relatively positive compared to the mean, ground, neutral or reference potential terminal, alternating in a rotating sequence with connecting the positive of the DC source to one the set of three phase AC output terminals for the whole of the period during which it is instantaneously positive relative to the mean, ground, neutral or reference potential and the other terminals of the set of AC output terminals are zero or relatively negative to the mean, ground, neutral or reference potential. The AC output voltages from each of the set of AC output terminals has a unique phase, which, in the case of two AC output terminals may be zero and 90 degrees, or, for three AC output terminals, may be 0, 120 and 240 degrees, while in a single phase case the unique phase is simply 0 degrees.

A common characteristic of the inventive converters is that a common-mode AC signal is created in-phase on both the positive and negative DC input terminals and on all DC conductors. The AC signal is of the same frequency as the AC output in the single phase case, three times the AC output frequency in the three-phase case, and two times the AC output frequency in a quadriphase (0 and 90) case. A ground leakage fault in the DC circuit is thus detectable by detecting an AC leakage current at this characteristic frequency, which is technically much easier than detecting a DC leakage current.

A smart load management center is also described which can selectively power each load or branch circuit either from the load converter, when solar or battery power or other alternative energy source is sufficient, or from the utility supply. The smart load center may be end-user configured to prioritize which loads are preferentially powered from the alternative energy source, and may be configured to permit deeper battery charge-discharge cycles in utility back-up mode only during the hopefully very infrequent utility outages, than when utility power is available, thus maximizing the life of the battery before replacement is needed. The smart load center also has provision to shed load in a prioritized order during a prolonged outage when limited solar energy is being received.

A solar combiner is normally a simple junction box for connecting the outputs of several solar panels or strings of panels in parallel. When strings are connected in parallel, it is desirable to use blocking diodes such that a shaded panel does not rob current from the total. Many combiners ignore the potential for differential shading and omit these diodes. An advantageous solar combiner is described that selectively transfers the output current of each string to a first priority load, such as battery charging, a second priority load, such as a grid-tie inverter, or disconnects both loads. The solar combiner described may thus be controlled to progressively increase or decrease a battery charging current while diverting current not used for battery charging to a grid tie inverter or other diversion load. By disconnecting all strings from both battery charging and the diversion load, the solar combiner also provides a local and/or remote-controlled DC disconnect function. In residential installations, DC wiring from a solar array is required by the NEC to be enclosed in metallic conduit up to the first DC disconnect. By providing a remote DC disconnect function, the combiner described can be located right at the solar array, for example attached to the inside of the attic roof behind a roof-mounted array. By this means, the internal wiring need not be in metallic conduit. The solar combiner communicates with the inventive load convertor, which monitors battery state, in order to provide a battery charge controller function.

BRIEF DESCRIPTION OF THE DRAWINGS

FIGS. 21A, B and C show the DC-DC converter waveforms for reducing standby current.

DETAILED DESCRIPTION

Figure 1:
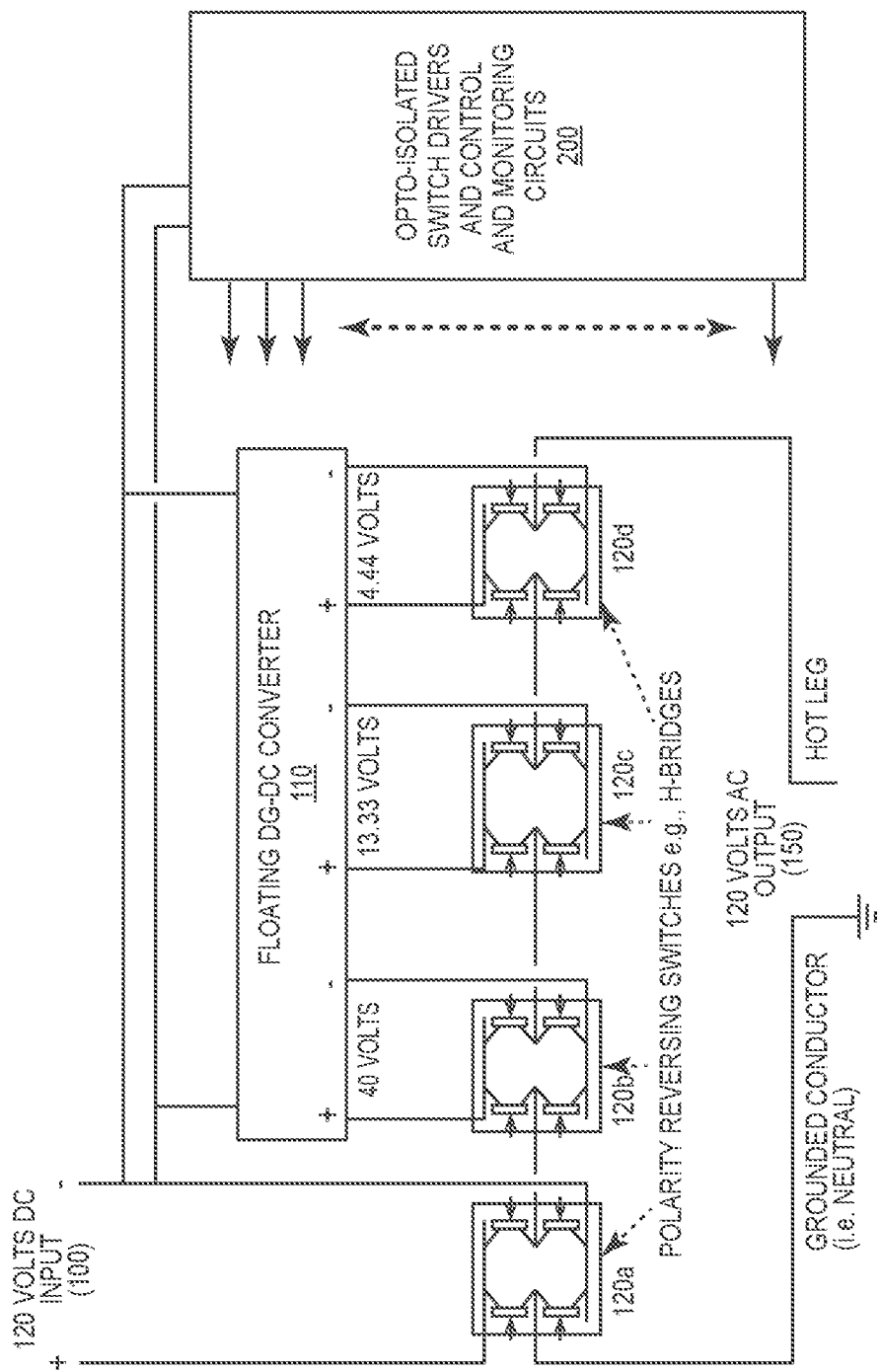
FIG. 1 shows a top-level block diagram of a DC-AC load converter.

Referring to FIG. 1, a DC-to-AC conversion apparatus according to a first implementation comprises an input (100) for a floating DC power source, for example 120 volts DC from ten 12-volt rechargeable batteries connected in series; a pair of output terminals (150) for the AC output, one of which may be connected to the grounded conductor or neutral of the AC load; a bidirectional DC-DC converter (110) for converting the DC input to a number of floating DC output voltages, and a set of reversing switches 120a-120d controlled by opto-isolated driver circuit 200. While one of a pair of single phase power conductors is normally a grounded neutral conductor, the inventive converter may alternatively provide a floating output relative to an arbitrary reference potential terminal. The bidirectional property of the DC-DC convertor 110 implies that power may instantaneously flow in either direction at any pair of input or output terminals. If the current flows out of a positive terminal, the direction of power flow is "out", while if current flows into a positive terminal, the direction of power flow is "in". The DC-DC convertor is of a substantially lossless, switching type, implying that all power that flows in must come out, although the convertor may optionally contain energy storage capacitors such there may be an instantaneous imbalance between input and output power according as the capacitors are accumulating or releasing energy. In this example, it is assumed that the inverter output waveform to be generated is represented as a sequence of numerical samples, each numerical sample value being expressed with four digits in the ternary number system, e.g. (T4,T3,T2,T1), wherein each digit Ti (i=1 . . . 4) can only take on one of the three values −1, 0 or +1. In correspondence with the place significance of the different ternary digits, a number of floating DC supplies are generated with ratios 1:⅓:⅑:1/27. Assuming a 120-volt DC input source, The floating DC supplies generated by converter 100 are therefore 40 v, 13.33 v and 4.44 volts which are respectively ⅓rd, ⅑th and 1/27th of the nominally 120 volt floating DC power source. The sum of the DC input and all outputs of the DC-DC converter is 120+40+13.33+4.44=177.77 volts. This is the peak voltage that could be generated at the AC output (150), and corresponds to a useful sine wave output voltage of 125.7 volts rms. If necessary, all the voltages can be scaled to produce other output voltages, for example 100 v, 115, 120 v, 125 v, 220 v etc., while still maintaining the power-of-3 ratios between the floating supply voltages. Other voltage outputs or waveforms (within the maximum available peak voltage of all DC supplies added together) may alternatively be generated by choosing the appropriate sequence of ternary digits. For example, the invention could be used to produce an output waveform for driving a vibration table for mechanical testing purposes, the waveform being either non-repetitive, or having a desired repetition frequency.

Other number systems than ternary could be used; for example, the binary number system could be used, or the quaternary number system could be used in which digits take on the values −3, −1, +1 or +3. However, ternary is of slightly lower component complexity per waveform step and is therefore the preferred choice.

Continuing to refer to FIG. 1, the floating DC input and the floating outputs from DC-DC converter (110) each feed respective polarity reversing switches 120*a*,120*b*,120*c* and 120*d*. The outputs of the switches are directly connected in series to the AC output 150, so that, by either inverting the selected polarity of each DC supply or not, or not selecting it, in accordance with a respective one of the ternary digits T4,T3,T2,T1, the series-connected output can be any of the 81 values (120T4+40T3+13.33T2+4.44T1) volts.

For example, if all switches select the positive polarity, the output voltage will be 120+40+13.33+4.44=177.77 volts. If however the 4.44 volt switch is controlled to feed straight through, the output voltage will be 120+40+13.33=173.33 volts.

If the 4.44 v switch is controlled to reverse the polarity, the output voltage will be 120+40+13.33−4.44=168.88 volts. By appropriate control of the switches therefore, any output voltage between −177.77 and +177.77 volts in steps of 4.44 volts can be produced. It is important to note that, when a DC source polarity is selected to oppose the output voltage and therefore the current flow, power is feeding backwards into the DC-DC converter, which must therefore be of a bi-directional design using for example synchronous rectifiers.

It is a significant advantage to arrange that the voltage corresponding to the most significant ternary digit, or from which the greatest power is drawn, comes directly from the DC input, and does not pass through the DC-DC convertor, as the DC-DC convertor then only has to convert the remaining fraction of the total power. Most of the AC output power then comes directly from the DC input source, which improves the total conversion efficiency.

Figure 3:
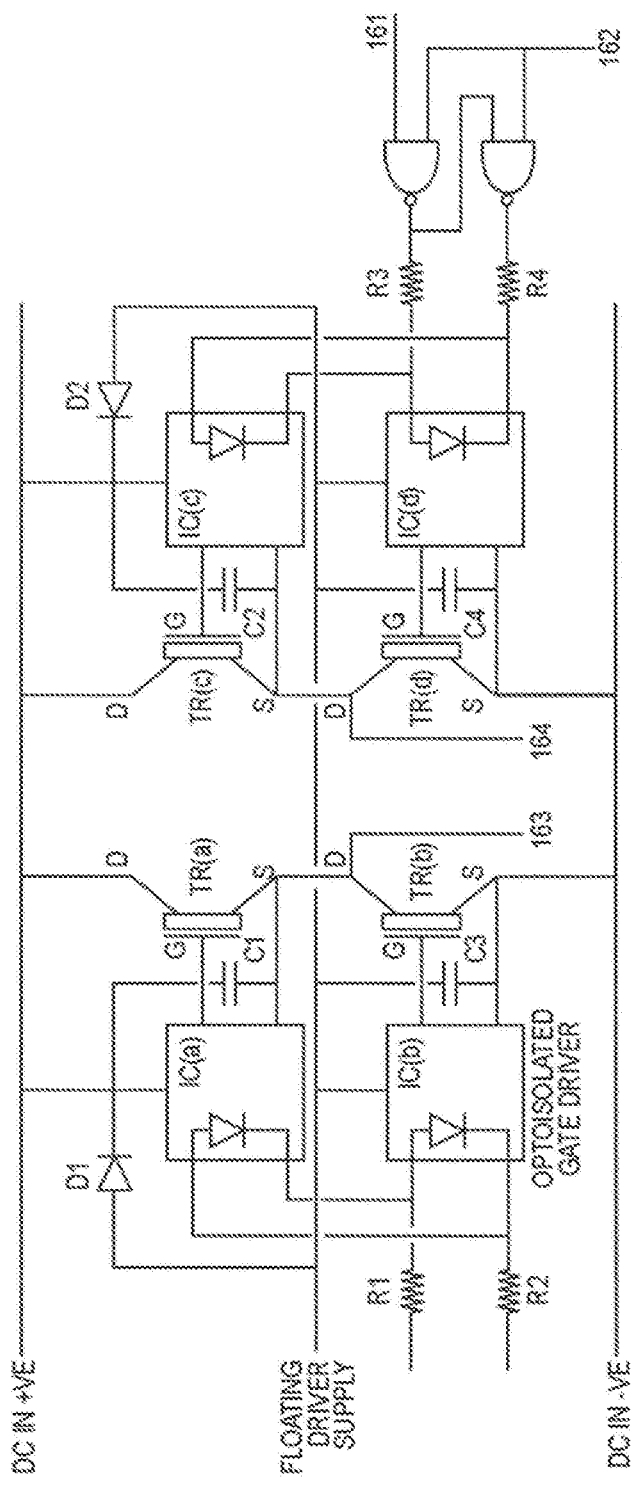
FIG. 3 shows a floating H-bridge for commutating a floating DC supply.

In order to generate a 60 Hz step-approximation to a 125.7 volt rms sinewave, the switches are controlled to select sequentially among the $3^4$=81 possible voltage levels from −177.77 to +177.77 volts and back again, repetitively in the proper sequence and at the proper times. One cycle therefore comprises nominally 2×81 voltage steps, so that the number of level changes per second is approximately 2×81× 60=9720. This is somewhat rapid for mechanical switching means such as relays, rotary commutators or cam-actuated contacts, but is well within the capability of semiconductor switches which can operate 100 times faster than the required speed. The full H-bridge of N-type power MOSFETs shown in FIG. 3 is the preferred switch. Referring to FIG. 3, four N-type MOSFET power transistors labeled Tr(a), Tr(b) Tr(c), Tr(d) are connected between the DC input +ve terminal and the −ve terminal. By turning on transistors Tr(a) and Tr(d) while turning off transistors Tr(b) and Tr(c), the DC +ve input is connected to output pin 163 while DC −ve input is connected to output pin 164. Conversely, by turning on transistors Tr(b) and Tr(c) while keeping transistors Tr(a) and Tr(d) off, the DC +ve input is connected to output terminal 164 while the DC −ve input is connected to output pin 163. A pass-through state is created either by turning on transistors Tr(a) and Tr(c) while holding Tr(b) and Tr(d) off, which connects the DC +ve input to both output terminals 163 and 164, or by turning on transistors Tr(b) and Tr(d) while holding Tr(a) and Tr(c) off, which connects the DC −ve input to both output terminals 163 and 164. These two pass through states both give zero voltage output between terminals 163 and 164, but differ as to which polarity of the floating DC input is connected to the output terminals. Both pass-through states are used in the invention at different times.

A MOSFET is turned on or off by applying a positive or (negative or zero) voltage between its gate and its source. Since the sources of the upper MOSFETs Tr(a) and Tr(c) of the H-bridge are connected to different ones of the H-bridge outputs, and the sources of the lower two MOSFETs Tr(b) and Tr(d) of the H-bridge are connected to the negative of the DC supply, three different relatively floating supplies are required for the gate drivers IC(a), IC(b), IC(c) and IC(d). IC(b) and IC(d) may use the same gate driver supply, but IC(a) and IC(c) create separate supplies using bootstrap diodes D1 and D2 to charge capacitors C1 and C2 respectively. Further discussion of bootstrapping may be found in FIG. 4 of Intersil Application Note AN9324.4 dated March 2003, by George E. Danz.

Due to the reference potentials for the gate drivers being different, even within the same H-bridge, all gate drivers are preferably opto-isolated. A preferred opto-isolated gate driver is Fairchild part number FOD3180. An opto-isolator comprises a light-emitting diode illuminating a phototransistor. When current is passed through the light emitting diode at its input, the output will be enabled. Since it is important that TR(a) and TR(b) should never be turned on at the same time, as this would short the DC input, this is rendered impossible by connecting their gate driver input LEDs back-to-back. Likewise the gate driver input LEDs for TR(c) and TR(d) are connected back to back. A control input 161 is conditioned by two inverting AND gates to produce opposite polarity output signals which connect through resistors R3 and R4 to the LEDs of gate drivers IC(c) and IC(d). A logic 0 at pin 161 will enable IC(d) to turn on TR(d) and switch TR(c) off. A logic 1 at pin 161 will enable IC(c) to turn on TR(c) and switch TR(d) off. A logic 0 at input pin 162 will produce logic 1's at both NAND gate outputs and thus no current will flow in either LED, turning both TR(c) and TR(d) off. The latter state is useful for fast shutdown upon fault events.

If the H-bridges of FIG. 1 are controlled according to a fixed timing to generate step approximations to a sine wave, the output voltage will simply be proportional to the DC input voltage, e.g. 125.7 volts RMS out for 120 volts DC in, or 104.75 volts RMS output for 100 volts DC input, or 146.65 volts RMS out for 140 volts DC input. The range 100 volts DC to 140 volts DC represents the range of voltages that could be produced by 60 lead-acid cells in series between the two extreme states of (a) substantially fully discharged and (b) fully charged and receiving a bulk or absorption charge. It may not be desirable to allow the AC output to vary so much over this range of DC input voltages. Accordingly, a method is used to maintain more constant AC output voltage in the face of varying DC input. Instead of controlling the switches in a fixed timing sequence, a controller determines the time at which a sine wave output of desired amplitude passes from being nearer one voltage step to being nearer an adjacent voltage step, given the actual DC supply voltages, and may control the switches to change from the previous voltage step to the adjacent voltage step at the determined time. A simple implementation of the foregoing comprises pre-computing a sequence of switching times for each of a number of possible sub-ranges of the DC input voltage; for example, a first series of switching times for the range 100-110 volts; a second series for 110 to 120 volts; a third series for 120-130 volts, and a fourth series for 130 to 140 volts. Moreover, the series of switching times can be computed to give a nominal output voltage of 120 volts RMS instead of 125.7 volts. This method of determining a series of switching times to produce a constant 120 volt AC sine wave output with various DC input voltages may be extended to operate over the DC input voltage range 100 to 327 volts. At 327 volts, the 170-volt peak value of a 120 v rms AC sine wave is produced with a 4-digit ternary number of 1, −1, −1, −1, which illustrates that the highest voltage H-bridge still makes its maximum voltage contribution of 327 volts, but with the other three H-bridges backing-off this voltage by −109 volts, −36.3 and −12.1 volts respectively. Under these circumstances the highest voltage H-bridge is only contributing current for short periods at the very peaks, so the majority of power flow passes through the DC-DC converter, reducing efficiency and maximum output rating. For such a converter, the specification should indicate an efficiency and a maximum power derating factor as a function of input voltage. Input voltage ranges up to perhaps 200 volts may still be accommodated however with most of the output power coming directly from the DC input and only a fraction being supplied by the DC-DC converter, and therefore without significant loss of efficiency or power derating. Utilizing the extended input voltage capability is one way to construct a bimodal system using the same array voltage for both the grid-tie and the standalone modes, as will be described later.

The above example of an extreme DC input voltage of 327 suggests another possible variation of the inverter. When the highest H-bridge voltage is 327, the second highest is 109. This suggests that an inverter could be constructed wherein the input voltage was the second highest floating DC source, and the bidirectional DC convertor generated floating outputs of 3 times, ⅓rd and ⅑th of the input. Thus it is possible to design an inventive converter for a nominal 96-volt battery, which would power the second highest voltage H-bridge directly, and the DC-DC converter would generate 3×96=288 volts, 96/3=32 volts, and 32/3=10.67 volts for the other H-bridges. Each inverter design thus should be optimized for an intended range of DC input voltages. When the DC input voltage is outside the design range, a fault detector may apply a logic zero to pin 162 of FIG. 3 and to a corresponding pin on the other half of the H-bridge and to all H-bridges, thus instantly halting operation of the converter until the input voltage lies consistently within the design range once more.

Figure 12:
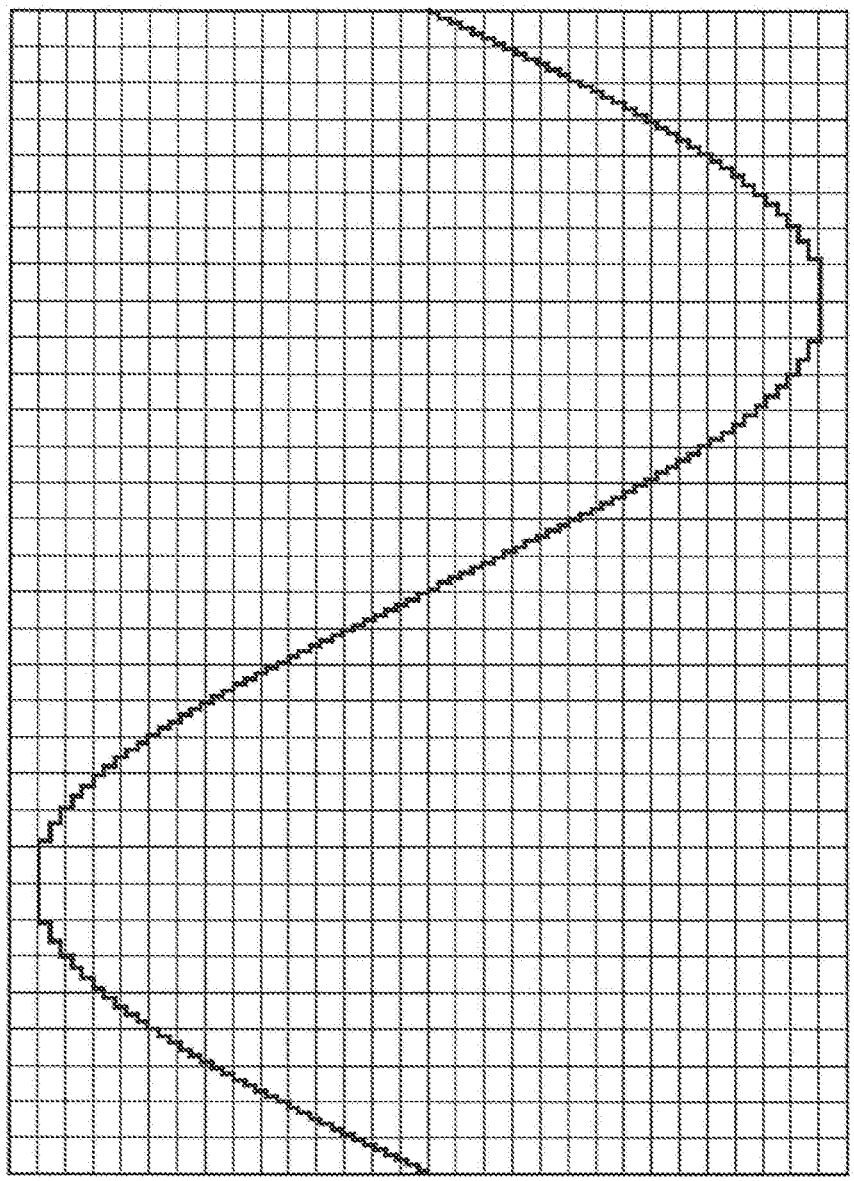
FIG. 12 shows the output sinusoidal waveform from an inventive converter.

FIG. 12 shows the output sinusoidal waveform from the converter produced by controlling the switches in the proper sequence, when the DC input is 126 volts (a fully charged, 60-cell lead acid battery) and the desired AC output is 120 volts rms. For 60 amps AC output (7.2 kilowatts of output power), DC-to-DC convertor (11) supplies only 1274 watts of the total power, the remainder coming directly from the 126 volt DC input via only H-bridge 120a, which switches at only 60 Hz. Switching losses are therefore negligible for the bulk of the power flow.

The use of floating DC supplies of 120, 40, 13.33 and 4.44 volts to the inputs of the H-bridges, plus the use of opto-isolators to isolate the power MOSFET control lines means that the outputs provided from the H-bridges are also floating, and can therefore be joined in series directly, that is without further coupling means or weighting means, to provide an output voltage of 120×T4+40×T3+13.33×T2+4.44×T1 where (T4,T3,T2,T1) is the four ternary digit representation of the desired instantaneous output voltage from the converter. The ability to join the H-bridge outputs in series directly confers the benefit that the inventive DC-AC convertor scheme requires no 60 Hz transformers, which reduces weight in particular, but the main benefits are reduced cost and size and improved efficiency.

If the DC input voltage is not 120 volts, but in general is denoted by Vdc, then the formula for the instantaneous output voltage is $$Vdc \cdot (T4 + T3/3 + T2/9 + T1/27)$$

For a greater number of digits than 4, for example n digits T1 . . . T(n), the formula for instantaneous output voltage is $$T(n) + T(n-1)/3 + T(n-2)/9 + \ldots T1/3^{(n-1)}$$

times the DC input voltage if the direct current source voltage is the greatest of the floating DC supplies or alternatively $$3T(n) + T(n-1) + T(n-1)/3 + \ldots T1/3^{(n-2)}$$

times the DC input voltage if the direct current source voltage is the second greatest of the floating DC supplies, or even more generally $$3^m[T(n) + T(n-1)/3 + T(n-2)/9 + \ldots T1/3^{(n-1)}]$$

where the power m is zero if the highest voltage is directly equal to the DC input voltage; m=1 if the DC input voltage is the second highest of the floating supply voltages; m=2 if the DC supply voltage is the third highest if the floating supply voltages and so forth.

Figure 4:
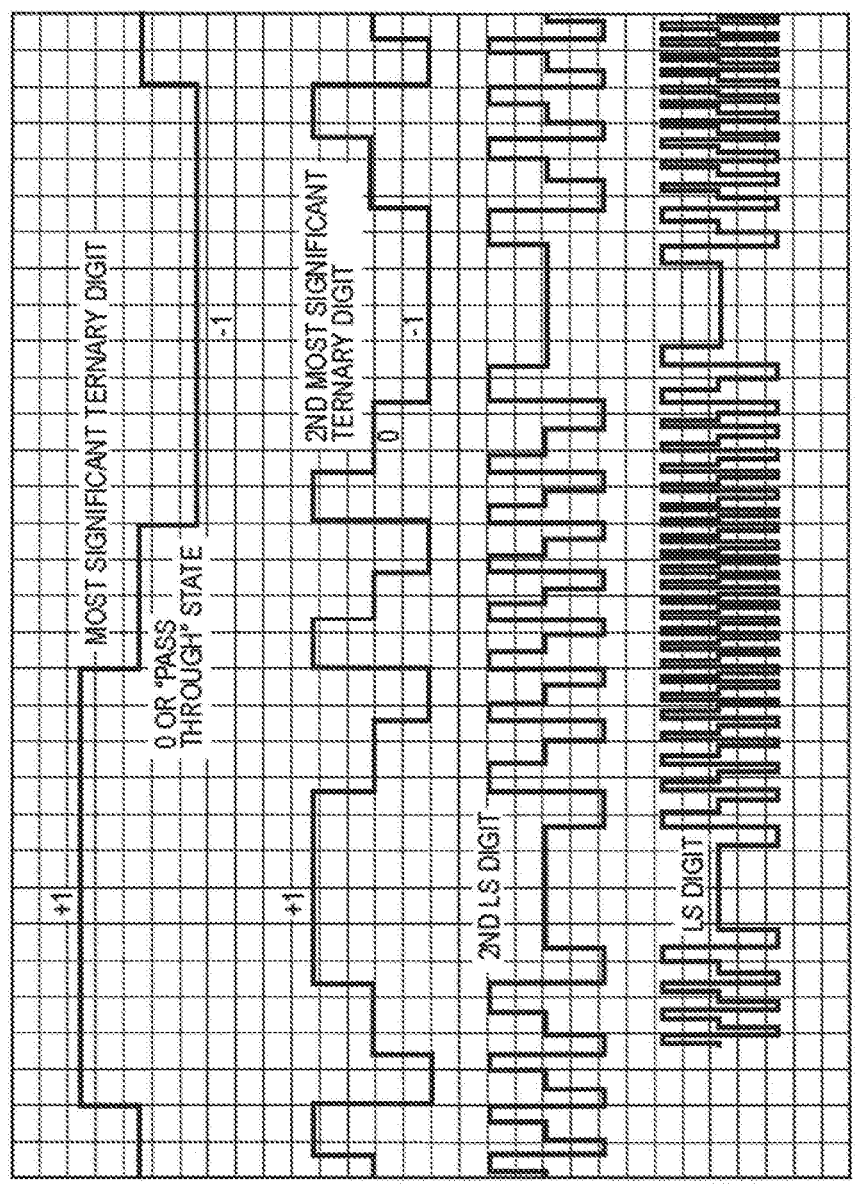
FIG. 4 shows the waveforms of four ternary digits over a repetition cycle.

FIG. 4 illustrates the behavior of the four ternary digits T4,T3,T2,T1 when generating a 120-volt RMS AC output when Vdc=126 volts, as was used to produce the output waveform of FIG. 12. For this particular input and output voltage, it may be seen that the desired peak voltage of 120√2=169.7 volts is approximated with T4=T3=1 and T2=R1=0, giving 126(1+⅓)=168 volts. This is nearer 169.7 than the next higher step of 172.44 with T4=T3=T1=1 and T2=0. Thus small changes in the DC input voltage may require substantial changes in the waveform to maintain an absolutely constant 120 volt RMS output; however such accuracy is not required and a finite number of precomputed waveforms may be used as previously described.

Some hysteresis in selecting the best waveform can be provided so as to prevent the converter hurdling, which describes the sound of periodic changes in inverter hum when inverters alternate between different waveforms. In any case, a selected waveform is used for at least an entire cycle to ensure symmetry between the positive and negative half-cycles and to ensure zero net DC bias on the output.

FIG. 4 also illustrates that the most significant DC supply voltage is not used (i.e. T4=0) around the zero crossings of the sine wave. Thus H-bridge 120a is programmed to the "pass through" state when T4=0. In the pass through state, either the DC input positive line or the DC input negative line is connected to both outputs of H-bridge 120a. It is deliberately chosen that one H-bridge 120a output provides the neutral or grounded conductor output of the converter while the hot leg is provided by the end of the series H-bridge string, i.e. from an output of H-bridge 120d. This results in either the DC input positive line or the negative line being connected to neutral (the grounded conductor) in the pass through state. By choosing to form the pass through state by connecting the positive DC input to neutral in the pass-through period following a positive half cycle where T4 was previously equal to 1, and choosing to form the pass though state by connecting the negative of the DC supply to the neutral/ground after a negative half cycle when T4 was equal to −1, the waveform on each DC input terminal is a symmetrical square wave ranging from 0 to +120 on the positive terminal alternating with 0 to −120 on the negative terminal. Each DC input terminal may therefore be described as having a voltage of 60 volts DC mean with a 60 Hz, 60 volt peak square wave superimposed. When connected to a solar array, such a configuration is in conformance with the NEC electrical code (2008) providing a warning label is attached indicating that both terminals of the array and DC circuit are ungrounded and thus hot. An appropriate color code for wiring to the array is black for negative and red for positive, as both colors are standard colors for AC hot legs.

Figure 5:
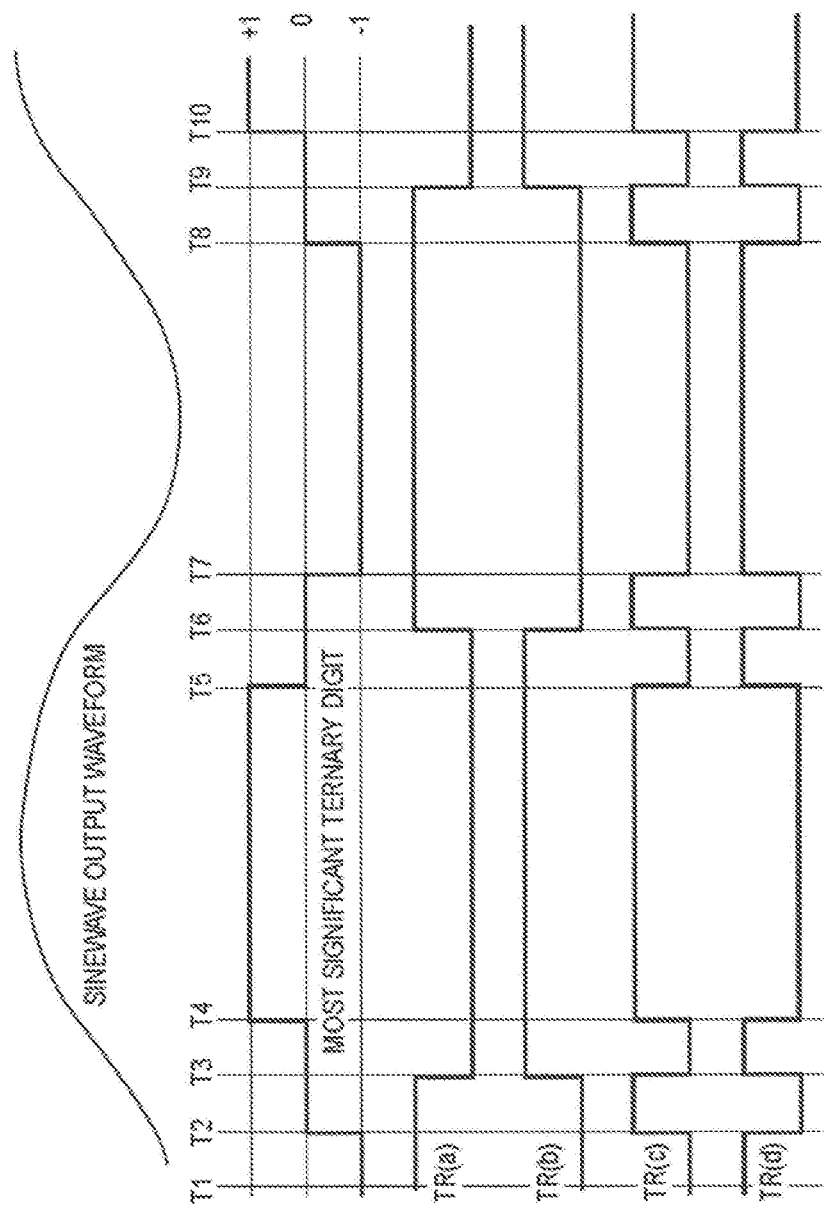
FIG. 5 shows waveforms of the 120 volt H-bridge and on the DC supply.

When the above-described pass-through states are used, the resulting common-mode square wave on the DC inputs will be slightly phase-shifted relative to the AC output. If the square wave shall be in phase with the AC output, then the pass though state of H-bridge 120a can be created by connecting the positive DC input terminal to neutral/ground for the first half of the pass through state after T4=1 and connecting the negative of the DC input to neutral/ground for the second half, and vice-versa for the pass through state following T4=−1. In this way, the square wave positive-to-negative transition coincides with the zero crossings of the AC output, as shown in FIG. 5. At time T1 on the left, the AC output is negative and the most significant ternary digit equals −1, and the DC supply +ve line is connected to neutral via MOSFET Tr(a). Accordingly the TR(a) drive waveform is at a logic 1 level, corresponding to MOSFET Tr(a) being ON. When TR(a) is ON, TR(b) must be off to avoid shorting the DC supply, which is guaranteed by connecting their opto-isolator LED's back-to-back. As the AC output rises towards zero, the most significant ternary digit goes to zero at time T2. At that point TR(c) is turned on and Tr(d) is turned off so that a pass-through state is created while leaving the DC positive line connected to neutral. The AC output goes through zero at the center of the period during which the ternary digit is zero at time T3. To synchronize the common mode AC component on the DC supply lines with the AC output, the negative of the DC input shall now be connected to neutral instead of the positive, while maintaining a pass-through state. Thus Tr(b) turns on, and Tr(a) off, while simultaneously Tr(c) turns back on and Tr(d) turns off. This results in the negative of the DC input being connected to neutral and also the H-bridge output is connected to the DC supply so that there is no net voltage supplied to the output, in conformity with the most significant digit still being zero At time T4, the most significant ternary digit becomes +1. At that point the negative of the DC input is left connected to neutral while the H-bridge output shall be connected to positive. Thus Tr(c) and Tr(d) change state. The situation now remains constant until the ternary digit next goes to zero at time T5, whereupon Tr(c) and Tr(d) change state again to create a pass-through state. At time T6 in the middle of the period during which the ternary digit is zero, Tr(a) and Tr(b) change state requiring Tr(c) and Tr(d) also to change state to maintain the pass through state until time T7. At time T7, Tr(c) and Tr(d) change state to deliver a negative voltage to the H-bridge output when the most significant ternary digit becomes equal to −1. The just-described sequence then repeats indefinitely from time T8.

If an inverter is designed in which the supply voltage (100) is not the greatest of the floating supply voltages, then the common-mode waveform caused on the DC inputs will no longer be a simple square wave corresponding to the most significant ternary digit, but will have a waveform determined by the lesser significant ternary digit associated with the lesser supply voltage. Likewise, if the invention is used to produce other waveforms for other applications, then a more complex common-mode waveform related to the sequence of a particular ternary digit is induced on the DC conductors. When such a waveform is used as the probe signal for ground leak detection on the DC conductors, it may then be beneficial to detect leakage current using a correlator that correlates for that particular waveform.

To obtain a sine wave output voltage, controller 200 of FIG. 1 represents the sine wave as numerical samples expressed in the ternary number system. When using a finite number of digits, it might be necessary to approximate the desired output voltage by the nearest ternary combination, and there are many ways in which an approximation could be constructed. For example, a ternary digit can be jittered between two adjacent values on successive instants of a high-frequency clock in order to approximate an intermediate value. This method is however reserved for a variation in the inverter design in which one of the ternary digits, e.g. the least significant digit T1, could be omitted, along with the associated components and the 4.44 volt floating supply, the value of T2 then being jittered between adjacent values at a high frequency so as to create a mean voltage between the 13.33 volt steps, thereby reducing component count. A low-pass LC interpolation filter is then connected at H-bridge 120c output to smooth the waveform. Frequent switching can be a source of additional switching losses, however switching only a low voltage supply such as 13.33 volts produces much less switching loss than jittering the 120-volt supply. A second approach is to choose the nearest ternary approximation to the desired instantaneous output voltage at a sequence of successive, equi-spaced time intervals generated by a sampling clock. Yet another approach, which is the preferred approach, is to keep the ternary value fixed as long as it is the nearest approximation to the exact voltage, and to increment it or decrement it to the next adjacent value only at the instant that a different value becomes the nearest approximation. Storing the approximately 81 time-values of this sequence of switching instants requires much less memory than storing the ternary digits at all 32768 clock instants.

One method of producing the ternary digit sequence is as follows: Let controller 200 comprise a crystal reference oscillator running at $2^{15} \times 60 = 1,966,080$ Hz. The oscillator clocks a 15-bit divider to produce a 15-bit address to a 32768×16-bit Read Only Memory (ROM) containing the precomputed waveforms required on the FET control lines of the H-bridges during one 60 Hz cycle. Symmetries, such as +/− symmetry, could be exploited to reduce memory size, if important. The buffered memory output bits drive the opto-isolators that drive the FET gates of each H-bridge to generate one of its three output voltage states at each instant and in the correct sequence.

The preferred approach uses a time counter for counting of the order of 32768 steps over a 60 Hz cycle, an address counter, and memory to store a count and an associated set of MOSFET drive signals. The address counter is initialized to the first address at an appropriate point in the power-up procedure and a set of MOSFET drive signals are read from the memory at that address, together with the next count. When the time counter reaches the next count, the address is incremented and the next set of MOSFET drive signals is read from memory, together with the next count value. In this way, the number of sets of signal values stored is only of the order of the number of waveform steps. Either method can be implemented in a suitable microcontroller, such as an 80C51, which contains suitable time-counters.

Using the above methods, it is relatively easy to construct a converter that can be selected to generate 50 Hz or 60 Hz, or even 400 Hz power by varying the oscillator frequency, the memory contents or both, or storing waveforms over a lowest common multiple period of the desired frequency selections, or computing the ternary digit sequences in real time.

The ternary representation of a sine wave of peak voltage Vo volts when the DC input voltage is Vdc may be computed as follows:

Divide up one cycle of 360 degrees into 32768 equal increments 0, θ, 2θ, 3θ . . . 32767θ where θ=360/32768 degrees.

Compute the value A equal to Vo times the SINE of each angle. Then, for each angle:

If A is greater or equal to +Vdc/2, then T4=1; if A is less or equal to −Vdc/2, then T4=−1; else T4=0

Subtract Vdc times the just-determined value of T4 from A to obtain the remainder in A.

If the remainder in A is greater or equal to Vdc/6 volts, then T3=1; if A is less or equal to −Vdc/6 volts, then T3=−1; else T3=0

Subtract Vdc/3 times the just-determined value of T3 from the previous remainder A to get a new remainder A If the new remainder A is greater or equal to Vdc/18 volts, then T2=1; if A is less or equal to −Vdc/18 volts, then T2=−1; else T2=0

Subtract Vdc/9 times the just determined value of T2 from A to get the final remainder in A If the final remainder A is greater or equal to Vdc/54 volts, then T1=1; if A is less or equal to −Vdc/54 volts, then T1=−1; else T1=0

Repeat the above determination of ternary words (T4,T3, T2,T1) for each of the 32768 angular increments.

The above algorithm can also be executed using different voltage thresholds, corresponding to other DC input voltage levels, in order to determine a ternary digit sequence that will yield the desired AC rms output voltage for the other DC input voltages.

Having determined the ternary values for each clock period, the H-bridge drive signals required for that ternary value are then stored along with the clock count at which they are invoked, thus resulting in a much smaller memory. With four H-bridges, the drive signals are conveniently packed into one byte, and slightly more than 81 entries result due to using both pass-through states for the most significant H-bridge around zero crossings, as shown in FIG. 5, which correspond to the same ternary digit of zero. In effect, two different forms of zero are used for the most significant ternary digit. In some cases it is possible that additional memory entries could be created in the event that small timing differences were needed between switching different H-bridges in order to minimize glitches.

The above ternary approximation algorithm can be executed for any set of graduated supply voltages, and for any desired output waveform or voltage. The peak output voltage should however be less than the sum of the floating DC supply voltages if clipping of the waveform is to be avoided.

A number of ternary representation sequences can be precomputed and stored for different ratios of sine wave output voltage to DC supply voltage, in steps of a few percent for example, the selection among which then provides the means to regulate the output sine wave voltage against changes in DC supply voltage.

The algorithm may alternatively be executed in real time using a microprocessor or digital signal processor. For self-test purposes, the converter is equipped with an A-to-D converter that measures and checks each voltage step against limits during the start-up sequence, and may also periodically recheck each voltage step during normal operation, for example, by sampling and digitizing a voltage step level just before a step to the next voltage level in sequence is taken. Then the time at which the just-measured voltage step is the best approximation to the desired instantaneous sine wave level can be computed, and if different than the currently stored value, the stored value may be updated. By stepping to a higher voltage step a little earlier, or a lower voltage step a little later, a small increase in the output rms voltage is achieved, while stepping to a lower voltage step earlier or to a higher voltage step later, a small decrease in rms output voltage is obtained. In this way, a continuous and fine regulation of the output rms voltage may be obtained.

It is also possible to use a clock frequency that is different than a power of 2 times 60 Hz. There may then be more or fewer than 32768 clock cycles in one converter cycle. In a preferred implementation, an 80C51 microprocessor clock is 11.0592 MHz, giving an internal clock frequency of 11.0592/6 MHz, which is 30720 clocks in one 60 Hz cycle. Consequently the ternary digit sequence is calculated in steps of 360 degrees divided by 30720. The converter may also be provided with other stored sequences that can be selected to generate 50 Hz or 400 Hz outputs, which have repetition periods of 36864 and 4608 counts respectively, when using a crystal frequency of 11.0592 MHz.

Figure 10:
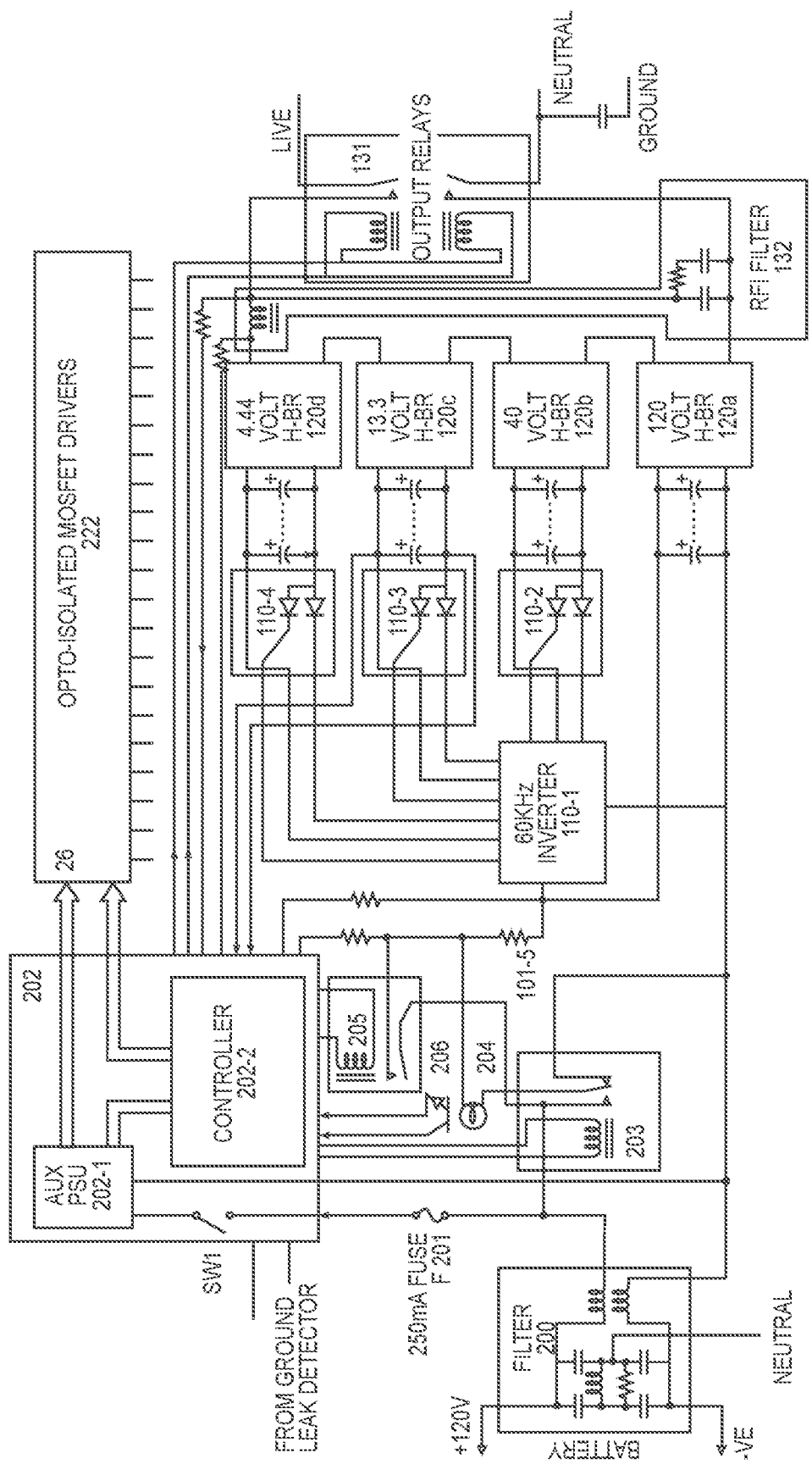
FIG. 10 shows more detail of a load inverter design according to the invention.
Figure 11:
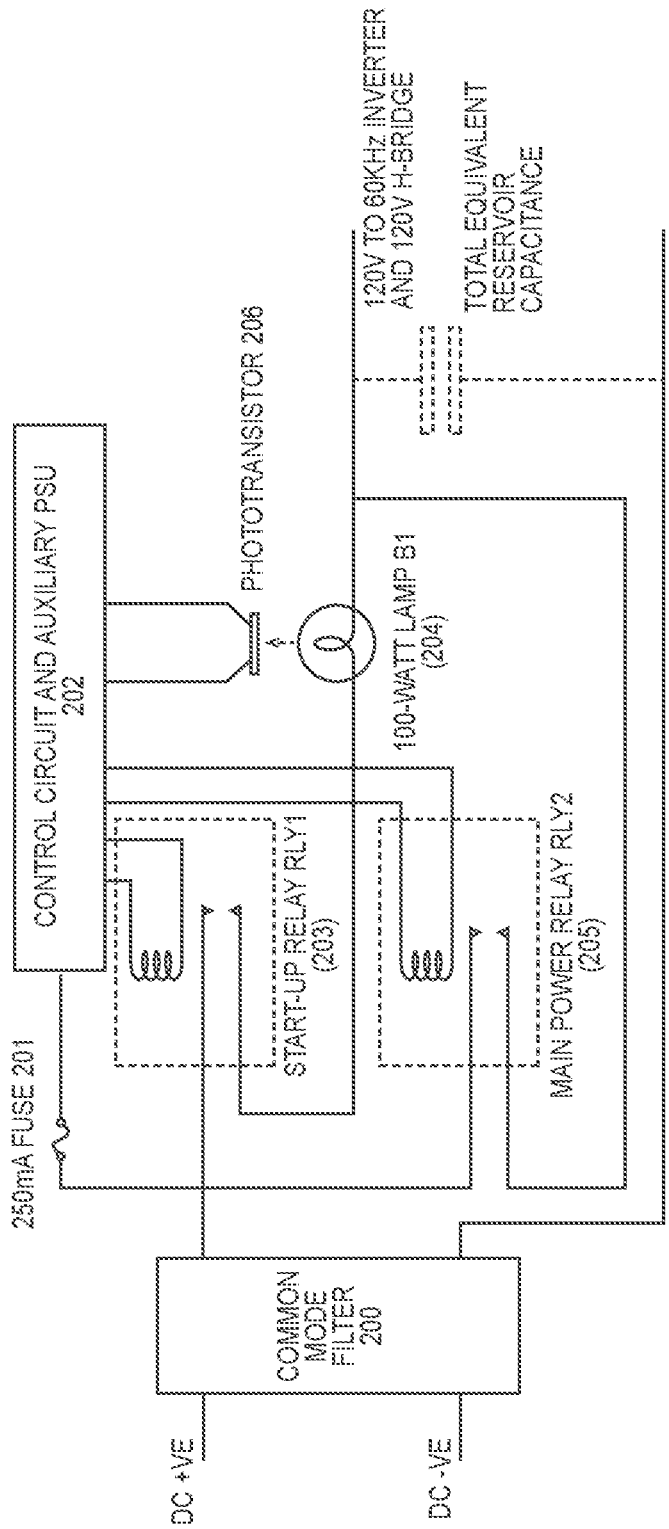
FIG. 11 shows the start up circuit for limiting inrush current.

FIGS. 10 and 11 give more circuit detail of the load convertor. FIG. 11 gives detail of the DC input circuit, showing the entry of the DC +ve and −ve lines through a common mode filter 200 into a start-up circuit comprising start-up relay RLY1 (203), 100-watt lamp B1 (204), photo-sensor (206) and main power relay RLY2 (205). DC power flows through main power relay RLY2 (205) when closed and through 100A current measuring shunt (206) to 60 KHz bidirectional DC-DC inverter (110) and to 120-volt H-bridge 120*a*. Bidirectional DC-DC inverter 110 generates the floating DC voltages of 40 v, 13.33 v and 4.44 volts for the other three H-bridges 120*b,c* and *d*. Each of the DC voltages produced by the bidirectional DC-DC inverter is decoupled with a substantial reservoir capacitor, which however is not essential to the operation of the inverter. There are two advantages of using reservoir capacitors however:

(1) To reduce copper losses n the 60 KHz inverter transformer windings by smoothing out current demand, and (2) to reduce low-load or no-load standby power.

Both of these will be explained in more detail later. Upon switch on, these reservoir capacitors would cause a substantial and potentially damaging inrush current to flow for some fraction of a second, which it is the purpose of the start-up circuit of FIG. 11 to reduce to safe values. The start-up circuit also permits the whole inverter to be powered up stage-by-stage while checking for faults at each stage so that start up may be aborted if faults exist that could cause a cascade of other component failures.

Referring to FIG. 11, the DC + and − input terminals are connected through common mode filter 200 to control circuit and auxiliary power supply unit 202 via a 250 mA fuse 201. Upon applying a DC input to the input terminals, auxiliary PSU 202 starts operating and powers up the control circuit, which may contain a microprocessor. After performing self checks to verify that the control circuit initialized itself correctly, ensuring that all output relays and the start-up and main power relay are in the OFF position, and all H-bridge transistors are off, the control circuit closes start-up relay RLY1 (203), the coil of which is powered from the already operating auxiliary PSU (202), to connect the DC positive line through 100-watt lamp (204) to the input of the 60 KHz bidirectional DC-DC convertor (110). The DC-DC convertor power transistors and synchronous rectifier transistors are commutated at this point so that DC flowing through lamp 204 will be converted to the desired output voltages, charging all reservoir capacitors at a rate determined by the limited lamp current. For the purpose of analysis, the total reservoir capacitance transformed through the 60 KHz inverter transformer ratio may be just lumped into a single value, shown dotted in FIG. 11. The current required to charge this capacitor is sufficient to light the 100-watt lamp for a second or so, the lamp dimming as the capacitor charges towards 120 volt. The lamp 204 thus limits the inrush current to perhaps 7 amps when the filament is cold, falling to 0.8 amps when the filament is at full brightness, and then falling further as the capacitance charges up towards 120 volts. The charging is faster than exponential, as the resistance of the lamp reduces from 150 ohms at full brightness to about 18 ohms as it cools. The use of a lamp instead of a series resistor has this benefit of faster charging, and also is able to dissipate 100 watts as long as necessary, whereas a 100 watt resistor would need heat-sinking and would be more expensive.

If any fault exists which causes the 60 KHz inverter, or any H-bridge, which is supposed to be off, to take current, then the no-load current through the lamp will not drop to zero, and will be high enough to cause the lamp to remain partially lit. After allowing 2 seconds for normal start up, such a fault condition is detected using phototransistor 206, which is in close proximity to lamp 204, and the control circuit aborts start up and opens start-up relay 203 upon detecting the abnormal condition. Assuming however that the lamp does not remain lit, after two seconds the control circuit concludes that all reservoir capacitors have been successfully charged and that no abnormal no-load current exists. The control circuit also requires to have seen the lamp light briefly after the start-up relay is closed, thus verifying the integrity of the lamp and the phototransistor. If the lamp does not light briefly after closing the start-up relay, the start-up sequence may be aborted. Automatic retries may optionally be programmed to occur up to a limit.

After the reservoir capacitors are charged, the main inverter H-bridges are operated off load with the AC output relays open. FIG. 10 shows more detail of the complete single-phase load converter. Referring to FIG. 10, the DC input enters via common-mode filter 200 to the startup circuit just described with the aid of FIG. 11. The start-up circuit switches the filtered DC input through a 100-amp current shunt (101-5) to 60 KHz inverter 110-1 and 120 volt H-bridge 120*a*. 60 KHz inverter 110-1 together with synchronous rectifiers 110-2, 110-2 and 110-4 constitute the bidirectional DC-DC converter of FIG. 2. Each synchronous rectifier has an output reservoir capacitor and is connected to an associated H-bridge, 120*b, c* or *d*. The four H-bridges are driven by four corresponding sets of four optoisolated MOSFET drivers (222). Each synchronous rectifier uses two further MOSFET drives and the 60 KHz inverter uses two MOSFET drivers, making 26 in total. The MOSFET drivers require 12-15 volt power supplies. Two MOSFET drivers can use the same 15-volt supply if they drive MOSFETs that have their sources connected. Thus, using the transistor identifications of FIG. 3, one 15-volt supply is required for H-bridge 120*a* TR(b) and TR(d); another. is required for H-bridge 120*b* TR(b) and Tr(d) and the transistors of its associated synchronous rectifier 110-2; a third is required for H-bridge 120*c* and its associated synchronous rectifier 110-3; a fourth for H-bridge 120*d* and rectifier 110-4 and a fifth for 60LHz inverter 110-1. Other isolated supplies may be required for microprocessor controller and waveform generator 202-2 and for various overcurrent, undervoltage and overvoltage sensors. All these supplies are produced by auxiliary power supply 202-1. Auxiliary supply 202-1 comprises a low-power, switch-mode regulator producing high frequency AC which is distributed to the location on the printed circuit board at which an isolated supply is needed, where it is transformed to the desired voltage using a small toroidal isolating transformer followed by a diode rectifier. Distributing AC and isolating and rectifying it at destination has the benefit of reducing PCB tracking congestion.

The output from H-bridge 120*d* is coupled back to controller 202-2 where the instantaneous output voltage can be sampled and digitized by an A-to-D convertor. Each ternary step can thus be tested in turn during the start-up sequence by measuring the output voltage produced. If all ternary steps look normal and lamp 204 did not light in the process, the conclusion is that all H-bridge transistors are operating normally with neither short nor open circuits, giving a very low no-load current. The H-bridges are then operated to generate the normal step approximation to a 120 volt RMS sine wave. Again assuming that lamp 404 remains unlit, the inverter is now generating the desired 60 Hz output with no abnormal no-load current. The main power relay (205) is then closed, which shorts out the lamp and start up relay to allow high currents to flow when the AC load is connected.

Note that relay 205 closes only when there is zero volts across its contacts and zero current through it. This permits it to be a very much lower cost relay than one with sufficiently robust contacts to make or break full load many times. 60 Hz generation is then temporarily suspended by controlling the four ternary H-bridges to the open circuit condition so that the AC output relays may also be closed with no voltage across them and no current though their contacts. 60 HZ generation is then resumed to deliver AC power to the load, and if no current overload is detected, the inverter has successfully executed a safe start-up. Both the main power relay and the AC output relays derive their coil power from the 13.33 volt output of the 60 KHz inverter, so that any failure of the DC-DC converter forces those relays to the open condition. Moreover, the auxiliary PSU is diode-protected such that it will neither power-on nor be damaged by connecting the DC input with reverse polarity. The start-up relay cannot therefore be operated if the DC input is of the reverse polarity, thus protecting polarized electrolytic capacitors and the H-bridge switches from accidental damage.

Power down of the inverter can be initiated by a user OFF switch or by detection of any of the following fault conditions, which are not necessarily exhaustive:

Over- or undervoltage at the DC input
Overcurrent from the DC supply
Excessive AC current
Overtemperature on the heat sink
Lamp 204 becoming lit
Abnormal AC output voltage waveform The above fault conditions may be arranged to cause substantially instantaneous cessation of inverter operation.

A normal Power down occurs in approximately the reverse order to power-up. Firstly, commutation of the ternary H-bridges ceases and they are switched to the open circuit condition. The AC output relays 131 are then opened, which occurs with zero volts across the contacts and zero current through them. The main power relay (205) is then opened, which occurs with no current flowing through it and zero volts across its contacts. Finally, the start-up relay 203 is de-energized, which connects the reservoir capacitance through the lamp to ground, discharging it. The 60 KHz inverter continues to operate while the reservoir capacitors are discharging, but is deactivated after a few seconds. The control circuit can check whether lamp 204 lit momentarily during the capacitor discharge sequence, as it should. The inverter is then ready to begin a power-up cycle once any fault condition is cleared. Automatic restart attempts can be programmed to occur up to a specified number of retries, if desired.

Figure 13:
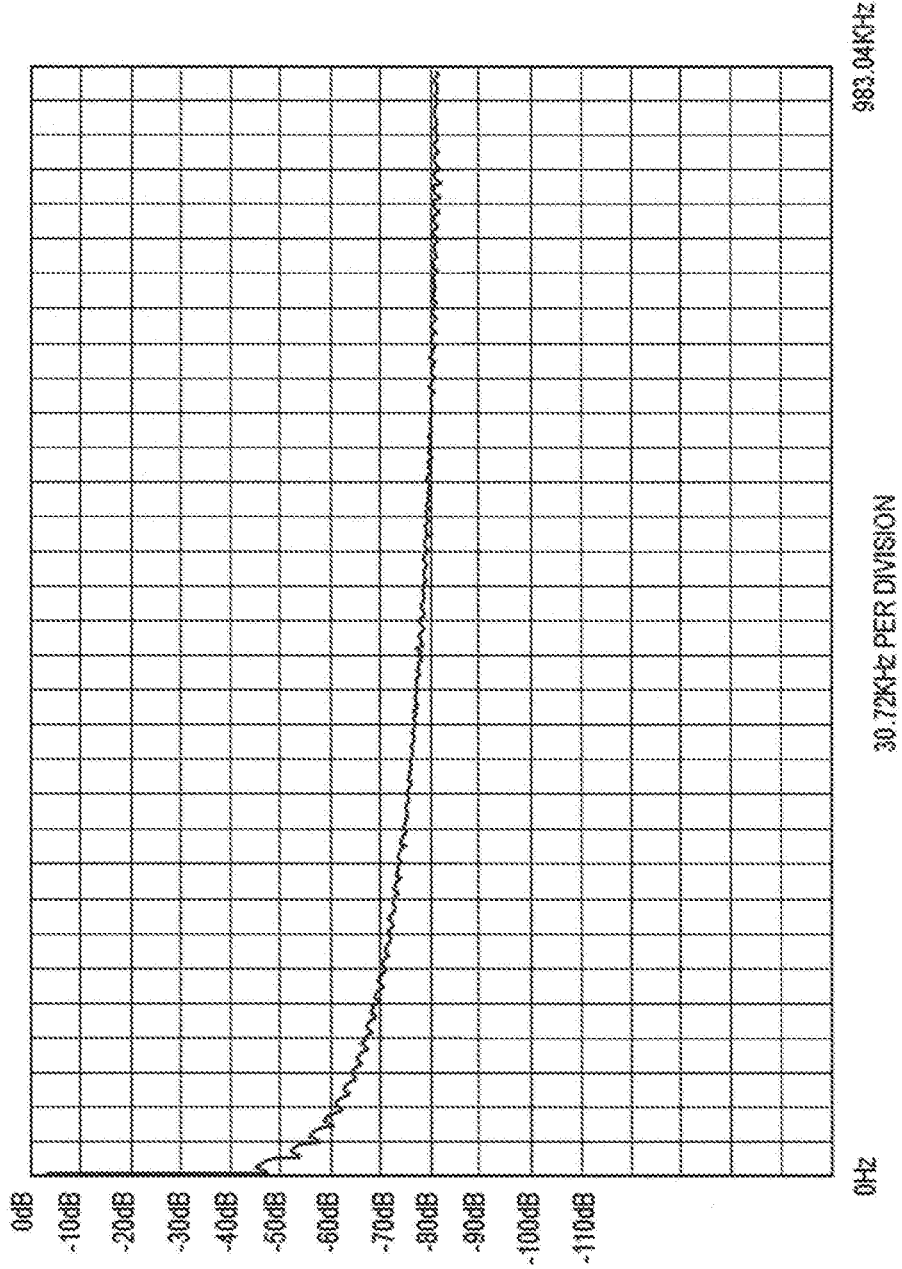
FIG. 13 shows the output spectrum from the converter before RFI filtering.

FIG. 12 shows the ternary approximation of the sine wave output from the inventive load convertor. A feature of this invention is that all the voltage steps are of approximately the same size, but have a varying dwell time according to how fast the sine wave is changing. This gives a well-spread approximation error spectrum with no dominant harmonics. FIG. 13 shows the amplitude of each harmonic of 60 Hz up to 16384×60 Hz, which is in the middle of the medium waveband.

The Medium Wave frequency band begins at about half way from center, where the spectral energy in any 9 KHz AM radio channel is seen to be 78 dB below the main 60 Hz component. For a 5 kW (+67 dBm) convertor, this is a level of −11 dBm in the 9 KHz bandwidth of an AM radio. This is still a high level of radio noise, and interference with radio and TV reception from Medium Wave all the way up to VHF TV frequencies has been observed when using prior art convertors. Such interference is called "inverter hash" and has been known since the days or rotary convertors, or dynamotors, where it was due to commutator/brush noise. Thus, despite the good sine-approximation evident in FIG. 12, the sheer power of the convertor requires that additional hash suppression be used when operating close to sensitive radio receivers. Suppression of radio interference shall be at least sufficient to meet FCC part 15 specifications, but greater suppression is often desirable.

Figure 8:
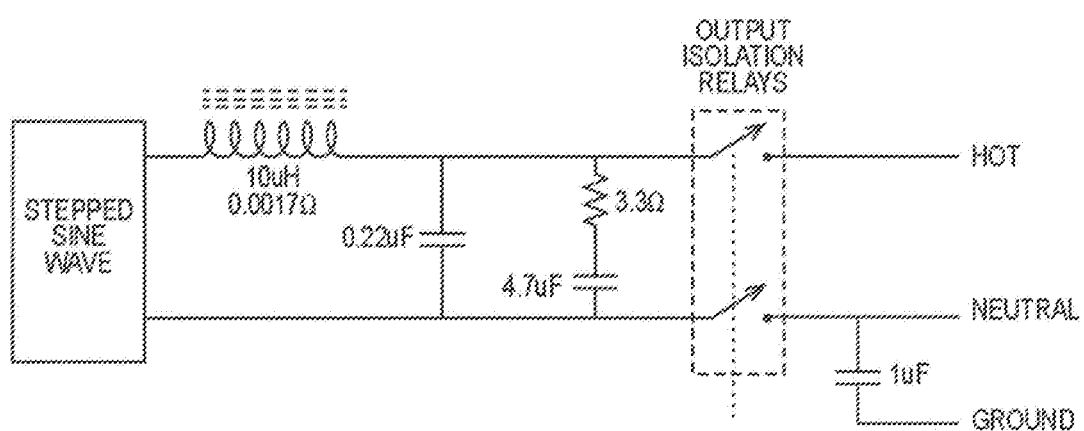
FIG. 8 shows an RFI filter used to suppress high frequencies on the output.
Figure 14:
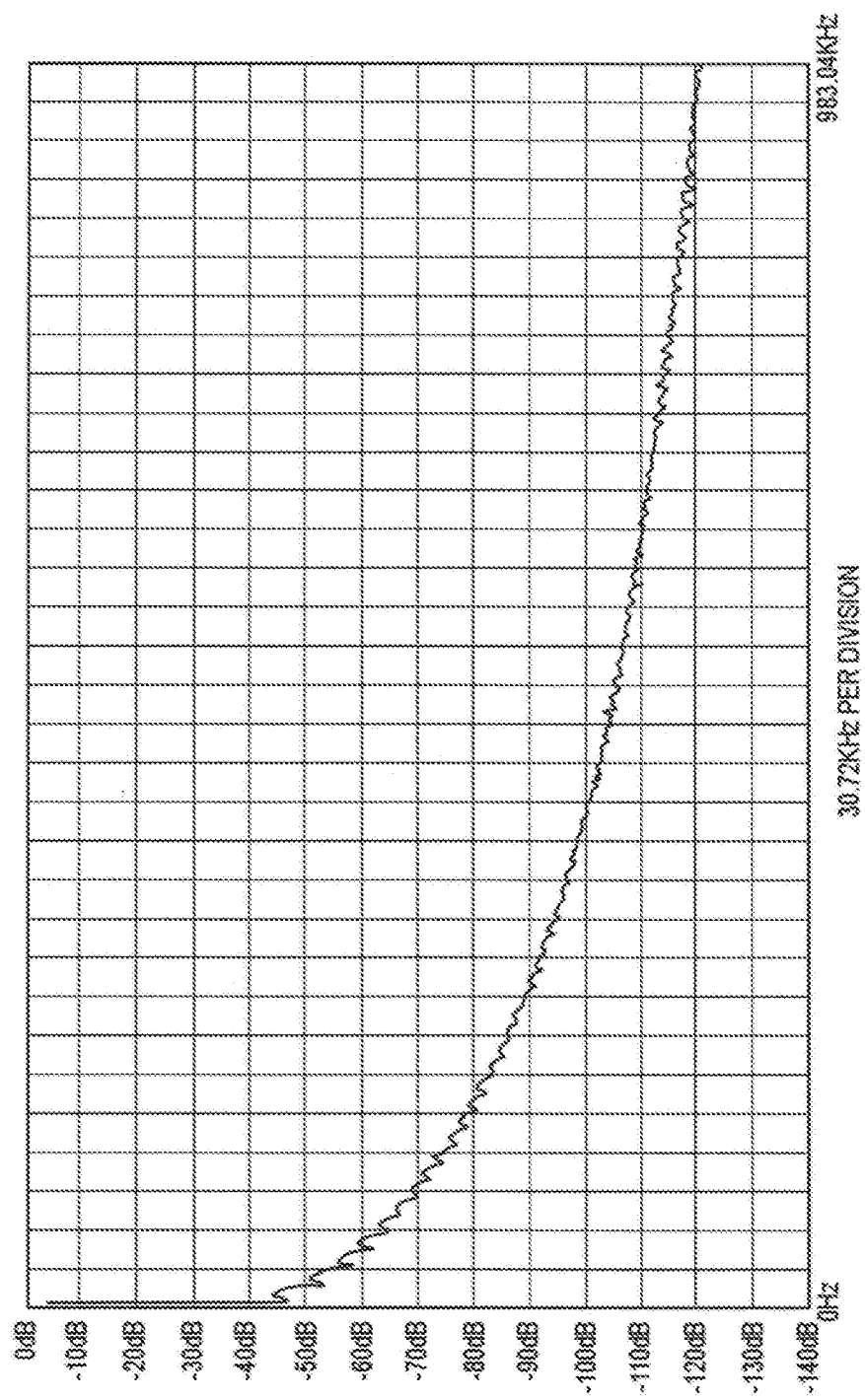
FIG. 14 shows the converter output noise spectrum after RFI filtering.

FIG. 10 shows more detail of a complete load converter, including RFI filters at both the DC input (200) and the convertor output (131). The RFI filters are required, as the output will be distributed around the house wiring in a residential application. A suitable $2^{rd}$-order LC filter is shown in FIG. 8. FIG. 14 shows the reduction in medium-wave interference to 98 dB below the inverter output when using the filter. This additional 20 dB of suppression of inverter hash. substantially eliminates interference at medium wave and above with radio and TV in the same location.

As later discussed in relation to common mode filtering on the DC side, RFI filters preferably include damping resistors as well as capacitors and inductors, to ensure that no high-Q resonances occur at any frequency when connected to arbitrary house wiring and appliances. This is the purpose of C2 and R1 in FIG. 8. These components are chosen also to minimize ringing and overshoot on no load.

Figure 9A:
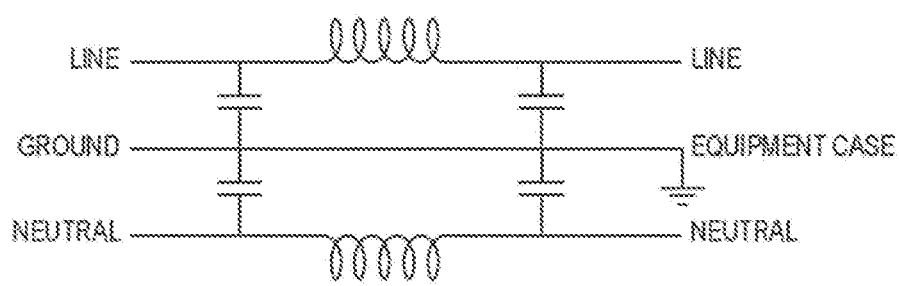
FIGS. 9A and 9B show the difference between a correct and an erroneous RFI filter.

FIG. 9 emphasizes the difference between a safe RFI filtering circuit (9B) and an unsafe RFI filtering circuit (9A). Unfortunately, the unsafe circuit of FIG. 9A is in widespread use on the input power connectors of Personal Computers, VCRs and the like, and electronic technicians quite commonly experience shock from laboratory benches due to the use of such filters in laboratory test equipment, when the ground is temporarily lost, as can happen accidentally or deliberately in a dynamic R&D environment for various reasons. It can also result in inadvertent damage to expensive equipment upon accidental or deliberate disconnection of the equipment ground.

With the prior art circuit of FIG. 9A, should the ground connection to the equipment fail, the line voltage will be divided in two by the potential divider formed by the filter capacitors, and the chassis or case of the equipment will become live to the touch, at about 60 volts 60 Hz AC (in the US) or 120 volts 50 Hz (in Europe). The current is limited when the filter capacitors are small, e.g. 0.01 uF, but can still be felt as an electric shock, and is very unpleasant if the equipment is a medical device attached to a catheter, for example. Moreover, when several pieces of equipment are used together, as in a rack or a lab bench, the net current can reach more dangerous levels. For an entire household, the typical ground current that can be measured flowing down the grounding rod is often as high as 50 mA, arising from all installed appliances such as TV sets, computers, VCR's, washing machines etc.

Figure 9B:
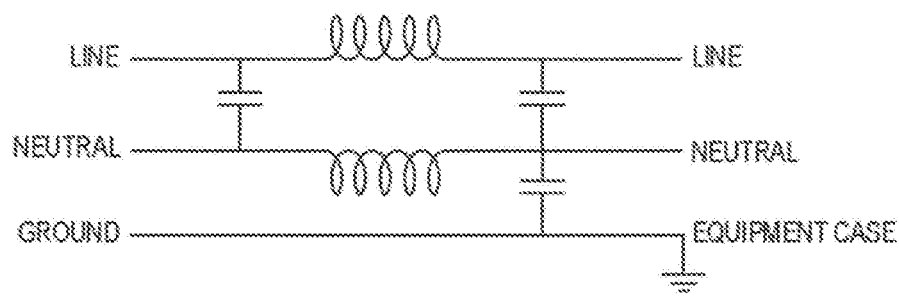

FIG. 9B shows the safer form of RFI filter. In FIG. 9B, the filtering capacitors decouple the hot line to the neutral line, not the equipment ground as in FIG. 9A. The neutral line is then decoupled to the equipment ground with another capacitor. In this way, should the ground become disconnected, the chassis or case of the equipment is only connected via a capacitor to the neutral line, not the hot line, thereby avoiding a safety hazard. It would require both the ground and the neutral wire to fail while the hot line remained intact, in order to cause the case or chassis of the equipment to become live when using the RFI filtering circuit of FIG. 9B, which is therefore a safer arrangement.

For the reasons given above, the output RFI filter comprises a series inductor in the 120-volt AC hot leg output, and capacitors C1 and C2 connect to neutral, not equipment ground. Furthermore, the neutral output is decoupled to equipment ground through the neutral output isolating relay contacts. In this way, when the output relays are open, there is no path to ground for the inverter, battery or array circuits, not even through the 1 uF neutral-ground decoupling capacitor, thus ensuring complete isolation of the DC circuits when the inverter is not operating.

Figure 6:
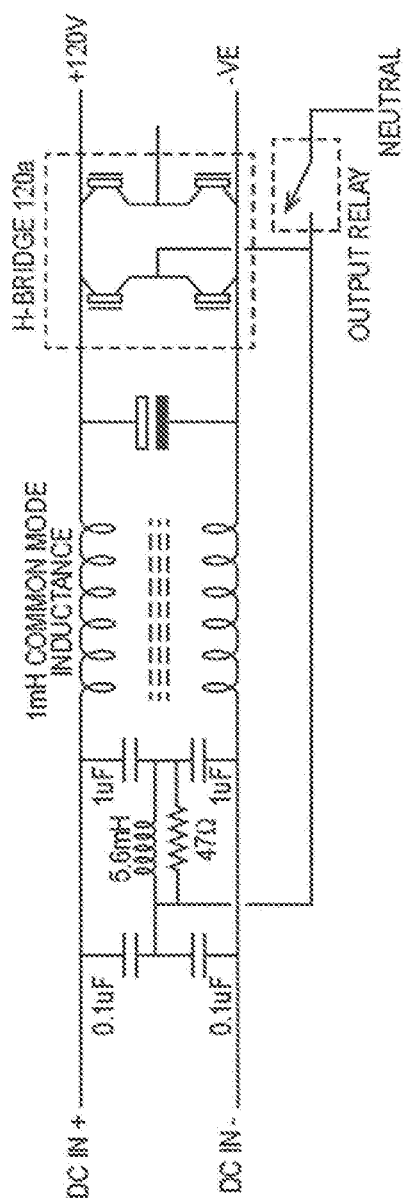
FIG. 6 shows a common mode hash filter.
Figure 7:
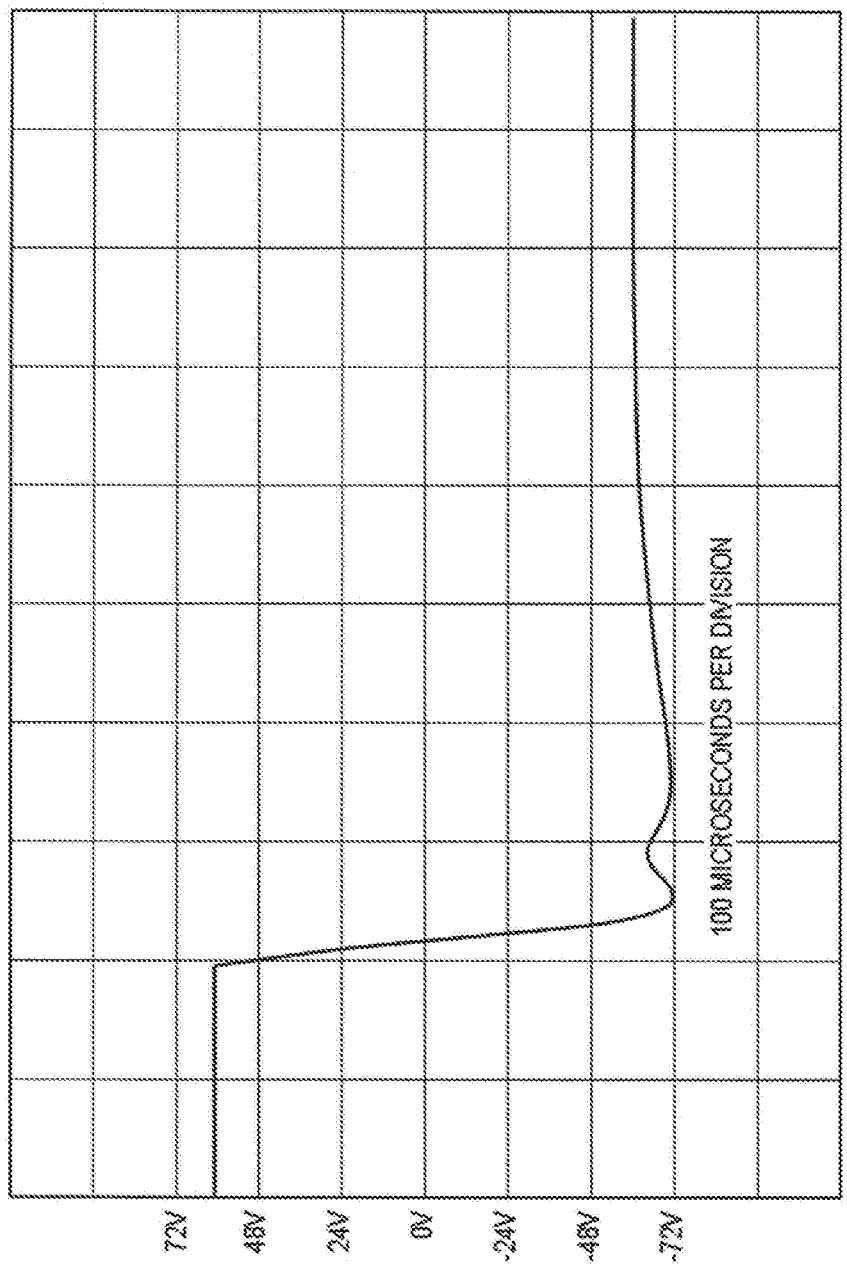
FIG. 7 shows details of the transient response of the common mode hash filter.

FIG. 6 shows the common mode hash filter used on the DC input. This also returns the decoupling capacitors to neutral rather than equipment ground for the reasons discussed above. A common-mode filter is used due to the square wave exported to the DC input lines being in phase on both terminals. The purpose of this filter is to slow the rise and fall times of the edges of the 60 Hz square wave in order to avoid exporting radio interference to DC equipment such as the solar array and battery. The DC lines from the array may be protected against induced static during thunderstorms by means of gas discharge surge arrestors, and it is desired to avoid peak voltages due to filter overshoot under normal operation that could cause premature ignition of the surge arrestors. FIG. 7 shows the transient response of the common mode hash filter of FIG. 6, after optimization of component values for minimum overshoot.

Figure 2:
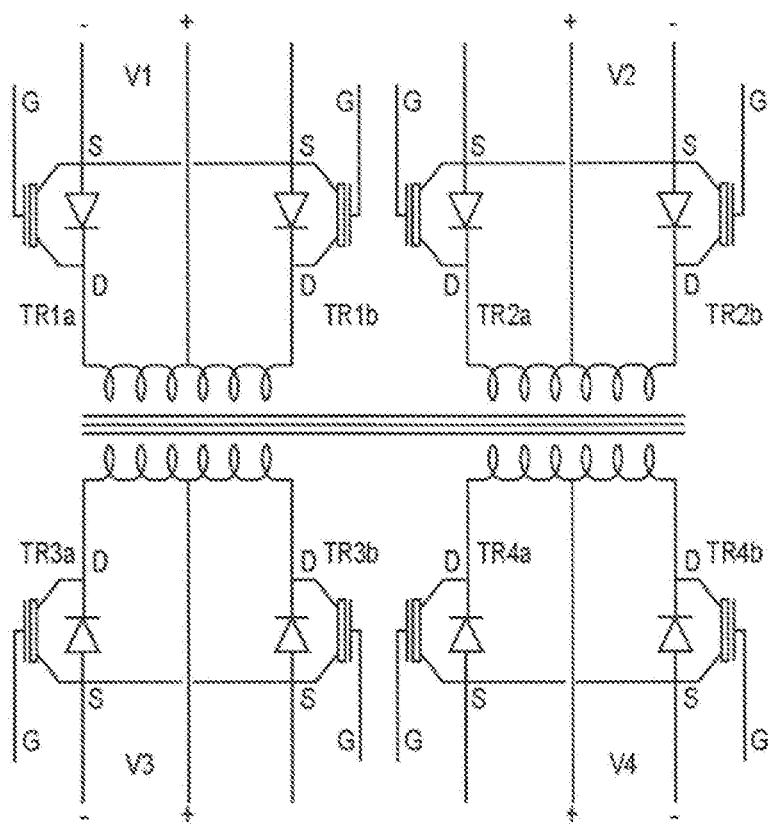
FIG. 2 shows a bidirectional DC-DC converter.

FIG. 2 shows a bidirectional DC-DC convertor for providing various floating DC output voltages such as Vdc/3. Vdc/9 and Vdc/27 using a DC source of Vdc volts. The DC-DC converter uses a high switching frequency such as 60 KHz, enabling the transformer to be much smaller than would be required for 60 Hz operation. The transformer in FIG. 2 has four windings, which have turns ratios N1:N2:N3:N4 in proportion to the voltage ratios V1:V2:V3:V4. For the purposes of explanation, each winding has been shown as a center tapped winding with the center taps connected to the positive terminal of the DC inputs or outputs and the ends of the windings connected to the drains of N-type MOSFET pairs. Power MOSFETs generally comprise a drain-to source body diode which is shown as part of the transistor.

One of the transistor pairs, for example TR1a and TR1b, is commutated at 60 KHz and a voltage V1 is applied to that input. The other transistor pairs are commutated in synchronism and form synchronous rectifiers. For example, TR2a is switched on when the transformer winding end to which its drain is connected goes negative, thereby transferring the negative voltage to the −ve terminal of the V2 output. Likewise TR2b is switched on when its drain goes negative, and the drain of TR2a goes positive, TR2a is switched off when its drain is positive and thus does not pass current. Thus a DC voltage V2 is produced at the V2 output which is N2/N1 times V1, where N2 and N1 are the numbers of turns on the respective transformer windings. It can be seen that the input circuit for V1 is indistinguishable from any output circuit. Thus any one of the transistor pairs can function either as an inverter commutating a DC input or as a synchronous rectifier producing a DC output. Thus power flow can be from any port to any other port depending on whether the port is sinking current or sourcing current. This is important to the operation of the inventive load converter as power flows in the reverse direction whenever a ternary digit has the opposite sign to the instantaneous output voltage, or if the AC output current is not in phase with the AC output voltage due to the non-unity load power factor of a reactive load.

In a preferred implementation of the converter, the commutator used to connect the 120 volt supply to the transformer is a full H-bridge, eliminating the primary center-tap and simplifying the transformer. The 40 volt, 13.33 volt and 4.44 volt windings are however center tapped and connected to synchronous rectifier MOSFET pairs as shown in FIG. 2. Using a transformer center tap is simpler than using a full H-bridge synchronous rectifier, as each synchronous rectifier can share a gate driver supply with the H-bridge it powers, since their sources are common. Moreover, the transformer can be divided into two or three transformers with their non-center-tapped primaries paralleled in order to obtain convenient sizes and avoid wiring concentration. In a preferred implementation, a first transformer has a 120 volt primary and a center tapped 40-0-40 secondary, while a second transformer has a 120 volt primary and center tapped 4.44-0-4.44 and 13.33-0-13.33 volt secondaries. Providing the 40 v supply from a first transformer and the lower voltages from a second transformer results in identically-sized, small transformers.

In designing a DC-to-DC converter, a trade off must be made between switch losses, copper loss in the windings and hysteresis loss in the core. Using a higher frequency gives fewer turns of thicker wire, but core and switch losses increase. In the 60 KHz region, skin-effect is significant for smaller wire than 23 AWG, so Litz wire comprising many strands of 23 AWG is used to reduce copper loss.

Core loss persists even when the output power is zero, which can be a significant contributor to standby (no-load) current. In the inventive load converter, standby current due to core and switching losses in the DC-DC converter is reduced by use of a novel waveform. Firstly, the 40, 13.33 and 4.44 volt outputs of the DC-DC converter are provided with large reservoir capacitors. This has the first benefit that current in the transformer windings is proportional to the mean DC current of each output, rather than the peak current, thereby reducing copper losses in the windings. A second benefit is that the reservoir capacitors can supply the low currents required for light loads for at least one or more cycles of the 60 KHz switching frequency, enabling switching cycles to be periodically omitted. For example, if the load current is only 1/10th the peak output capability, then every alternate DC-DC converter switching cycle can be omitted and all the transistors of FIG. 2 are held in the off state during the omitted cycle. In this way, core and switching losses are halved at 1/10 maximum power output. At even lower power outputs, for example 1/100th the maximum, it may be chosen to omit 9 out of 10 DC-DC converter switching cycles, which reduces the core and switching losses even further. Upon detecting an increase in load current or reduction of any voltage, the number of omitted switching cycles may be instantaneously reduced in anticipation of the need to supply greater current to the reservoir capacitors.

FIG. 21 exemplifies the novel DC-DC converter waveforms. FIG. 21A shows the DC-DC converter switching waveforms when operating continuously with no omitted cycles. FIG. 21B shows the switching waveforms when alternate switching cycles are omitted, and FIG. 21C shows omitting three out of every four switching cycles. This method of reducing switching losses at light load is different than merely reducing the switching frequency. If the switching frequency were reduced instead, the volt-time integral into the transformer on every half cycle would increase, increasing the peak flux density and potentially causing core saturation. Keeping the positive and negative half cycles the same length in microseconds while omitting cycles does not increase the flux density however.

An alternative waveform for reducing switching frequency would be to space the on periods of TR1b - - - TR4b midway between the on periods of TR1a . . . . TR4a. However this has some consequences for transformer and controller design and is not the preferred method. The preferred method of omitting complete cycles has the advantages that the transformer flux is reset to zero after each non-omitted, complete cycle, and that all transistors can use the same control waveforms.

An isolated positive pulse or half cycle followed by a negative pulse or half cycle may be referred to as a "doublet". The inventive power-saving waveform for light loads may therefore be described as driving the DC-DC converter with doublets, the spacing between successive doublets being increased as the current demand reduces.

Figure 25:
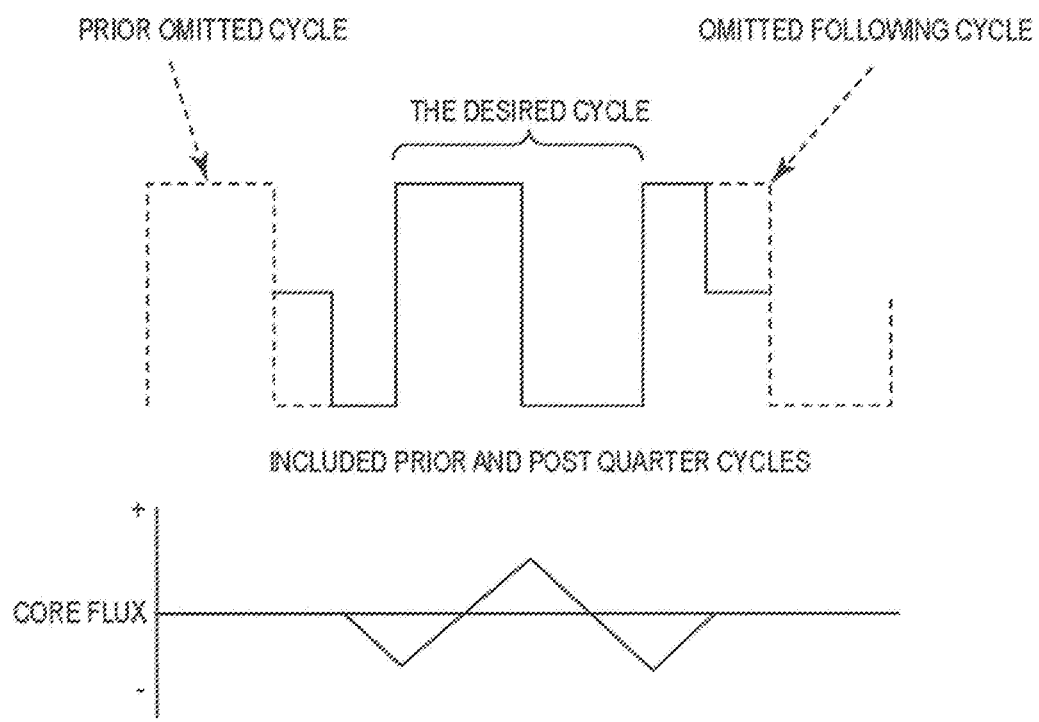
FIG. 25 shows a modified doublet and core flux waveforms.

Power transformers exhibit an "inrush current" phenomenon, which occurs when power is suddenly supplied to the transformer at a voltage zero crossing. The flux in the core rises to a maximum during the first half cycle, and then falls to zero during the reverse-polarity half cycle. However, that implies a DC bias to the flux, which therefore swings between zero and twice the normal peak. This DC bias decays due to winding resistance after several cycles, but meantime may cause core saturation and greatly magnified inrush current. To prevent this, it is advantageous to modify the waveform of the doublet by including the last quarter-cycle of the previous (omitted) cycle and the first quarter cycle of the following (omitted) cycle, thus preventing the flux density in the core from exceeding its normal steady-state value. The modified doublet and the attendant core-flux waveform are shown in FIG. 25. It is known from the art of solid state relays to employ peak switching of AC voltages into inductive loads precisely for avoidance of inrush current, as just described.

Since high-frequency transformers must operate at much less than saturation flux density in order to reduce core loss, typically at around 100 to 200 milliTeslas, it may not be necessary to use the more complex modified doublet waveform of FIG. 25 when omitting cycles. The choice between the waveforms of FIGS. 21 and 25 should be made in dependence of the DC-DC transformer design and the properties of the magnetic material used for its core.

A 7.2 kilowatt single-phase standalone inverter has been designed according to the above principles using a single 4-layer printed circuit board (PCB) of size 12"×14" for all higher-power and high-current components and one smaller 4-layer PCB for microprocessor and control functions. The power board uses a "maximum-copper" layout, in which heavy-current conductors are of the widest possible dimensions, formed through removing copper in narrow strips to isolate different circuit nodes, thereby leaving the maximum amount of copper, rather than the conventional PCB layout technique of defining narrow tracks of copper where conductors are required and etching away everything else. Power transistors requiring heat-sinking are contained within a 14"×5" section in the middle of the board and have their leads soldered to the board on the component side, so that no leads or solder bumps protrude to the other side, which may then be bolted flat to a metal heatsink forming part of the case of the inverter. The inverter, as with other equipment designs described herein, may be designed to be mounted flush with Sheetrock in the 14" gap between two studs at the standard 16" spacing in US residential wood-frame construction. The outer gridded surface of the heatsink is inside the wall, and louvered vents may be placed above and below the inverter to provide convective airflow as necessary, the gap between studs acting as a chimney to enhance convection. A thermistor on the heatsink protects the inverter from over-temperature in the event of use at maximum power for prolonged periods with restricted airflow.

While the above-described load converter provides some proportion of a household or business electricity needs and provides a desirable battery back-up facility, the timing of the demand is not necessarily correlated with solar irradiation, which is the purpose of storing energy in a battery for future use. Currently, lead acid batteries are the only economic storage solution, but this may change if electric vehicle battery research and their large production volume succeeds in reducing the cost of other battery types. In general, storage batteries, and lead acid batteries in particular, survive only a finite number of charge-discharge cycles before replacement becomes necessary. To prolong life, it is desirable to avoid 100% depth of discharge on a regular basis, and to allow normally only 20% depth of discharge, except during the emergency situation of a utility outage. Using 10, 12-volt, 100 ampere-hour, deep-cycle batteries, the energy storage available during a utility outage would thus be 12 kilowatt-hours, which will run essential household appliances for a considerable period. Only 20% or 2.4 kilowatt hours should be used regularly however. Thus it is only possible to defer 2.4 KwHrs of consumption of solar energy to a later period of the day without using a much bigger battery. Some of this supply-demand timing mismatch can be resolved by using smart devices to start loads, such as a dishwasher, according to a timer, or even according to solar illumination. Another possibility is to divert solar energy in excess of battery charging needs to HVAC or other diversionary load. However, there is a limit to how much solar array energy can be absorbed by a household immediately due to the very varying demand and supply curves. To improve the supply-demand match, solar energy can be diverted to the utility grid where the demand curve is averaged over millions of users. This is the purpose of a grid intertie inverter.

Figure 27:
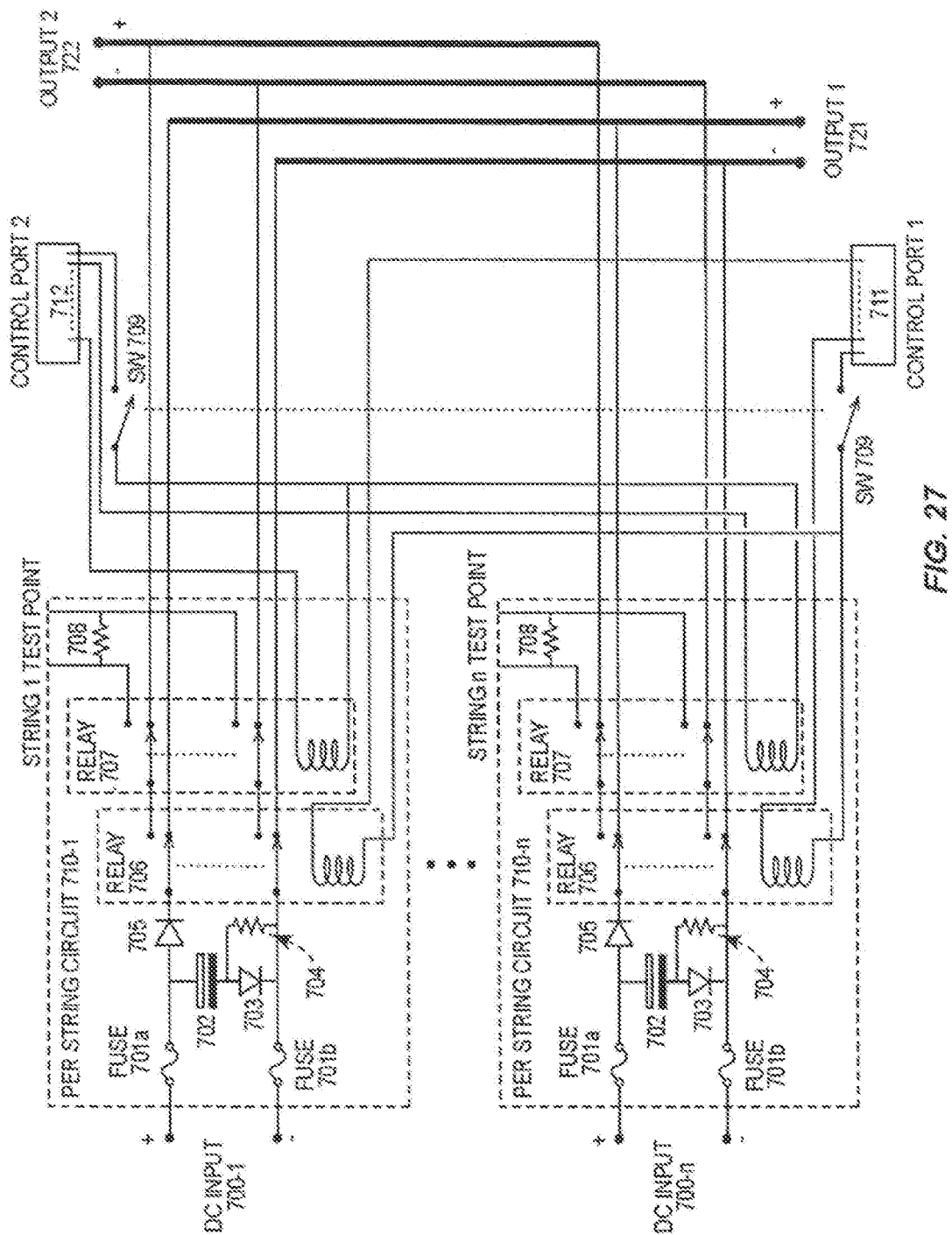
FIG. 27 shows a remote-controlled solar combiner and DC disconnect.

Before describing the inventive grid-tie inverter in more detail, a solar combiner is described that assist smart energy management in a complete installation. The circuit of solar combiner 700 is shown on FIG. 27. A number of DC inputs 700-1 to 700-n may be connected to the terminals of individual solar panels or different strings of solar panels. The inputs are isolated and have separate −ve and +ve terminals for wiring to the solar array. Each pair of input wires is connected to the input of a respective per-string circuit 710-1 to 710-n. Each per-string circuit comprises fuses 701a, 701b on both the positive line and the negative line to protect wiring from fault conditions. Each DC input line then proceeds through snubber circuit (702,703,704) and blocking diode 705 to DPDT relay 706. Blocking diodes 705 prevent reverse current flow to any string or panel exhibiting lower voltage than the other strings, for example when a panel is shadowed. When properly selected, blocking diodes have a voltage drop of around 0.6 volts, so there is a compromise between the diode loss and the current loss due to shadowing without diodes. For array voltages below about 36 volts, it may be more efficient to omit the blocking diodes and tolerate shadowing loss, while it is more efficient to employ them for higher array voltages. An advantage of blocking diodes is that they also prevent blowing a fuse if a string is accidentally short-circuited. Blocking diodes may also be desirable for lower array voltages if a substantial fraction of the total number of strings can be simultaneously shadowed.

Snubber circuit comprising capacitor 702, diode 703 and resistor 704 operates in conjunction with blocking diode 704 to protect the contacts of relays 706,707 from high inrush current and arcing on making or breaking. Consider for example that the load on output 1 comprises a large capacitor, e.g. the reservoir capacitor on an inverter. When relay 706 is closed to route current to output 1, the load may instantaneously appear like a short circuit, pulling the voltage of the positive line down to the potential of the negative line. This negative going transient passes through capacitor 702 and reverse biases diode 703, so that the only current that flows is the array short circuit current, which is inherently limited, plus the current flowing through resistor 704 to discharge capacitor 702. The load voltage then rises smoothly with relay 706 contacts closed and capacitor 702 charges through resistor 704 to the same voltage. When relay 706 contacts open to disconnect the string from the load, the string voltage attempts to rise, and the positive going transient passes through capacitor 702 to forward bias diode 703, which therefore caps the voltage rise at about 0.7 volts. Thus the relay contacts are only required to break load current with 0.7 volts across them. In another situation, the load may already be charged or powered by other strings when relay 706 closes. If capacitor 702 is not already charged, blocking diode 706 will prevent a high back-inrush current from the load, leaving capacitor 702 to be charged only by the inherently limited array current. A suitable capacitor 702 is about 220 uF with a working voltage above the highest open circuit string voltage with which the combiner is intended to operate.

One positive and one negative output contact from each of relays 706 are paralleled to the DC output bus connected to output 1 terminals 721. Each relay may be controlled, via control port 1, to connect its associated string to output 1. Thus the combiner can be remotely controlled via control port 1 to deliver the current of 0, 1, 2 . . . n strings to Output 1. Typically, 8 relays (706) would be driven by a relay driver chip located in a controller. The controller may be part of inverter 1000. A suitable relay driver chip is the Texas Instruments part number TPL9201. Output 1 may be connected to a battery and a load converter. The load converter can monitor the battery voltage and optionally the battery net current and, via control port 1, direct the combiner to output more or less current to output 1 by selecting or deselecting strings in order to keep the battery at an optimum state of charge. The load converter can thereby achieve intelligent battery management, by implementing in software different charge regimes such as bulk charge, absorption charge, equalization charge and float charge in dependence on the history of the battery state. Alternatively, a separate charge controller can implement these functions in cooperation with the solar combiner 700. The advantage of involving the solar combiner in charge control is that any string not required to achieve the desired instantaneous load inverter plus battery charge current can have its current diverted to a secondary output 2.

When relay 706 is not selected to output its associated string current to output 1, the current is routed to relay 707. Relay 707 may be programmed to divert the current to a second output bus connected to output 2 terminals 722. Output 2 is connected to a load that is of lower priority than the load on output 1, as control port 1 must have caused a relay 706 to relinquish current in order for output 2 to receive it. The second priority load can comprise controls connected to control port 2 to select any of the strings relinquished by the first priority load, or none. When control port 2 does not select a string, its output appears on associated string test points which are isolated from all other strings and loads, which is useful for maintenance purposes. A bleed resistor 708 is connected across each test point so that, upon deselecting a string for maintenance purposes, the charge on capacitor 702 is bled down to a safe value in about 30 seconds. If neither the first nor second priority load selects any string, then all strings are isolated from each other and the loads, thereby providing a DC disconnect function. DC disconnect can be forced using switch 709 local to the combiner, which removes power from all relay coils. Second or further switches can optionally be provided at remote locations to force DC disconnect. For example, a DC disconnect can be provided at an inverter, at the main service entrance of a building, and so forth. In any case, when the inventive load inverter is connected to output 1 and control port 1, if the inverter ceases inverting for any reason, relay power will not be supplied to control port 1 and DC from the array will be disconnected from output 1. Likewise, if a grid-tie inverter is connected to output 2 and control port 2, cessation of inverting will disconnect relay power from control port 2 causing all relays 707 to disconnect DC power from output port 2. An inventive load converter and an inventive grid tie inverter may also be coupled such that, if one ceases inverting, the other will also cease inverting. Optionally, relays 707 can be replaced with manual DPDT switches, and then the load on output 2 automatically receives the current of any string not used for output 1, as long as the associated manual switch has enabled it. However, the disconnect function of manual switches cannot be remote-controlled from another location.

Figure 15:
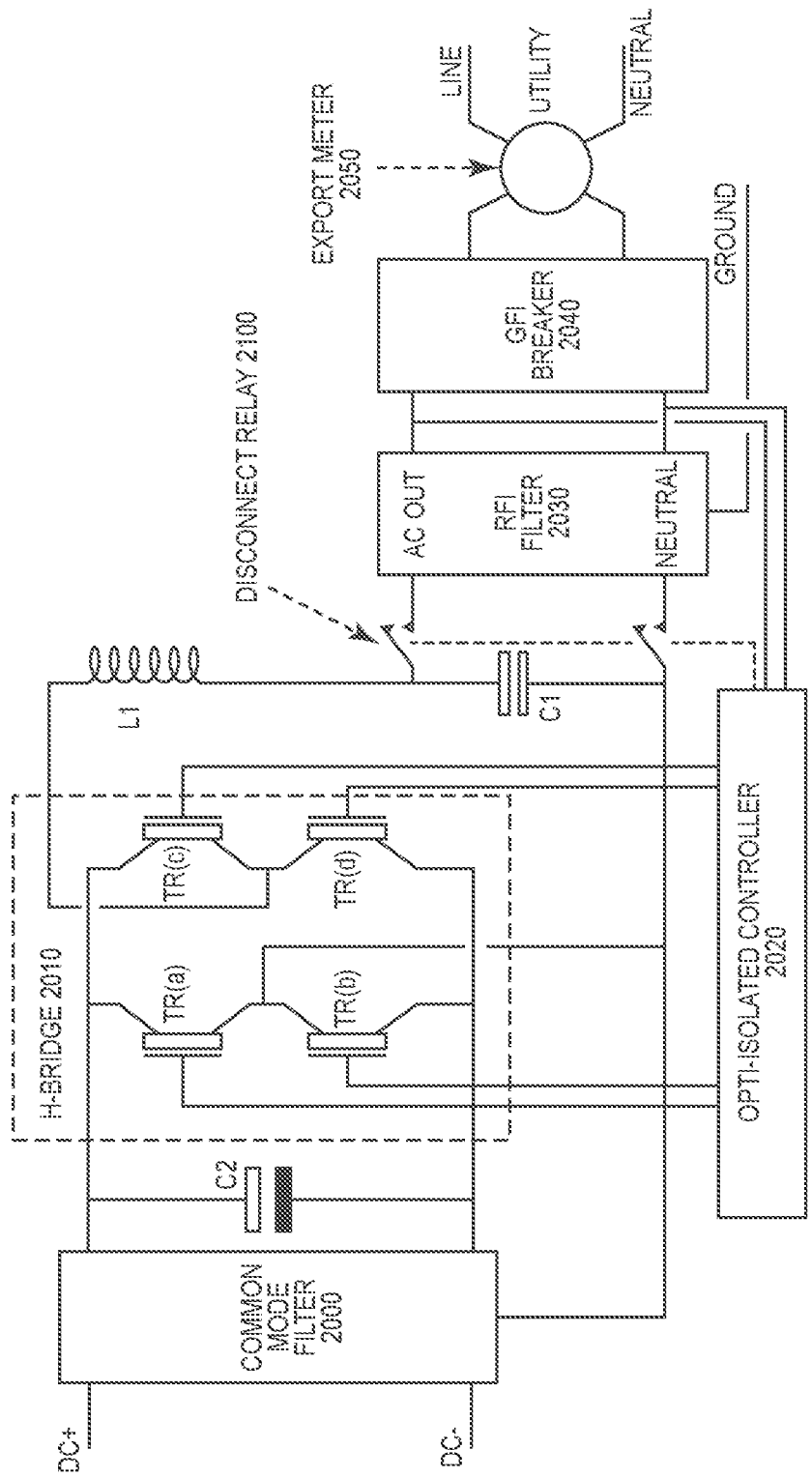
FIG. 15 shows the principle of a single-phase grid intertie inverter.

Since each per-string circuit 710 is identical, a small sub-board can be designed to accommodate the components, and only as many installed in a particular combiner as there are strings to be combined. Since no combiner is required for a single string, it is logical to put at least two circuits 710 on a sub-board, and then to install as many sub-boards as required to reach or exceed the desired combining capacity. Parameters for a typical combiner board are:

Absolute Maximum string voltage: 380 volts
Maximum number of strings per combiner: 8
Maximum current per string: 8 amps
Total maximum current: 64 amps FIG. 15 illustrates an inventive single-phase grid intertie inverter. As in the load convertor configuration, the circuitry is simplified by the use of a floating solar array in which neither terminal is permanently connected to ground or the neutral line. The floating DC supply from the solar array is fed through common-mode filter 200 to H-bridge 2010. The four MOSFET power transistors of the H-bridge are able to be turned on and off by opto-isolated controller 2020. Tr(a) and Tr(b) connect the positive and the negative of the DC supply alternately to the AC output neutral line, which is a grounded conductor. The DC− is connected to the neutral when the AC output is required momentarily to be positive, and the DC + is connected to neutral when the AC output is momentarily required to be negative. This switching is synchronized with the utility grid so that the two solar array terminals are alternately grounded at a 60 Hz repetition rate. Common mode filter 2000 slows the switching edges as previously described so as to avoid the export of high frequency interference. The voltage on each solar array terminal relative to ground thus comprises an average of about 85 volts DC with an 85-volt peak square wave superimposed. For the safety of electricians or other personnel who may work on the solar system, the solar array and other parts of the DC circuit shall, according to the National Electrical Code (2008) be labeled with an indication that both DC conductors are hot. An appropriate wire color coding is red for positive and black for negative, both of which signify "hot" in an AC context, while identifying positive and negative in a DC context.

When the DC −ve is connected to neutral, the other two H-bridge transistors TR(c) and TR(d) operate at a high switching frequency, for example 200 KHz, to connect the DC + to the AC output with a mark-space ratio varying in proportion to the desired sinewave current waveform. The on-off switching can for example be a delta-sigma modulation representation of the desired positive half cycle. Thus TR(c) turns on for a time to cause current to increase in L1. Tr(c) then turns off and TR(d) turns on to catch the flyback from L1. TR(c) and Tr(d) operate in reverse for a negative half cycle, when the DC + is connected to neutral. The required switching patterns may be precomputed and stored in controller 2020 memory for one complete 60 Hz cycle, or else synthesized in real time to create the desired current or to follow the utility voltage. C1 further smooths the current from L1 to deliver a sine wave current to the utility. A further RFI filter 2030 may be used to reduce export of inverter hash which could otherwise cause radio interference.

The inverter of FIG. 15 has in principle a high efficiency when operating at normal power levels, but does not operate efficiently at greatly reduced power levels. One reason for this is that the impedances of L1 and C1 must be related to the output current and thus values appropriate for the maximum current do not provide proper smoothing at much lower currents. Moreover, the high frequency switching losses, while being negligible at full power, would be relatively more significant at lower powers. Also, this type of inverter must deliver a current to the utility at whatever voltage the utility exhibits, in contrast with the previously described load convertor which must deliver a constant voltage to the load, whatever current the load draws. For these reasons, a grid-tie inverter does not make a good load converter, and vice-versa, although it is possible to design an inverter, known as a bimodal inverter, which can be wired up and operated in either mode.

Both types of high-efficiency convertor have a number of things in common however, as well as the inventive principles described by the attached claims: In the single-phase case, the instantaneous power delivered to the load or utility is proportional to the square of the voltage, and therefore follows a $\sin^2(wt)$ curve which is a double-frequency raised cosine ranging from zero watts to twice the mean power. In the load convertor case, the battery evens out this demand and allows the solar array to charge the battery at a constant current. In the case of the grid-intertie inverter however, without the battery, there would be no means to even out the demand, and thus the solar array would have to be sized to deliver twice the mean current with consequent under-utilization at other times in the 120 Hz cycle. To avoid this, a single phase grid inter-tie inverter requires a substantial input reservoir capacitor C2 to even out current flow over each 120 Hz cycle, and thus to match it with the constant current available from the solar array.

If the grid-tie inverter delivers 60 amps rms to the utility at 120 volts, that is 7.2 Kw, the mean current from the solar array is 7.2 Kw divided by the DC input voltage of, say 175 volts; that is, 41 amps. The peak current required by the inverter is 82 amps. C2 must therefore supply 41 amps during a positive-going 120 Hz half cycle and recharge at 41 amps on the negative-going half cycle. Neglecting the solar array output resistance, the 41 amp peak cosine current ripple must be absorbed by C2 without producing a large ripple voltage. For 2 volts peak ripple, the value of C2 is given by 2Π 120 C2=41 amps/2 volts, from which C2 is determined to be 27000 uF approximately. The size and construction of this capacitor is determined more by its ripple current handling requirement than by its capacitance, and consists of several aluminum electrolytic capacitors in parallel. This reservoir capacitor thus operates with a current ripple equal to the full output current, and must therefore be operated very conservatively and well within its maximum ripple current capability to prevent degradation. Degraded electrolytic capacitors operating with high voltages and ripple currents can overheat and burst causing a big mess, as often happened with antique tube radios, and has happened more recently with grid-tie inverters of the prior art. As will be shown, the inventive three-phase grid-tie inverter can operate with a much smaller smoothing capacitor, as the current demand from the solar array for the three phase case consists of three, double-frequency raised cosine curves spaced 240 degrees apart, which substantially cancel each other and produce much less ripple current.

The grid-tie inverter is self-regulating, in that it attains a level of output current to the utility which allows the solar array voltage to rise to the required minimum of 2 times the peak utility voltage that is about 170 volts assuming 120 volts at the utility.

A grid-tie inverter has to meet specific safety requirements and in particular the anti-islanding requirement specified in Underwriter Laboratories standard UL1741. Anti-islanding refers to means that must be employed to prevent the inverter from attempting to back-power a neighborhood during a utility outage, as this could endanger personnel trying to fix the fault. Anti-islanding is achieved by having the inverter controller 2020 derive its timing cues from the utility voltage, for example by waiting for a utility voltage zero-crossing to trigger the next switching cycle. If the utility is in outage, leaving one or more utility converters in a neighborhood connected to the grid, they will each wait for the next zero crossing and the frequency will therefore drift until it is clearly out of limits, at which point the inverter stops and opens the output disconnect relay 2100. The inverter is also programmed to trip out if the voltage at its utility connection is outside of specified limits, which is also indicative of disruption of the utility connection. Controller 2020 continues to monitor the utility voltage, and if it returns to within predetermined voltage and frequency limits and remains there consistently for 30 seconds, the inverter will resume operation. Various integrated circuits have been developed to monitor the grid voltage and frequency and are available on the market to facilitate the implementation of anti-islanding; for example, the Analog Devices part number ADE7753.

The presence of an AC component on the array DC terminals has a number of benefits; for example, it facilitates detection of ground leakage faults on the DC side. If the inverter is connected to the utility via a regular two-pole AC GFI breaker, any leakage path on the DC side will result in a 60 Hz imbalance current between neutral and hot on the AC side, thus tripping the breaker. The anti-islanding circuits then detect failure of the utility input and shut off the inverter, opening the output relays. and the combiner relays, effecting an automatic DC disconnect. The two pole GFCI breaker uses one pole to interrupt the hot leg and the other to interrupt the neutral. The breaker pigtail is used to provide the ground connection for upstream equipment so that the sensitivity of the breaker is not affected by capacitive currents to the cable sheath or conduit, but only by an unexpected source of ground leakage.

Alternatively, a specific common-mode current transformer can be used on the DC feed to detect any AC current caused by a ground fault on the DC side. A preferred wiring method to connect the inverter to the array combiner, and to connect each photovoltaic string to the combiner is insulated, flexible metallic sheathed conduit also known as Liquidtight (metallic). The flexible metal sheath encloses the DC connections and provides some screening of residual inverter hash. The insulating outer sheath on the Liquidtight also prevents accidental connection with any other grounding source, such as a water pipe, and discourages its unauthorized use as a ground for other appliances or circuits. The sheath of the Liquidtight is ultimately grounded via the GFCI breaker pigtail, if this method of DC ground fault leakage detection is employed. Other benefits in the single phase case of the 60 Hz AC component on the DC conductors concern the specification of relays and fuses. Any disconnecting device, such as a switch, relay or fuse, must usually be particularly designed and specified to break a DC circuit as opposed to an AC circuit. AC is easier to break, because there are two voltage zero-crossings per cycle that will extinguish any arcing rapidly. In the single-phase case, the inventive converters alternately ground the positive and negative DC conductors. Therefore the voltage on either DC conductor is zero for a whole half-cycle, and not just a zero-crossing. Thus it is permissible to use AC-rated fuses in combiner 700 to protect against shorts to ground of any array wiring. Likewise, the battery fuses may be AC rated rather than DC-rated, or either. In the three-phase case however, DC-rated fuses are required, as the DC conductors do not exhibit voltage zero-crossings or zero periods.

For higher power levels, for example 20-100 kw or above, utilities prefer or insist that 3-phase power be delivered equally on all three phases to reduce cable costs and to maintain load balance. In the prior art, a three-phase inverter was constructed using three, synchronized single-phase inverters, and even three separate solar arrays. With the inventive 3-phase inverter design, an integrated 3-phase inverter is provided that operates from a single solar array. It is even more economic, per kilowatt, to construct the inventive 3-phase inverter than the inventive singe-phase inverter, due in large part to the elimination of the need for the large input reservoir capacitors.

Figure 16:
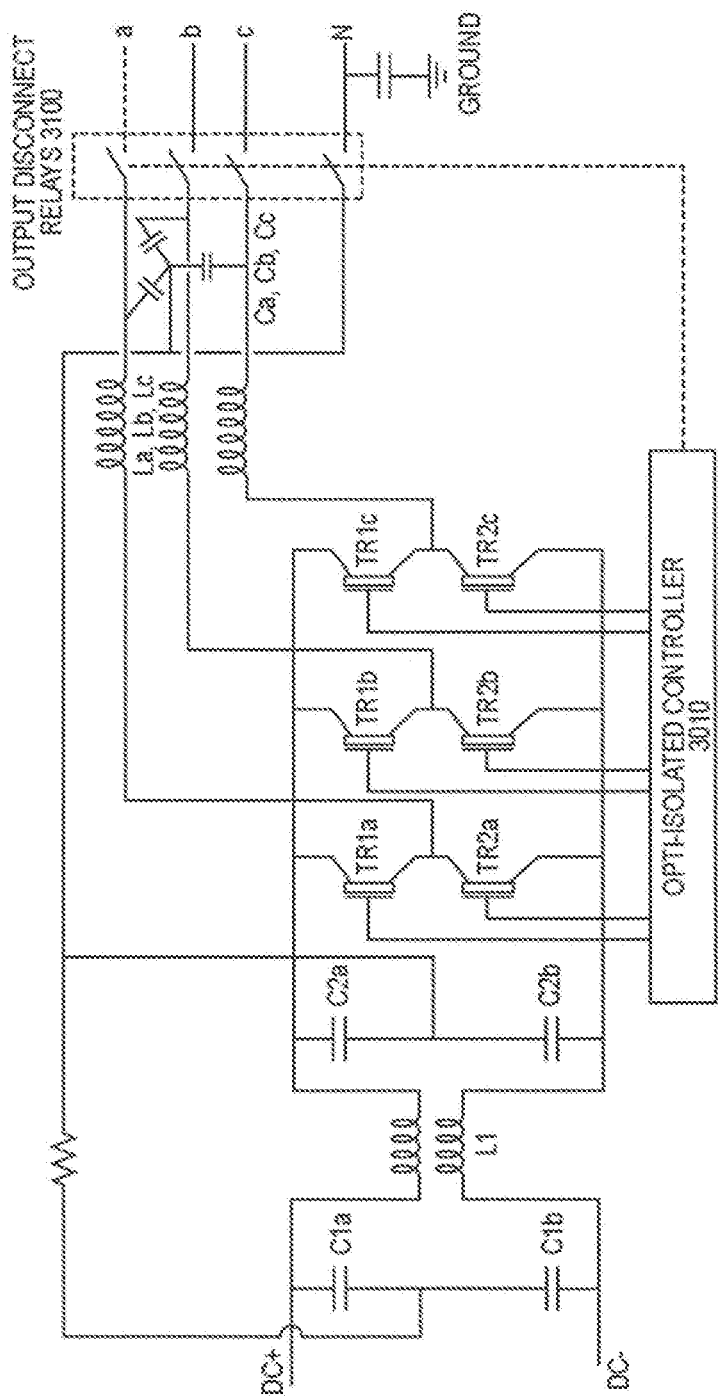
FIG. 16 shows the principle of a 3-phase grid intertie inverter.

FIG. 16 shows the principle of a 3-phase sine wave inverter according to the invention. The DC input is applied to three half-bridges that can connect either DC + or DC− through an LC smoothing filter to each of the three-phase outputs a, b and c. The three phase utility connection can for example be a 120/208 connection with neutral, i.e. the utility transformer has a Y-configured secondary while most likely having a Δ-primary. Other three-phase utility configurations are possible. For example, a Δ-secondary with no neutral can be used. However, the Y-connection is preferred so as to allow the RFI filter capacitors to decouple RF interference to neutral rather than ground, for aforementioned safety reasons Also, some means would be needed when using a Δ-secondary to prevent the system floating to an arbitrary offset voltage—for example leak-resistors to ground from all three phases. The inventive 3-phase inverter can also be adapted to operate with a 120/240/208 volt system having a so called 208-volt "high leg". In Europe, a common 3-phase voltage is 240/416, which results in an inverter adapted to European voltages supplying twice the power (e.g. 40 kW) for the same current.

Figure 23:
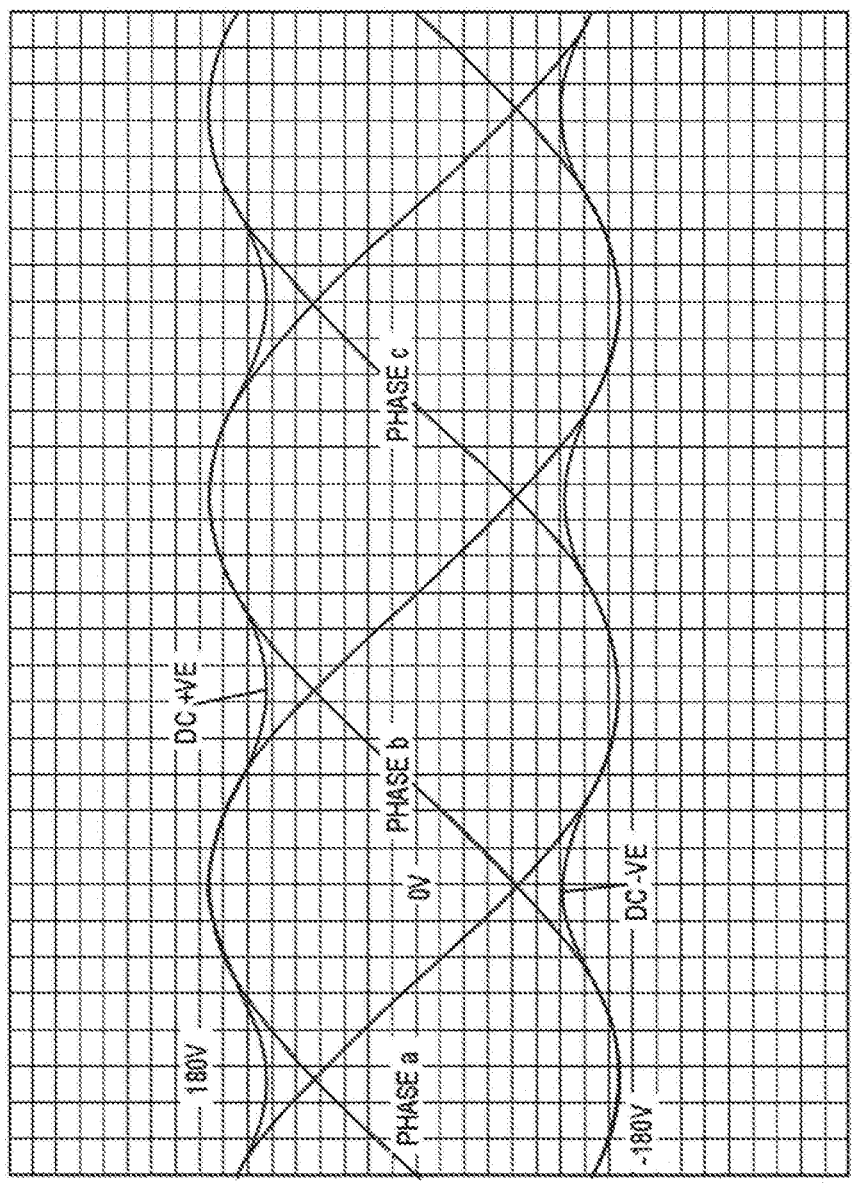
FIG. 23 Shows three phase waveforms.

FIG. 23 shows the inverter voltage waveforms at the output to the utility and on the input DC + and DC− lines. The half-H-bridges operate according to the following logic:

(1) If Phase (a)>0 v and Phase (b) and Phase (c)<0 v then connect DC + to phase (a).

(2) If Phase (a)<0 v and Phase (b) and Phase (c)>0 v then connect DC− to phase (a).

(3) If Phase (b)>0 v and Phase (c) and Phase (a)<0 v then connect DC + to phase (b).

(4) If Phase (b)<0 v and Phase (c) and Phase (a)>0 v then connect DC− to phase (b).

(5) If Phase (c)>0 v and Phase (a) and Phase (b)<0 v then connect DC + to phase (c).

(6) If Phase (c)<0 v and Phase (a) and Phase (b)>0 v then connect DC− to phase (c)

Operating the switches according to the above logic causes a common-mode AC signal to appear in-phase on DC terminals with a frequency of three times the AC output frequency of the inverter, that is 180 Hz for an output frequency of 60 Hz. The 180 Hz common mode signal is almost a sine wave, and requires less filtering than the 60 Hz square wave of a single phase inverter. It is also possible to construct split-phase inverters according to the invention, the split phase inverter providing two AC output hot leg terminals with relative 180 degree phasing. Alternatively a two-phase inverter can be constructed according to the invention that provides two AC output hot leg terminals having a 90-degree relative phasing. In the latter case, a Scott-T transformer of the prior art can be used to convert the two-phase output to a three-phase output, if so desired.

When a first switch connects a DC input line to one of the phases, the other DC line is simply the DC supply voltage away from that phase in voltage. That other DC line is then chopped at high frequency by other switches to generate, after hash-filtering, the best approximation to the desired voltage difference to the other phase. In particular the mark space ratio of the chopping action rises to 100% ON at the peak of the phase-to-phase voltage. The phase-to-phase voltage is 120√3=208 v r.m.s for a 120/208 three-phase service, and the peak is a further factor of √2 higher. Thus the solar array is loaded down to a DC voltage of 120√6=294 volts, assuming the AC voltage output is 120 volts rms per phase. With this voltage, the DC + and DC− lines are seen to execute a near-sine waveform with an amplitude of 45.47 volts peak to peak and at a frequency of three times the AC output frequency. This 180 Hz waveform that is superimposed on the DC lines is not quite a sine wave, as may be determined by computing its spectrum, but is sufficiently free of high frequency harmonics that the common mode filter needed for a three-phase inverter may be simpler than in the single-phase case. Moreover, the instantaneous power delivered to the load is a flatline in the 3-phase case, and therefore the current from the DC supply is also a flatline, and not a 120 Hz waveform, as was the case with single phase. Therefore in the 3-phase case, capacitor C2 does not have to smooth out a full-current 120 Hz ripple waveform, as it was required to do in the single phase case, and a smaller value suffices to prevent export of inverter hash to the DC circuits. The ripple is low only when connected to a three-phase utility having substantially equal voltages on each phase and substantially the correct 120-degree relative phasing. The utility is normally guaranteed to maintain these parameters within quite tight limits, as otherwise three-phase motors can be damaged; however, fault conditions can arise, such as loss of a phase, which requires monitoring. A simple method to monitor the utility phase and voltage balance is to connect equal value resistors from each phase to a common point, which should then be at zero volts AC relative to neutral. Detecting the residual voltage at this point provides a measure of utility phase and voltage balance. If the measured balance value is outside of a threshold value, a utility input fault condition is declared and the inverter powers down and the output relays are opened. Three small, fused control transformers remain connected to the utility to monitor resumption within correct limits, and also supply power to the control microprocessor and other control circuits even in the absence of solar power at the DC input. Thus in contrast to the load inverter, the grid-tie inverter requires a utility input in order to operate. Without a utility input, the grid-tie inverter cannot supply relay control signals to combiner and DC disconnect unit of FIG. 27, and thus the DC input is disconnected at source.

The AC outputs of a single-phase or 3-phase grid-tie inverter are also preferably protected against voltage spikes on the utility connection. This can be done by use of gas-discharge tube surge arrestors, for example. Such devices have instantaneous current-sinking ability of thousands of amps, and can tolerate such currents long enough to trip a 60-amp breaker, should the over-voltage transient persist. These should preferably be connected between line and neutral, but in the case of a delta-connected 3-phase service with no neutral, they can be connected between line and utility ground and/or line-to-line.

In summary, a 3-phase inverter according to the invention delivers three times the power output of a single-phase inverter using only about the same number of components, and uses a smaller capacitor on the DC input. A 3-phase grid-tie inverter of 21.6 Kw capacity is therefore only of the same order of complexity and cost as a 7.2 Kw single phase load inverter.

Figure 26A:
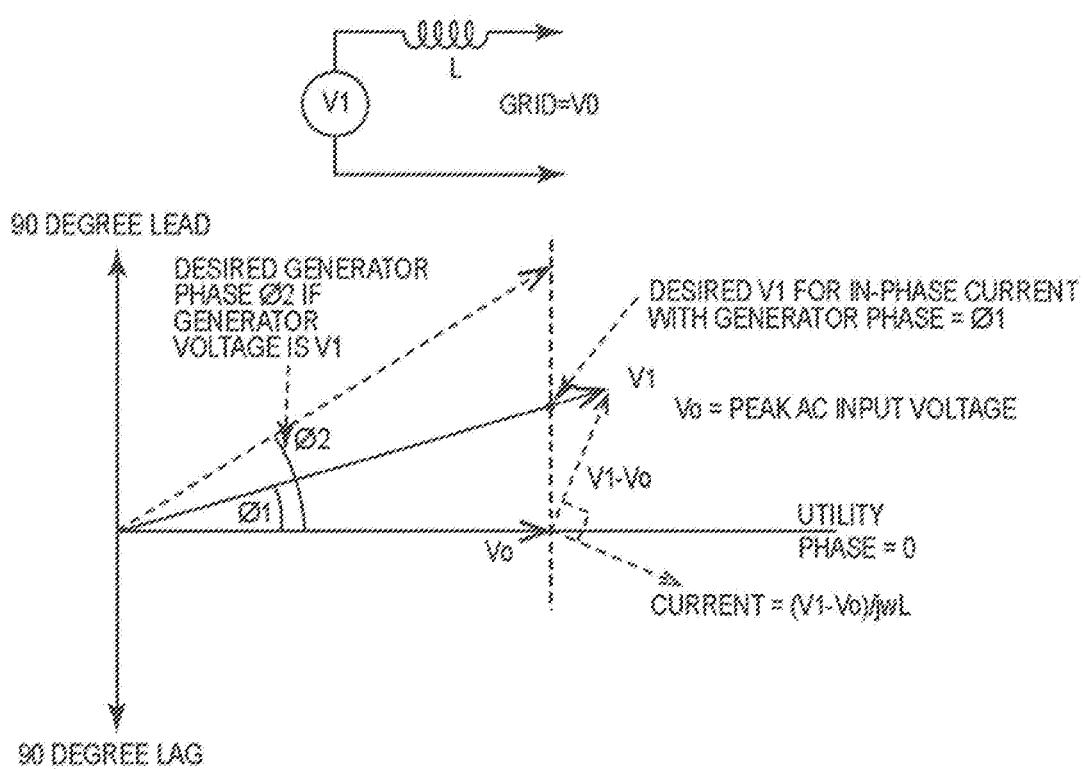
FIG. 26A shows a vector diagram of a generator back-feeding the grid.
Figure 26B:
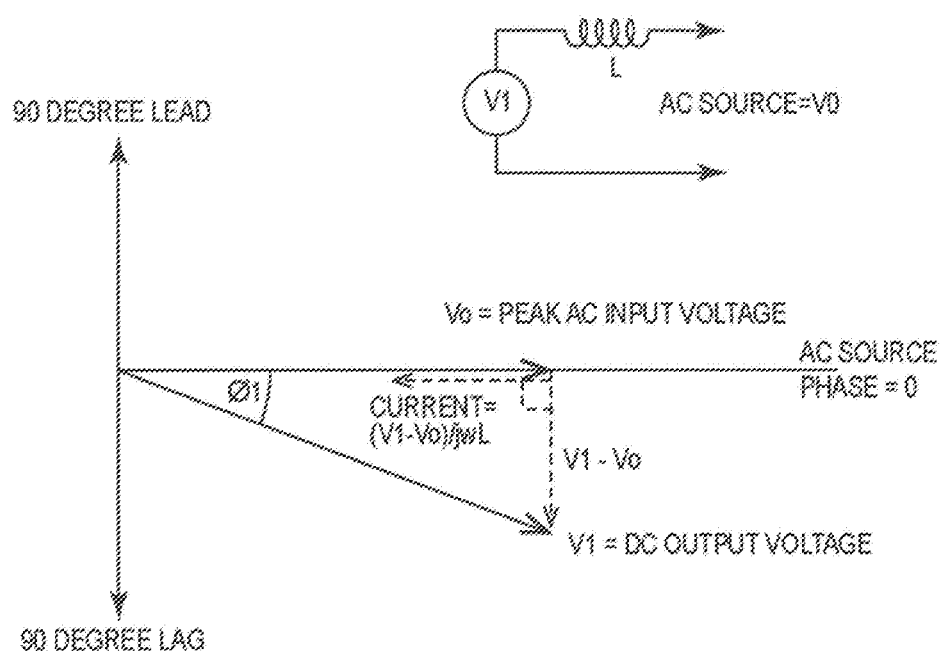
FIG. 26B shows the vector diagram for rectifier mode.

There are many subtleties in designing such an inverter to back-feed power to the grid. FIG. 26 shows a vector diagram pertaining to a voltage generator which is presumed to have an inductive output impedance and a vector output voltage of V1, connected to a utility grid of vector voltage Vo. The vector difference between (V1−Vo) between the generator voltage V1 and the utility voltage V2, divided by the inductive output reactance wL, determines the current flow to the grid. The current lags the voltage across the inductor L by 90 degrees; therefore in order for the current to be in phase with the grid, i.e. a horizontal vector, the difference voltage (V1−Vo) must lead by 90 degrees, i.e. be a vertical vector. Thus either the generator phase must be advanced from $\Phi 1$ to $\Phi 2$, or else the voltage must be reduced below V1 in order to rotate (V1−Vo) to the vertical position, or even both the phase and the voltage must be adjusted. In the case of the grid-tie inverter, the generator voltage V1 is proportional to the array voltage and the array voltage is inversely dependent on the current taken from the array, which is proportional to the component of the current in phase with the utility, i.e. the projection of the current vector on the horizontal axis. Moreover, since wL is by necessity a very small reactance, (V1−Vo) is a very short vector, of the order of 1 to 2 volts, and the sensitivity of the current phase to changes in array voltage and thus V1 is very high. It may be deduced that changes in the generator phase CD cause large changes in current magnitude while changes in array voltage and thus V1 cause changes in current phase, but, to a first order, not its magnitude. Thus proper operation of the grid-tie inverter requires controlling the generator phase advance relative to the utility to adjust the current magnitude until the array is operating at a desired point, i.e. the maximum power point (MPP). One strategy is thus to advance the inverter phase (which increases the output current) if the array current is too low and thus the array voltage is too high, or conversely to retard the phase if the array voltage is too low because the current is too high. A simplified strategy is to control the phase of the inverter such that the phase of the current is in phase with the utility, i.e. to control the inverter phase such that the voltage across the inductor L has a phase that leads the utility phase by 90 degrees. If this results in too little current, such that V1 increases, the result will be that the current will lag the utility, and the generator phase shall then be advanced, increasing the current and reducing V1. Conversely, if the current is too high, causing V1 to reduce, the current phase will advance over the utility phase and thus the inverter phase will then be retarded to bring the current into phase with the utility. Maximum power point tracking is then approximately achieved at the same time as synchronizing the inverter to the grid.

The phase of the voltage across the inductor L1 (FIG. 15) or La,b,c (FIG. 16) which are the switch-mode smoothing inductors, is simply sensed by adding a secondary winding thereto, or else by adding a secondary winding to the following RF hash filter, and feeding the secondary voltage to a zero-crossing phase detector. The secondary winding senses the derivative of current, The secondary voltage may thus first be integrated to obtain a 60 Hz current-related signal. The phase detector simply comprises logging the count in a master clock counter at which a current zero crossing occurs and determining if it was early or late. This shall be done for all three phases in a 3-phase system, and either a mean taken, or else each phase can be separately controlled from its own sensor coil.

Figure 24:
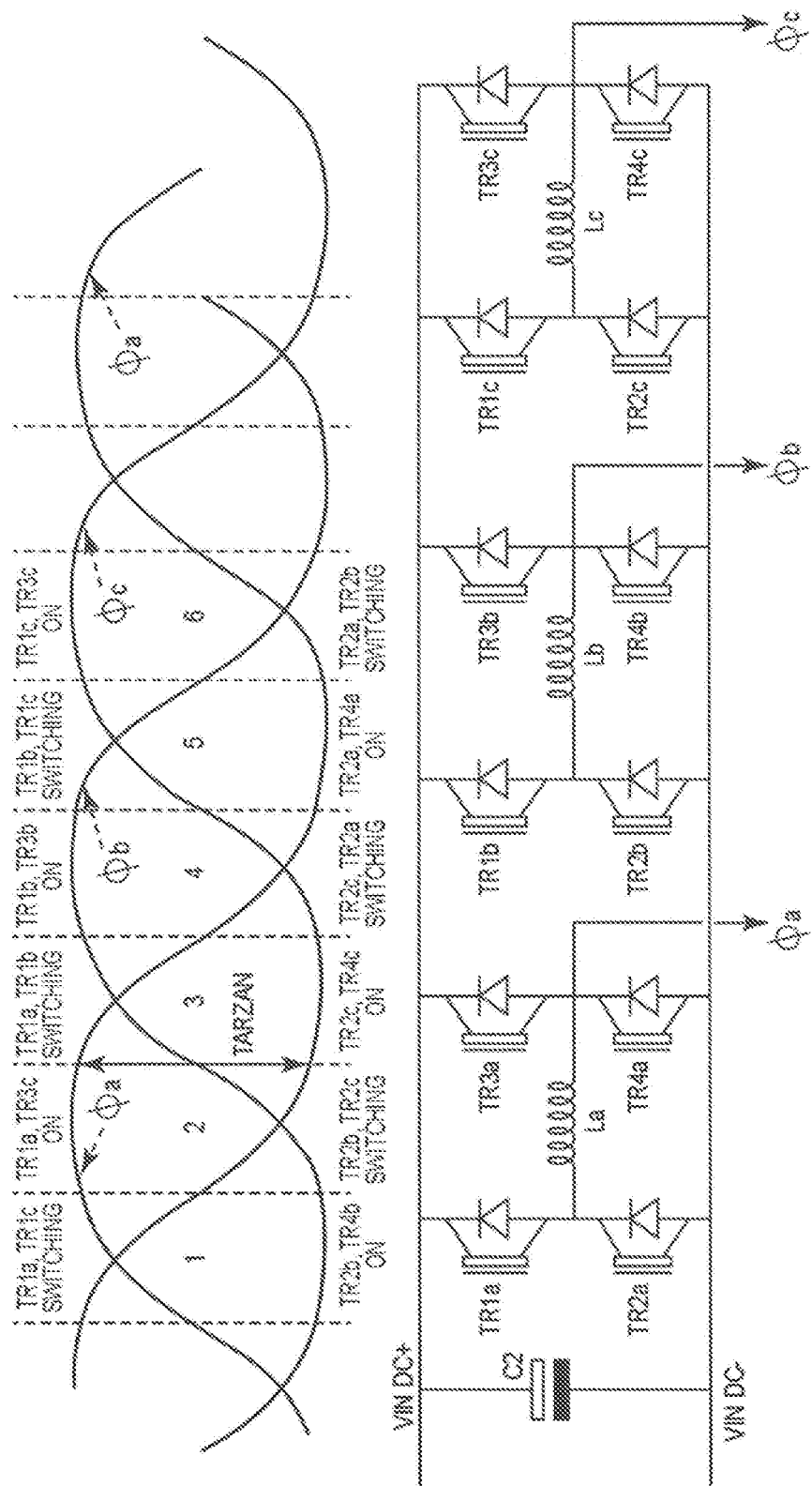
FIG. 24 shows another arrangement of a 3-phase grid intertie inverter.

The three phase inverter of FIG. 16 is a simplified circuit, and has the characteristic that the DC input is not switched to connect directly with any AC output terminal, but rather connects it through the smoothing inductors La, Lb or Lc to one of the output terminals. This has the result that some of the high frequency switching waveform is transferred to the DC input, which would require a more complicated DC input filter. FIG. 24 shows a switching arrangement to avoid this and to ensure that, at the appropriate time, a DC input line that is selected to connect to an AC output terminal is directly connected to that output terminal, bypassing the associated smoothing inductor La, Lb or Lc. Referring to FIG. 24, in period 1 of the three-phase cycle, Phase a and Phase c are positive or zero while Phase b is negative. According to the above-described switching logic therefore, the Phase b output terminal shall be directly connected to the DC negative input line. This is done by turning on TR4$b$ to conduct. Just prior to period 1, Tr2$b$ was executing a switching cycle with varying duty factor, the duty factor having just reached 100% at the beginning of the period. Thus TR2$b$ is also left conducting when Tr4$b$ is switched on, and shares the load current with Tr4$b$. At the end of period 1, phase b and phase c transition to negative while phase a is positive. Accordingly, the phase-a output terminal shall be directly connected to the DC input positive line. This is done by turning on Tr3$a$. Just prior to period 2, Tr1$a$ had been switching but had reached a 100% duty factor. Therefore Tr1$a$ is left 100% ON to share the load current with Tr3$a$. At the actual boundary between two periods, for example at the boundary of period 2 and period 3, the switches operate according to the "Tarzan principle"—that is, do not let go of one vine until you have hold of the next one. Thus for an instant, Tr1$a$ and Tr3$a$ are connecting the DC positive input line to the phase-a output terminal while TR2$c$ and Tr4$c$ are connecting the DC negative line to the phase-c output terminal. In this way, the DC input is always anchored by either its negative line or its positive line to one of the three phase output terminals. It can be mentioned that, to obtain proper relative phase of the switches taking into account the delay through inductors La, Lb and Lc, the switching waveforms of Tr1$a$, Tr2$a$, Tr1$b$, Tr2$b$, Tr1$c$ and Tr2$c$ may be slightly time-advanced relative to the switching waveforms of Tr3$a$, Tr4$a$, Tr3$b$, Tr4$b$, Tr3$c$ and Trr4$c$. This time advance corresponds to the phasing of the generator relative to the utility voltage discussed in relation to the vector diagram of FIG. 26. Thus the phase advance of the waveforms for switches Tr1$a,b,c$ and Tr2$a,b,c$ is adaptively controlled to make the AC output current lie in phase with the utility voltage while switches TR2$a,b,c$, and TR4$a,b,c$ operate in a fixed relationship to the utility voltage.

It can be mentioned that the testing of high power converters to confirm efficiency and adequate heat dissipation at maximum load can consume a considerable number of kilowatt hours. It is also difficult to measure efficiencies in the 98-99% region by measuring the input DC power and output AC power with different instruments. A 1% measurement inaccuracy can lead to the erroneous conclusion that an inverter is more than 100% efficient, or that it is less efficient than it really is. A preferred method to test an inverter is therefore to rectify the AC output with a rectifier circuit especially designed to consume a sinusoidal current in phase with the voltage, and to feed the DC back into the inverter input. The inverter DC source need then only supply the difference between the input and output power, i.e. the amount of power wasted in inefficiency, plus the rectifier circuit inefficiency. This is both a more accurate and more cost-effective way of testing inverters.

The grid-tie inverter described herein may be operated in reverse to transfer energy from an AC source to a DC load. It simply requires programming the phase control circuit described above to ensure that the phase of the voltage across the series smoothing inductor is 90 degrees retarded with respect to the AC voltage. Power will then flow from the AC to the DC circuit. As illustrated in FIG. 26A, for rectifier mode, the amount of phase retard shall be controlled to produce the desired amount of AC load current and thus rectified DC current while the voltage V1 is controlled by adjusting the switching waveform duty factor to make the AC current in phase with the AC voltage. The same circuit arrangement can thus be used with an alternative control regime to make a rectifier which presents a linear load of low power factor to the AC supply. This is useful for inverter testing as described above, and is also useful for high power battery chargers for electric vehicles where it is desired that they should present a linear load to the utility.

Figure 18:
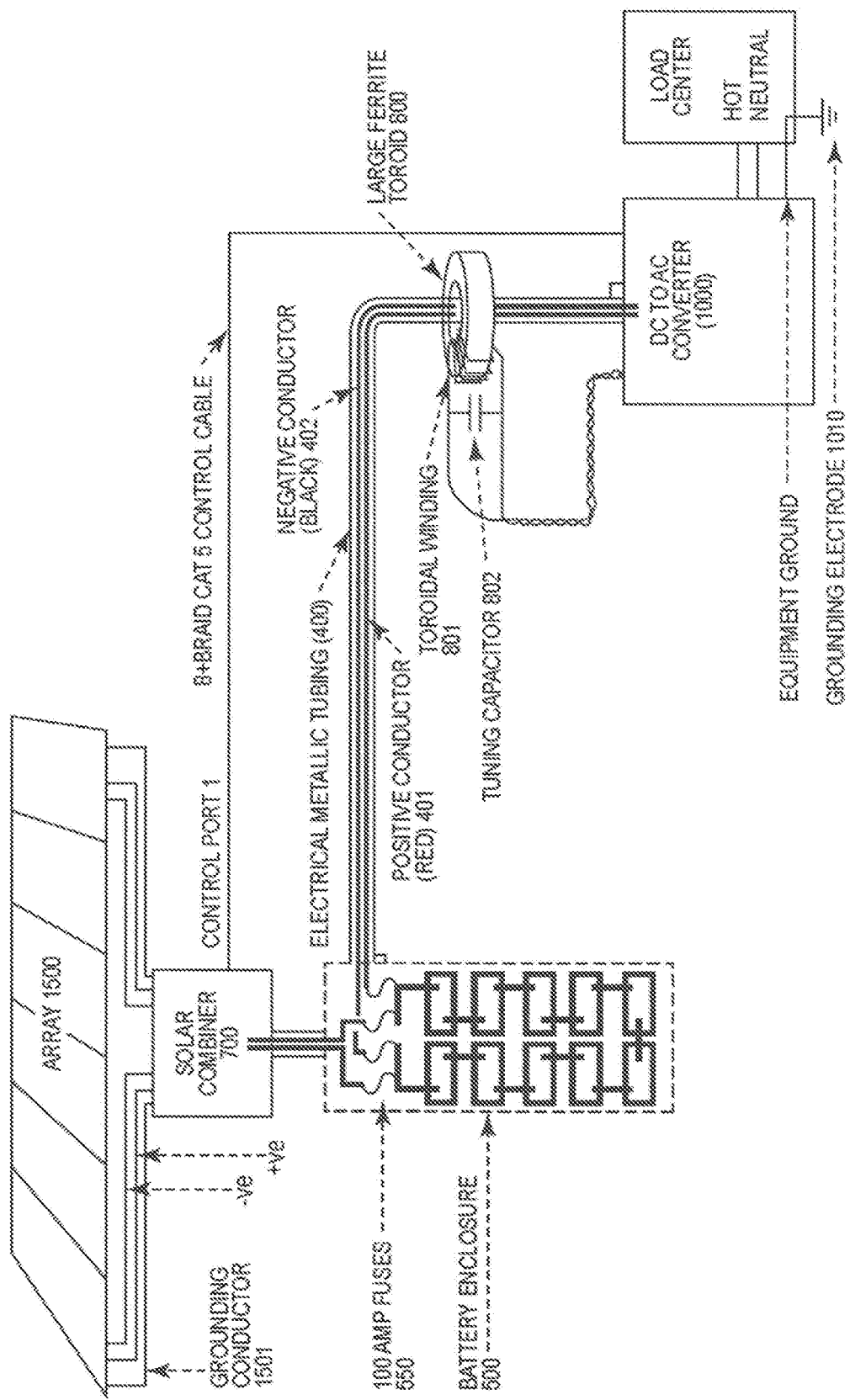
FIG. 18 shows a complete solar installation using a standalone inverter.

FIG. 18 shows the block diagram of an electrical installation employing the first, load inverter implementation to provide a household with solar-generated AC power. A solar array comprising one or more strings of solar panels is installed on a south-facing roof for example, and any exposed metallic parts other than its electrical terminals shall be returned to ground via a grounding conductor to give some degree of protection against thunderstorm transients. Each string of panels connects to solar combiner 700 therefore using three conductors—the DC positive, the DC negative and the grounding conductor. The preferred wiring method between a string of solar panels and the solar combiner is to use Liquidtight flexible metallic conduit (LFMC) to carry the positive and negative lines of at least one string as well as an array grounding wire. The metallic sheath of the Liquidtight should also be bonded to the array frame (if metal), and the solar combiner case. Thus effectively providing a coaxial connection. Such a coaxial connection is a superior method of preventing thunderstorm transients entering into the signal and power paths. The 2008 National Electrical Code suggested the use of a separate grounding rod for the array when the array was remote from other equipment. However it was recognized that this could be inadvisable and that requirement was removed in the 2011 version of the Code. For installing systems using devices according to this invention, all grounding shall be routed back to the common premises grounding electrode system. This may consist of more than one grounding rod or electrode, however all grounding electrodes must be connected together on the load center side of the inverter and no other ground shall be connected to the installation on the battery or array side of the ground leak detector.

As already described, solar combiner 700 selectively combines the currents from multiple strings of solar panels according to relay control signals presented to its control port 1. Standalone inverter 1000 is connected to control port 1 via a 9-conductor cable, for example an 8-conductor-plus-braid Cat 5 cable, or a DB9 serial port cable, and controls the string selection in order to maintain the voltage of battery 500 within desired limits. To avoid prejudicing operation of the ground leak detection function, the braid of the Cat 5 cable or ground return of a DB9 cable must not be connected to the ground or any part of the DC circuit inside the combiner. The relay coils provide this desired isolation. One method, which requires monitoring only the battery voltage, progressively switches out strings of panels when the battery voltage approaches a target value. For example, suppose battery charging is operating in the float charge regime where the battery voltage shall be maintained at approximately 135 volts for 60 lead-acid cells in series. If the battery voltage is less than 120 volts, all strings are selected to charge it. As the voltage approaches 135, strings are switched out depending on the rate of approach, which is determined by battery-voltage monitoring circuit that can be contained within controller 202. For example, if the voltage is 126 volts and rising at the rate of 0.2 volts per second, it can be predicted that the voltage will reach 135 volts in 45 seconds. Thus in five seconds, one string is switched out. If the battery voltage one second later is less, one more string is switched back in. If on the other hand the battery voltage continues to rise such that it will reach the target voltage in less than 45 seconds, one more string will be switched out. The foregoing description of float charging is merely intended to be exemplary of all possible methods of controlling battery charging when only monitoring battery voltage. Preferably, the battery charge controller would also be able to monitor net battery charge current. This requires a current sensor at the battery such as a very low resistance current shunt (not shown) with a pair of dedicated wires back to the DC-AC converter 1000, where the battery charging logic and control resides.

The combined current from the selected strings is routed from solar combiner 700 to battery 500, again using preferably LFMC to maintain a coaxial path. The trade size of Liquidtight shall be sufficient for the gauge of conductors needed for the total current of all strings, plus an equipment grounding conductor used together with as the Liquidtight metal sheath to transport the equipment ground. Battery 500 shall be housed in a suitably ventilated enclosure to dissipate any hydrogen out-gassing safely to the outside. The housing may include a perforated metal or foil screen which then should be bonded to the Liquidtight sheath and the equipment grounding conductor. The 2008 National Electrical Code leaves it optional whether the battery wiring includes fuses. Since a large storage battery is a source of potentially huge fault current in the event of a short in the wiring, it is highly recommended that fuses be installed as close to the battery as possible. At least two fuses are required for this purpose. For example, one fuse may be inserted in the positive connection from the combiner 700 and a second fuse is then inserted in the positive connection to the inverter 1000. A common fuse in the battery connection must not be used, as in the event of its blowing, the array would be left directly connected to load inverter 1000, which is an unstable arrangement. Four fuses (550) may also be used, connecting one in each of the positive and negative conductors to and from the battery, as shown in FIG. 18.

Liquidtight flexible metallic conduit 400 or other metallic conduit is used to route the wires from battery 500 through the ground leak detector comprised of items 800,801 and 802 to inverter 1000. The conduit and its enclosed positive, negative and ground conductors pass in their entirety through a large, high-mu ferrite toroid 800. A suitable toroid is Magnetics Inc. part number 4916 in W material with a mu of 10000. The inner diameter of this toroid is 33 mm. This accommodates trade size ¾" LFMC. This size LFMC accommodates three #4 AWG THWN-2 conductors, which are good for 95 amps continuous. The grounding conductor may be of a smaller gauge, for example #6. AWG. Toroid 800 is wound with about 100 turns of relatively fine wire, such as #20 AWG, as it does not have to pass any current. This forms a 1:100 voltage step-up transformer between the net current flowing in the conduit and its conductors, which should be zero if there is no ground leak on the battery/array side of the toroid. The 100-turn secondary has an inductance of 118 mH while the effective 1-turn primary has an inductance of 11.8 uH. A 60 Hz imbalance current in the conduit of 6 mA will cause a primary voltage of 0.0267 mV and a secondary voltage of 2.67 mV. The sensitivity may be increased by adding capacitor 802 to roughly resonate the secondary inductance of 118 mH. A 60 uF capacitor resonates the inductance and also suppresses signals at other than 60 Hz, such as medium wave radio stations or nearby amateur radio transmissions. A load resistor of 220 ohms keeps the Q-factor of the resonant circuit below 5 and thus insensitive to small component variations. With a Q of 5, the induced voltage due to a ground leak current of 6 mA rises to 13 mV. An amplifier inside inverter 1000 amplifies this voltage and compares it to a threshold. If it exceeds a threshold corresponding to 6 mA, the inverter executes a shutdown, controlling the combiner to the DC disconnect state and opening both the inverter AC output relays and the DC input power and start-up relays. This completely isolates the array from the battery and ground and the battery from the inverter and ground, thus preventing any further ground leakage current. Thus personnel coming into contact with either DC conductor are prevented from receiving a shock of greater than 6 mA AC. Since the DC voltage for a single phase convertor is similar to the AC voltage, this also prevents a DC current flowing of this magnitude. The purpose of passing both the conduit and its enclosed conductors through the ground leak detector toroid is so that capacitively coupled current from the current-carrying conductors to the conduit, array frame or battery box do not cause an imbalance current through the toroid which could reduce sensitivity or cause spurious tripping. However, there are instances when such current due to a gross fault should be detected, as will be described later.

A standalone solar installation may also be used in conjunction with utility power. A common form of low-cost installation is where the solar power is routed via a transfer switch to a "subsistence panel", which is an electrical load center that supplies power to the most important appliances that need to be kept running in the event of utility failure. For example, the subsistence panel may feed lights, power points for TVs, radios, computers, fridge, freezer, water pump and microwave, but may not attempt to feed heavy consuming appliances such as HVAC, tumble dryer or electric stove. The transfer switch allows either utility or solar power to be selected to feed the subsistence panel. Other, heavier loads such as HVAC are connected to a regular load center fed only by utility power. Alternatively, a transfer panel may be used, which comprises a number of switches that select, for each appliance or circuit, whether they take their power from the utility or the solar panels. The transfer switches can be left in a position wherein the total normal load may be handled continuously by the solar array/battery combination with typically expected hours of sunlight, while preserving the ability to temporarily feed any other appliances from the solar system should an emergency need arise, or feed any load from utility in the event of a prolonged period without sun.

Existing transfer panels tend to be of one of two types: Either they transfer all loads from one supply to the other, manually or automatically, which assumes the alternate supply is a generator powerful enough to take the whole load, or of a second type that can manually transfer each circuit independently. The per-circuit type does not seem to be readily available with automatic load transfer switching, possibly because no criteria had existed for transferring only some loads and not others. Moreover, the per-circuit type generally comprises two sets of circuit breakers, one set for the utility supply and a second set for the alternate supply. A transfer switch may be connected after the breakers, or else the breaker pairs may be mechanically interconnected such that when one of a pair is on, the other is off. Changes to the Electrical Code in 2008 however required the use of arc-fault breakers (AFCIs) on many circuits, such as bedroom circuits, and many of the remaining circuits use GFCI breakers. AFCI and GFCI circuit breakers are more expensive, so the aforementioned per-circuit transfer switch load center would now be significantly more costly, since it would require two AFCIs or GFCIs per circuit. Accordingly there is a need for a more economic form of per-circuit load transfer switching for intelligent load management. The outline of a smart transfer panel 3000 that provides intelligent load management is shown in FIG. 22.

Figure 22:
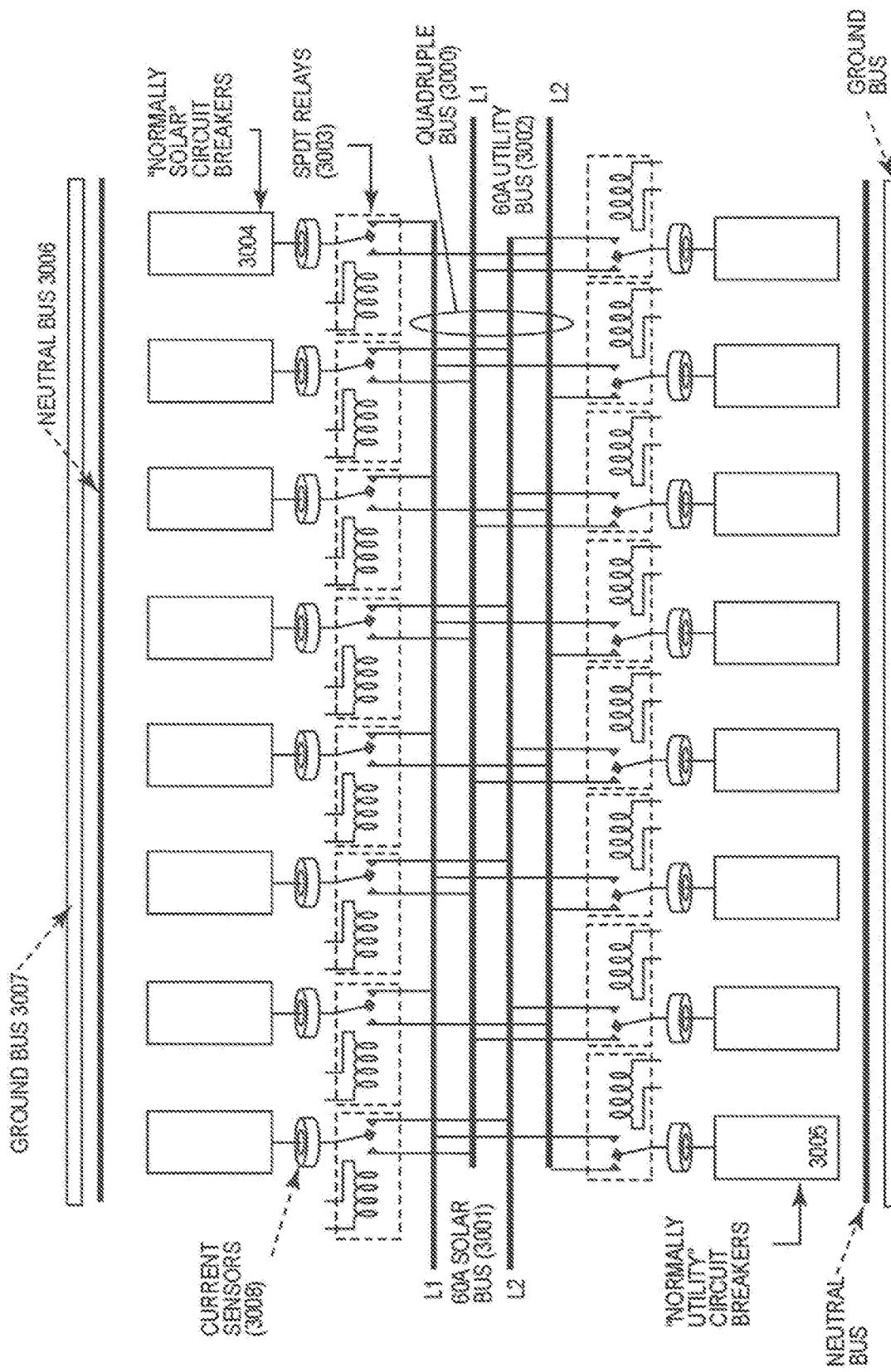
FIG. 22 shows the outline schematic of a smart load center.

In FIG. 22, in contrast to the two power busses that normally extend down the center of the panel and into which circuit breakers are connected, there are now four power busbars—two for solar power and two for utility power. Quadruple busbar 3009 is sized to handle 60 amps on each solar input lug L1 and L2 (3001) and 60 amps on each utility power input lug L1 and L2 (3002). The panel of FIG. 22 is intended to be a sub-panel and is fed from a 60 A, two-pole breaker in the main service panel. The solar input derives from solar inverter 1000 and is already current limited. A phase-splitting auto-transformer may be used with inverter 1000 to provide the two anti-phase hot legs L1 and L2 (3001). The transformer need only handle about half the power output of the inverter, if load is evenly balanced between L1 and L2. In a larger installation, two load inverters synchronized 180 degrees out-of-phase and two battery banks can be installed to provide 7.2 Kw on each of L1 and L2. One array can be used with combiner 700 to charge both battery banks alternately, or else two isolated sub-arrays may be used, as it is not possible to power two anti-phased inverters from the same array without additional isolating devices that cause a few percent additional efficiency loss. When one array and combiner 700 is used with two inverters, each inverter may be given first priority control over half of the strings and second priority control over the other half of the strings. Single Pole, Double Throw (SPDT) relays 3003 are used to select power either from one of the solar power busbars or from a utility power busbar. Each Group of 8 relays may be driven by a relay driver chip such as the aforementioned Texas Instruments part number TPL9201. The circuit breakers (3004) on one side are wired to select solar power in the unenergized state while the circuit breakers (3005) on the other side are wired to select utility power in the unenergized state. On each side, the breakers alternate between selecting L1 and L2, such that a pair of adjacent slots may be used for a double pole (240-volt) circuit such as a well pump or dryer. The source of power selected by each relay 3003 is routed to its associated breaker through a toroidal core 3008 upon which a secondary is wound to provide a current sensor for each circuit. The current sensor outputs connect to one or more coherent measuring chips such as the aforementioned Analog Devices part number ADE7753 which provides a microprocessor interface for reading current, voltage, power and power factor. The 16 current sensors may be multiplexed to a single ADE7753 using analog multiplexers and measured sequentially approximately once every one or two seconds. This is sufficiently frequent to capture most circuit on/off switching activity and give a reasonable measure of average power consumption per circuit. The relay coils may be wired to relay driver circuits such as Texas Instrument part number TPL9201. These also have microprocessor interfaces that permit a microprocessor to control the relays. A microprocessor board (not shown) has inputs for the current sensor signals, power from both solar and utility via small control transformers, interfaces with any user controls and displays and with external computers such as a PC, and provides control signals to the relays. Software then implements the intelligence to manage the loads, examples of which are as follows.

The user or installer may set up the smart transfer panel upon installation either via front panel push buttons or by connecting to a PC which can provide a more user-friendly interface. Set up may include initializing a time-of-day clock, determining from which source each load normally derives its power and setting the criterion for changing the selection. For example, each circuit can be programmed to be one of:

1. Always solar, never utility
2. Normally solar, priority 1; utility back up
3. Normally solar, priority 2; utility back up
4. Normally utility; priority 1 for solar back up
5. Normally utility, priority 2 for solar back up
6. Always utility, never solar The above list is not intended to be exhaustive, and there may be other regimes, such as different selection depending on time of day, more than two priorities, etc. The purpose of priorities is to anticipate what the user would ultimately want to do in the case of a long utility outage and lack of sun. In the limit when energy runs out, it will be necessary to shed load in order to prioritize the most important appliances. For example, lights could have first priority during the evening and nighttime while well pump, computer and cordless telephone power outlets had first priority for solar energy in daytime. These time-of-day dependent algorithms may be built in with the help of a real time clock chip or software program so that the operation that the user would wish will be automatic if the occasion arises.

The smart transfer panel may also communicate with inverter 1000 to receive information on the availability of solar power, which can depend on the state of the battery, which is monitored by the load inverter. If utility power is available, i.e. there is no outage requiring emergency power from solar for loads that would normally be powered from the utility, then it is desirable that the battery would not normally be discharged to a depth of more than 20% in any day. Therefore, if the battery reaches a threshold depth of discharge that should not be exceeded except in an emergency, the inverter can inform the smart transfer panel to begin shedding load from solar and transferring load to the utility. On the other hand, if utility power fails, those loads would instantly be transferred back to solar and the battery would be permitted to be fully discharged. Before full discharge is reached however, at some intermediate point load would start to be shed according to the pre-programmed order of priorities.

One feature of the software can be that the smart transfer panel attempts to avoid relay switching under load, in order to maximize contact life. If transferring power from one source to another is not an instantaneous imperative, the current sensors can provide an indication of a low-load period in which to perform load transfer. In addition, the inverter 1000 may be provided with a 60 Hz synchronizing pulse from the transfer panel so that power transfer is phase-synchronous and substantially glitch-free.

The smart transfer panel preferably also has an interface for a PC, for example, an RS232 interface. A wireless interface using Bluetooth or WiFi is also conceivable. The PC interface circumvents the limit on the amount of program memory that it is economic or sensible to attach to a small microprocessor such as is envisaged to be included in the smart transfer panel. Coupling to an external PC allows the PC to host additional software and provide full keyboard, mouse and display user interfaces, color graphics and suchlike. It can also, via the internet, allow remote monitoring or maintenance of an installation, and has access to the entire internet as a resource. For example, weather forecasts received from the internet can help anticipate solar irradiation (insolation) and manage the energy consumption accordingly. Historical records of insolation by season or date are also available on the internet for such purposes. The PC interface can also display to the user his energy consumption on each circuit and how much derived from solar and utility respectively, as well as these usages versus time of day, day of week, month, season or year. Thus the use of a smart transfer panel in a hybrid solar/utility power installation can provide many benefits as well as the tools to manage energy consumption for greater economy.

The sizing of a standalone system is more critical than the sizing of a grid-interactive system, as sufficient power must be provided for the maximum load in the season of minimum insolation, but then the excess is wasted at other times of lower load or higher insolation. A hybrid solar/utility installation with a smart transfer panel and load center as just described relaxes the need to avoid undersizing the solar source and helps to use excess power, but does not derive great benefit from oversizing. To derive benefit from much larger solar arrays, it can either be arranged to power some of the heavier house loads such as HVAC to beneficially absorb excess solar power, or else a grid-tie inverter can be added to return excess power to the grid. Firstly, a system having only grid-inter-tie will be described with the aid of FIG. 17.

Figure 17:
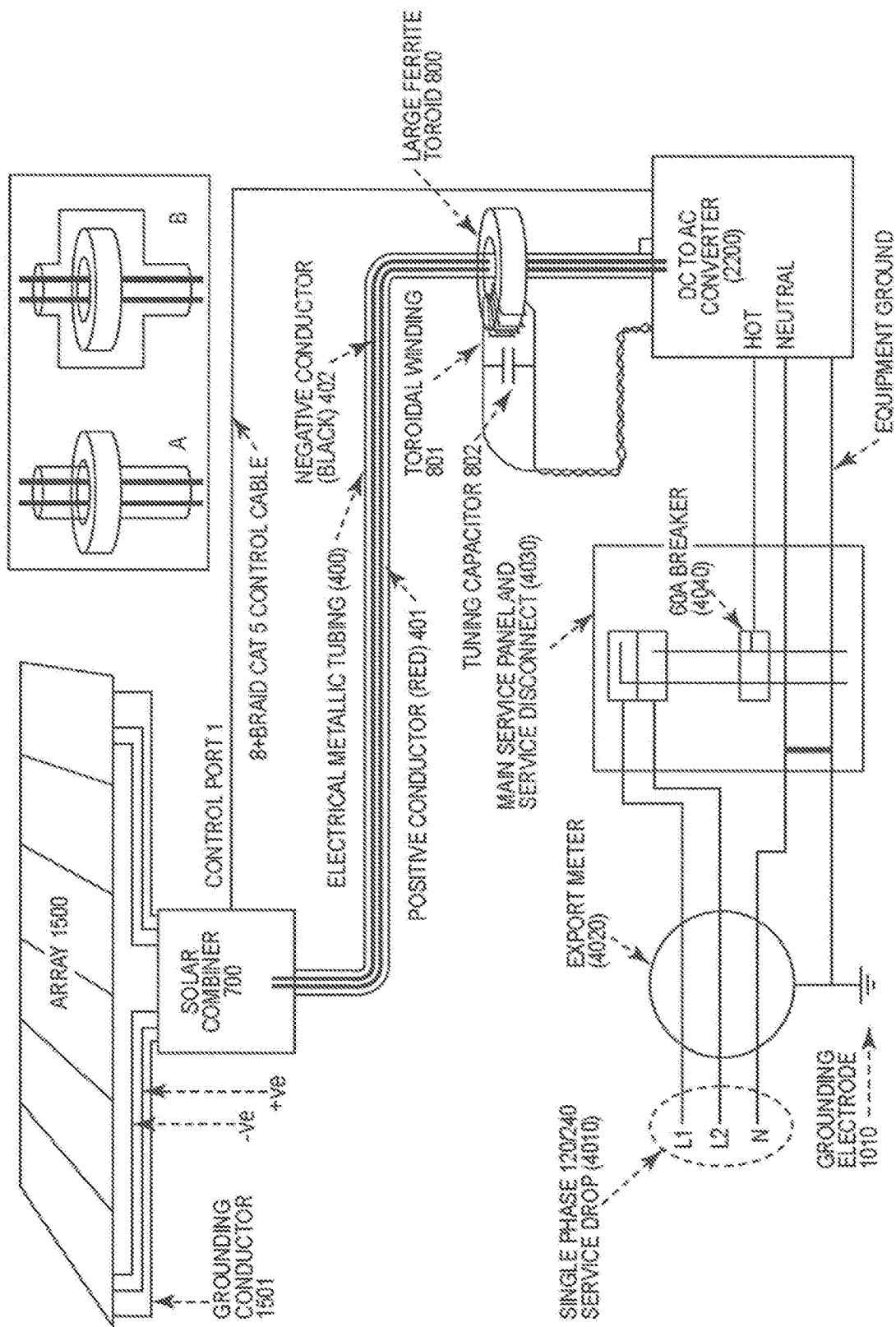
FIG. 17 shows a complete solar installation for grid-interactive use only.

The grid-tie installation shown in FIG. 17 has been deliberately drawn to emphasize the similarity with the standalone installation of FIG. 18. The most noticeable difference is the absence of the battery 500 of FIG. 17, and the use of grid-interactive inverter 2200 (single phase version, as illustrated in FIG. 15) as opposed to the standalone inverter 1000. The array now connects directly to the grid-interactive inverter 2200, which, since it is the only user of the array power, connects to combiner priority 1 output and priority 1 control port. The connection to the control port is used to provide a remotely-activated DC disconnect function.

The single-phase grid-interactive inverter impresses substantially the same common-mode signal of the same 60 Hz frequency on to the DC conductors as the standalone inverter, and thus the same ground leak detector (800,801, 802) can be used. It is alternatively possible to use a 60 Hz AC, two-pole GFI breaker on the AC output, the two breaker "line" poles being used unconventionally for the hot and neutral while the pigtail and breaker neutral are used to convey the equipment ground to the solar system. This arrangement requires that the breaker be installed in a special sub-panel that is wired in the above way, and not in the main service panel (4030). Alternatively the breaker may be pre-wired into converter 2200.

The ground leak detector comprised of items 800,801,802 measures the imbalance current between the DC positive line, the DC negative line and the ground line including the encircling conduit. To do this, the conduit and its entire set of contained conductors passes through the center of the toroid. Currents caused on the ground conductor or in the conduit by capacitive coupling of the AC ground-leak probe signals from the DC conductors are thereby balanced out and do not cause false tripping or adversely affect the ground-leak detection sensitivity. High sensitivity may thereby be achieved for the purposes of protecting personnel from shock. For this function, the array end of the conduit and the array frame must not be connected to any local ground, but should only be grounded via the metallic conduit and the grounding conductor contained therein back through the leak detector to the main system ground.

Current solar systems ignore personnel shock risks and employ ground leak detectors on the DC side purely to warn of malfunction and to protect against excessive currents. For example, in some systems, the conduit and grounding conductor contained therein may be connected by a fuse to the main system ground, which blows in the event of a short to the conduit or other grounded metal part, such as the array frame, leaving the array and conduit ungrounded. The inverter must switch off under such circumstances and both DC conductors must be disconnected to isolate the DC circuit and prevent current flow. A warning sign must be placed at appropriate locations warning that, in the event of a ground fault being indicated, conductors that are normally grounded may no longer be grounded and may be at hazardous potentials.

Using the inventive ground leak detection principle described herein, an improved form of protection of the DC circuit from excessive currents may be contrived. By using a second toroidal core, the DC conductors may be passed through the core without passing the conduit and grounding conductor through the core. Upon occurrence of a ground fault, the AC probe signal current in the ground conductor passing around the outside of the core will not cancel the AC probe current in the DC conductors, but will enhance the coupling to the toroid secondary, thus providing a strong, easily detectable signal in the secondary indicative of a gross ground fault that is easily distinguished by its much larger magnitude from capacitive currents. This indication may be detected in the inverter and causes it to immediately shut down, opening the input relays in the DC circuit, the output relays in the AC output circuit and removing the relay drive signals to the remote-controlled combiner and DC disconnect. Both variations of the ground leak detector are illustrated in insets A and B of FIG. 17. Inset A shows the conduit as well as the DC + and − conductors passing through the toroid, while inset B show only the DC conductors passing through the toroid. The former (A) can detect very small leakage currents to ground other than the conduit or equipment ground on the array side of the detector, while the latter can detects heavier ground leaks from the DC conductors to the conduit or equipment ground.

When ground leak detectors as just described are used, the AC output of inverter 2200 is wired to a single-pole, 60 A breaker (4040) in the main service panel (4030) or in a conventional sub-panel which connects to the main service panel. The main service panel (4030) houses the main AC disconnect for the solar system. When the AC disconnect is operated, the anti-islanding protection required by specification UL1741 operates and shuts down inverter (2200); this in turn removes control power from control port 1 of combiner (700) causing the DC disconnect relays to open. An OFF switch on the inverter can also be used to operate the DC disconnect function, as can a switch locally at combiner 700.

In the grid-tie system of FIG. 17, array 1500 may need to output a higher DC voltage than in the standalone system of FIG. 18. If the standalone system of FIG. 18 uses a nominally 120-volt battery, float charged at say 135 volts, then the array should deliver power efficiently at 135 volts. It may also be required to deliver a voltage somewhere in the range 140 to 144 volts for bulk, absorption and equalization charging. A fuller discussion of array-to-system voltage matching is given later in connection with implementing bimodal systems.

The main service panel of a residential system receives its power from, in the USA, a split-phase 120/240-volt single-phase service drop or service lateral. (4010). The service drop usually comprises three wires—two 120 volt rms hots 180 degrees out-of-phase with each other, and a neutral. The neutral is likely already grounded at the utility pole transformer or pad-mounted transformer, but is also bonded in the main service panel to the local grounding system provided by grounding electrode 1010. The two hots from the service drop pass through the meter to the main service panel.

One of two possible metering regimes may be used.

In "net metering", other building loads are supplied by other breaker circuits from main service panel (4030), and the meter clocks up the net difference between power imported to power the loads and power exported from grid-tie inverter (2200).

In "dual metering", a separate export meter is connected between grid-tie inverter (2200) and the service drop. Thus the service drop (4010) may feed two main service panels through two meters—one for power imported and one for power exported. Power exported may be remunerated at a lower or higher rate per kilowatt hour than power imported is charged, as distinct from net metering, which provides a one-to-one offset of imported power by exported power.

FIG. 17 shows a single-phase system typical of a residential installation. However, using 3-phase versions of the inverter that have been explained above using FIGS. 16,23, 24 and 26, a connection to a three phase service drop can be made. Typically in the USA, the 3-phase service drop would be a 120/208 volt service, but with suitable voltage scaling, an array and inverter can be adapted to a European 240 volt, single phase service, a European 240/416 3-phase service, a US 277/480-volt service or even a US 120/240-208 volt split-phase plus 3-phase service having a 208-volt "high leg". It is preferred to connect a grid-tie system to the lowest available service voltage in order to minimize the maximum DC voltage of the array for reasons of personnel safety. When a 120/208 3-phase connection is used, the array voltages are nominally 294 volts between the positive and negative DC lines and 147 volts from each to ground. The shock potential from a 147-volt to ground DC line is much less than that of a 120-volt AC line.

Because the grid-tie system of FIG. 17 is the simplest and lowest cost to provide, it is the fastest growing type of solar electric installation. However, many people are surprised and disappointed to learn that, if the utility fails, they do not have power. This is partly because of the anti-islanding requirement, but also due to the absence of the battery, which is required to stabilize the array voltage when the load is variable. Consequently it is of interest to be able to construct or upgrade either FIG. 17 or FIG. 18 to a "bimodal system" which provides both grid tie and battery back-up.

Figure 19:
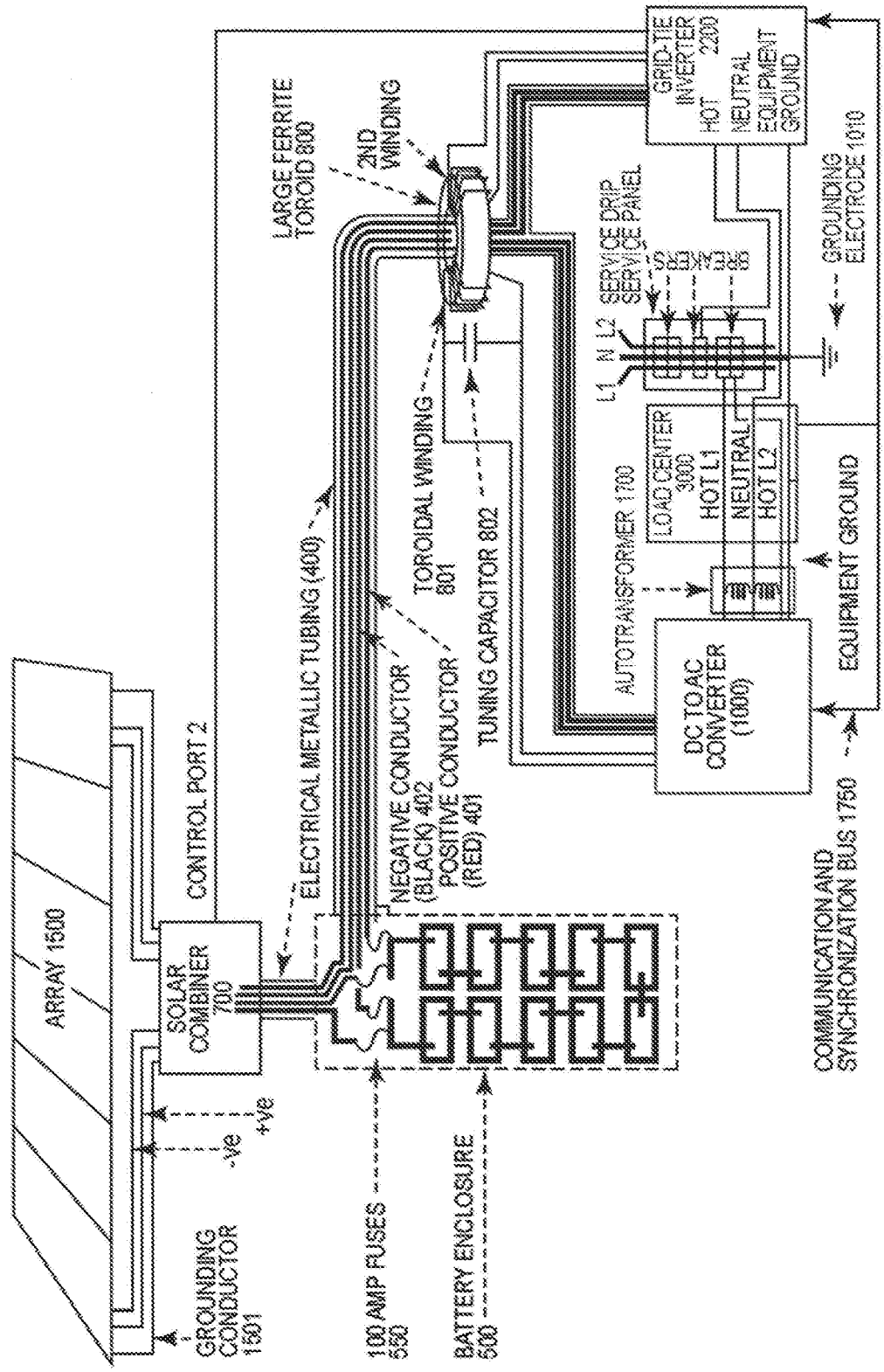
FIG. 19 shows a bimodal solar electric installation.

There are many ways to construct a bimodal system. A bimodal inverter cannot necessarily operate in both modes simultaneously, although the XANTREX SW4012, 4024 and 4048 can be integrated very well to provide both modes of operation and automatically switch between the two appropriately. One way to use the inventive inverters of this application to construct a bimodal system would be to install two separate systems according to FIGS. 17 and 18 respectively. However, it is desirable to share parts such as the array 1500, the combiner 700, the DC wiring, (400), the ground leak detector(s) (800.801,802) and so forth. FIG. 19 shows a bimodal system sharing these common parts. Since the single-phase grid-tie inverter employs an array voltage of 170 volts and the standalone system requires 135-144 volts for battery charging, a discussion of array voltages, efficiencies and how both requirements can be satisfied is appropriate. Of course, one solution is to operate the standalone inverter at 170 volts, as was shown above to be perfectly feasible to include during its design, but then a 168 volt battery comprising 14, 12-volt units in series would be required, instead of the ten mentioned previously to achieve 120 volts. This would have the advantage of providing 16.8 kilowatt hours of back-up capacity, but at greater cost. There is another argument however that can be used to reconcile different DC voltage requirements of the standalone and grid-tie inverters.

Figure 20A:
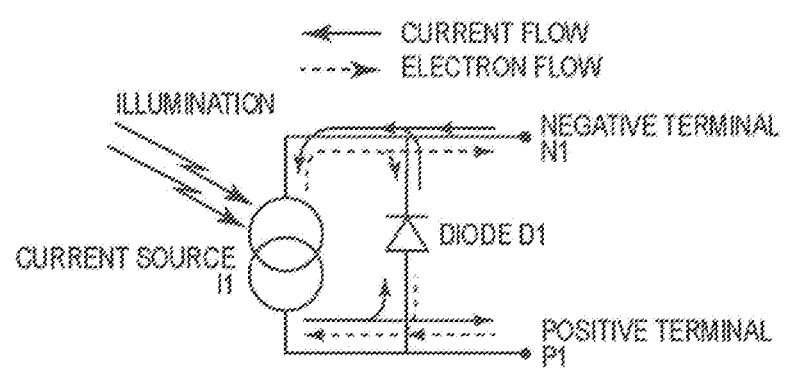
FIG. 20A Equivalent circuit of a photovoltaic (solar) cell.
Figure 20B:
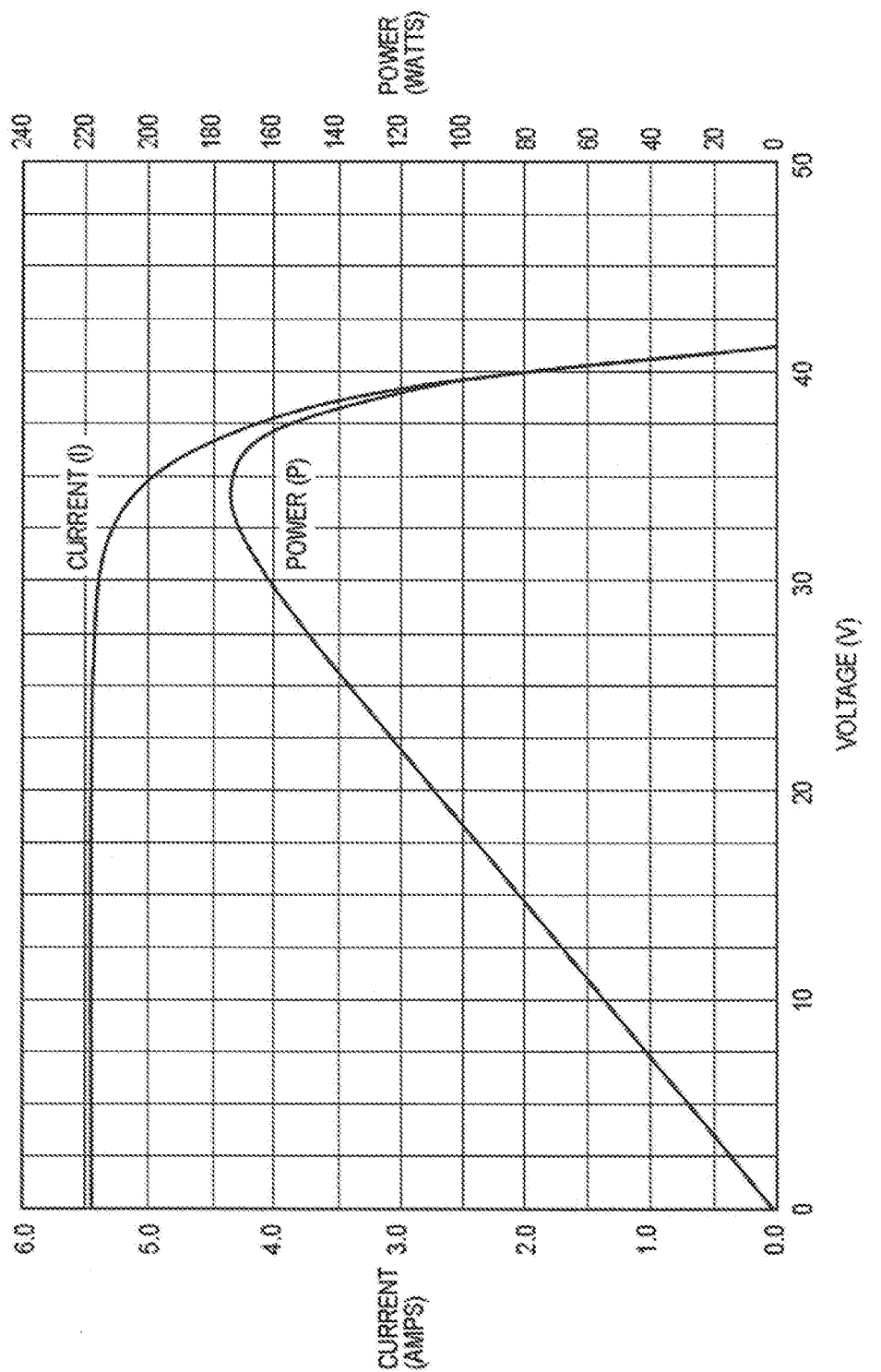
FIG. 20B shows the I-V characteristics of a solar panel.

First of all, the voltage-current characteristics of solar cells will be explained with the aid of FIGS. 20 and 20A.

Figure 20C:
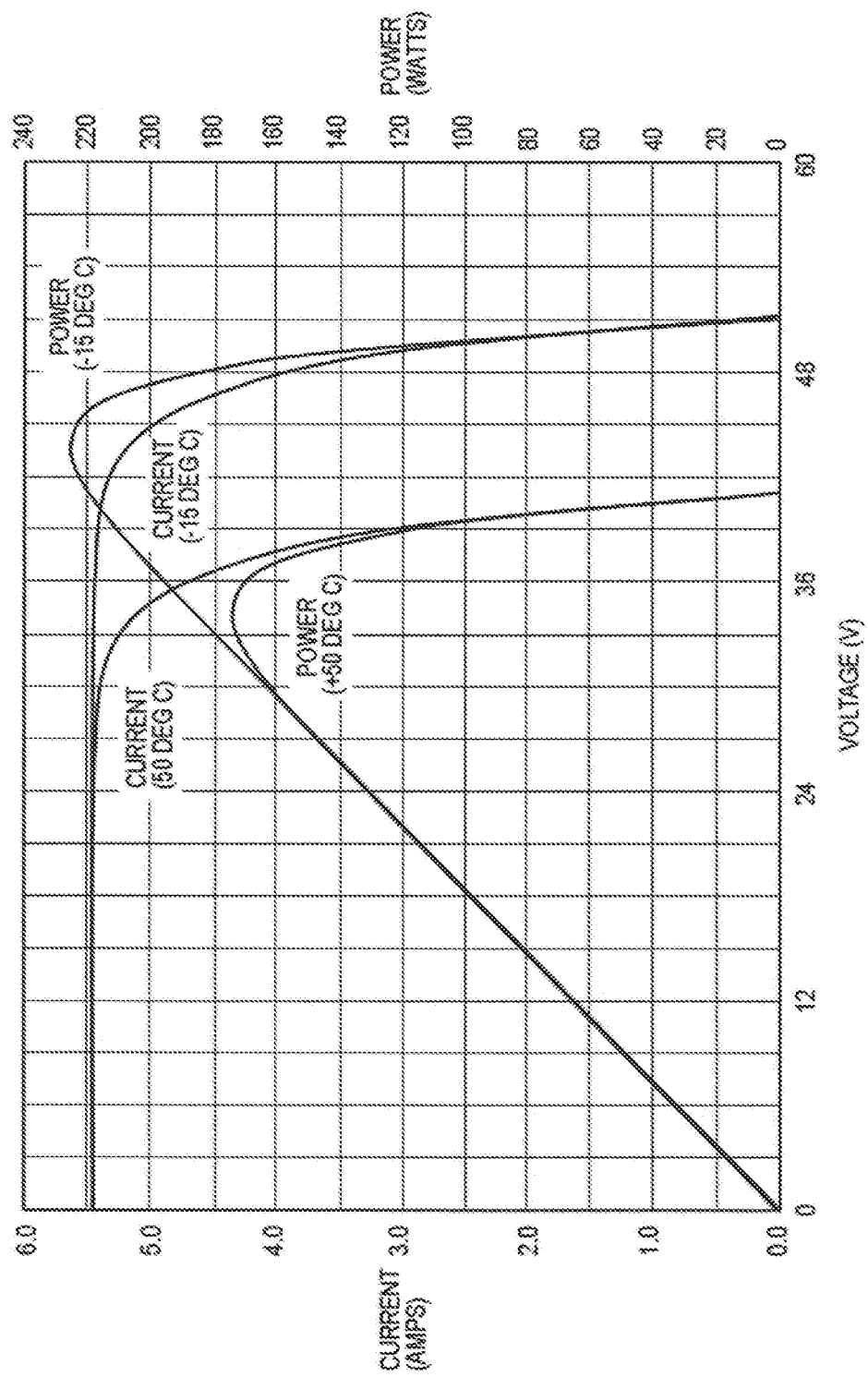
FIG. 20C shows temperature dependence of solar panel characteristics.

FIG. 20 shows that a photovoltaic cell is a current source of photocurrent I1 in parallel with an intrinsic diode D1. In the absence of an external load, the photocurrent flows through the diode in the forward-biased direction causing the diode to develop a potential across its terminals which is equal to the typical voltage drop of a forward biased diode of around 0.6 volts. Whatever the technology, diode I-V curves are given by Shockley's equation:

$$I(V,T)=I\text{sat}[\exp(\beta qV/kT)-1] \quad (1)$$

where I(V,T) is the current at voltage V and temperature T; Isat is the diode saturation voltage (leakage current when reverse biased); q is the charge on an electron; k is Boltzman's constant; T is absolute temperature in degrees Kelvin, and p is an ideality factor which is between 55% and 80% i.e. 0.55 to 0.88 for silicon diodes.

At 25 degrees C., kT/q is about 26 millivolts, so the equation (1) simplifies to $$I(V)=I\text{sat}[\exp(\beta V/0.026)-1] \quad (2)$$

If the solar cell of FIG. 20 is shorted, the diode voltage will be zero and will take no current, so all of the photocurrent I1 comes out. This is by definition the short circuit current Isc of the cell. When the solar cell is now open circuited, the current Isc flows into the diode which is therefore the value of I(V) given by equation 2, and which can be inverted to give V, now the open circuit voltage of the solar cell Voc, as:

$$Voc=(0.026/\beta)\text{Log}_e(Isc/I\text{sat}+1) \quad (3)$$

Since Isc and Voc are externally measurable, the values measured at 25 degrees C. in full sun, known as Standard Test Conditions, may be substituted in equation (3) to obtain the unknown Isat for the diode as $$I\text{sat}=Isc/[\exp(\beta Voc/0.026)-1] \quad (4)$$

Now substituting for Isat in equation 2, the diode current at any other voltage V is found to be $$I(V)=Isc[\exp(\beta V/0.026)-1]/[[\exp(\beta Voc/0.026)-1] \quad (5)$$

The current output by the solar cell is the photocurrent Isc minus the diode current, that is $$Iout = Isc[1 - \{\exp(\beta V/0.026) - 1\}/\{\exp(\beta Voc/0.026) - 1\}] = [1 - \exp\{\beta(V - Voc)/0.026\}]/[1 - \exp\{-\beta Voc/0.026\}] \quad (6)$$

A typical monocrystalline silicon solar panel in current production comprising 72 series connected cells has the following characteristics:
Maximum Power 195 watts
open circuit voltage Voc=45 volts
short circuit current Isc=5.45 amps
voltage at maximum power Vmp=38.3 volts
Current at maximum power Imp=5.09 amps From the above, the per-cell voltages may be deduced as Voc=45/72=0.625 and Vmp=0.532

Substituting in equation 6, the whole I-V curve of this cell may be computed and the voltage scale multiplied by 72 to give the whole I-V curve for the panel. The power may also be plotted by computing the product of I and V. This is shown in the curves of FIG. 20A. It is found that these highly efficient cells have an ideality factor of about 74% and a light-to-electricity conversion efficiency over 18%.

The diode voltage of a photovoltaic cell exhibits the same temperature coefficient of −2.16 mV per degree C. as other silicon diodes. Solar panels are deliberately exposed to full sun and therefore tend to rise above the Standard Test Conditions temperature of 25 degrees C. when fully illuminated in the summer. Typically, they might reach 50 degrees C., so the open circuit voltage VOC will drop by 25×2.16 mV per cell or 3.9 volts for a 72-cell panel. At the coldest winter temperatures, say −15 degrees C., the Voc of the panel may rise by 6.2 volts. These two extremes are plotted in FIG. 20B. If four of these panels are strung in series, it can be seen that, at the high temperature extreme, the voltage range 132-144 volts, which is the exact range desired for battery charging, is around the peak power point, and peak power is about 175 watts. If the array is loaded to the same voltage range at the low temperature extreme, the power is in the range 180-197 watts per panel. For the single-phase grid interactive inverter requirement of 170 volts however, four series panels are not enough at the highest temperature, although they would be perfect at the low temperature extreme. If on the other hand 5 panels are strung in series, the 170 volts required for the grid-tie inverter lies at the maximum power point of about 175 watts per panel at the high temperature extreme, while the battery float charge voltage of 135 volts is sub-optimum, at about 145 watts per panel.

In such a bimodal system, the economic benefit is primarily obtained by the grid-tie system using net metering or dual metering. The purpose of the battery and standalone inverter is purely to provide back-up in the event of a utility outage. Therefore little energy is normally drawn from the battery system and the array is only used to keep the battery float charged, for which it is sufficient that the combiner 700 occasionally divert one panel from grid-tie to battery charge maintenance. Therefore the efficiency of battery charging from the array is unimportant, and the array voltage should be optimized for best grid-tie operation. Five of the illustrative panels would therefore be used in series per string. to provide a maximum power point at 170 volts at maximum cell temperature, and upon diverting a string for the purposes of battery float charging, the diverted string would be loaded down to the slightly less optimum voltage range of 120-140 volts.

The bimodal system of FIG. 19 thus comprises a nominally 170 volt array 1500 that operates at its most efficient point when driving the grid-tie inverter. Each string of the array is selectively combined by combiner 700 either to feed the grid-tie inverter or to charge the battery. The battery is connected to the priority 1 output port of combiner 700 and standalone converter (1000) controls the string selection for battery charging via control port 1. Strings not selected for battery charging are available to be selected by the grid-tie inverter 2200, which would usually select all available strings. Thus there are two combined outputs from combiner 700 each comprising a DC positive and a DC negative conductor. These four, high current conductors are contained within the same conduit in order to pass together through the same DC leak detector (800,801,802). The DC leak detector may be provided with a second winding to feed detectors in both the grid tie inverter and the standalone inverter, as both will have such detectors built in. This provides continued ground leak detection, should one or other inverter be taken out of service or switched off. Standalone converter 1000 provides a single hot leg of 7.2 Kw which is split into two anti-phase hot legs by autotransformer 1700, to permit the driving of 240-volt loads as well as 120-volt loads. These two solar-derived hot legs connect to busses 3001 of Smart Load Center 3000. DC power for grid tie inverter 2200 is split off after the ground leak detector. The AC output of grid-tie inverter 2200 connects to a 60 A single-pole breaker in the service panel, or a suitable sub-panel fed from the main service panel. The service panel (or suitable sub-panel) also houses a two-pole breaker supplying utility power to Smart Load Center 3000.

FIG. 19 shows a communication and synchronization buss connecting the Smart Load center 3000, grid-tie inverter 2200 and standalone inverter 1000. The communications buss 1750 employs opto-isolators at the receiving ends to avoid creating ground loops, and serves the following functions:
(1) A grid derived 60 Hz sync pulse is supplied to standalone inverter 1000, of such phase that both grid-tie inverter 2200 and standalone inverter 1000 are connecting their respective negative DC input terminals to neutral at the same time, thereby ensuring that the phase of the common mode ground-leak probe signal is the same for both. This is not an essential requirement for operation, but considered desirable. Moreover, it is desirable to synchronize inverter 1000 with the utility grid to facilitate glitch-free changeover from utility to solar by Smart Load Center 3000.
(2) Inverter 1000 can communicate the availability of solar/battery power to Smart Load Center 3000 in order to implement prioritized load-shedding in the event of a prolonged utility outage.
(3) Smart Load Center 3000 can receive status flags from both inverters 1000 and 2200 and periodic reports of current delivered to the grid from inverter 2200, so that, in addition to battery status from inverter 1000 and AC circuit current measurements from its own per-circuit current sensors, all information may be collated for communication if desired to a PC via an RS232 connection, and to receive commands from a PC for remote control of the system via more user-friendly software. It is not envisaged that high data rates would be needed on buss 1750, and a baud rate of 60 bauds is envisaged between units 1000, 3000 and 2200.

Returning to the subject of the DC to AC inverter described above and depicted at FIGS. 1-14, further attention is drawn to a number of the novel features disclosed above. A goal of the inventive inverter described above is to eliminate the need for large, heavy, low-frequency transformers. An inverter that avoids the use of large, low-frequency power transformers is referred to as "transformerless." This does not imply that all wound components are eliminated; for example, there can remain the need for relays, filtering chokes, high-frequency switching transformers for producing internal auxiliary voltages, and so forth. However, these types of components are small, light, and inexpensive when they do not have to operate at 60 Hz and at high power levels.

Firstly, it should be appreciated that the manner of drawing any particular circuit diagram, and in particular, the position of components on the page and their orientation, is immaterial providing that the same connections between components are maintained—that is, the circuit topology is not changed. This is illustrated by redrawing FIG. 1 in a succession of different ways in FIGS. 28-32.

Figure 28:
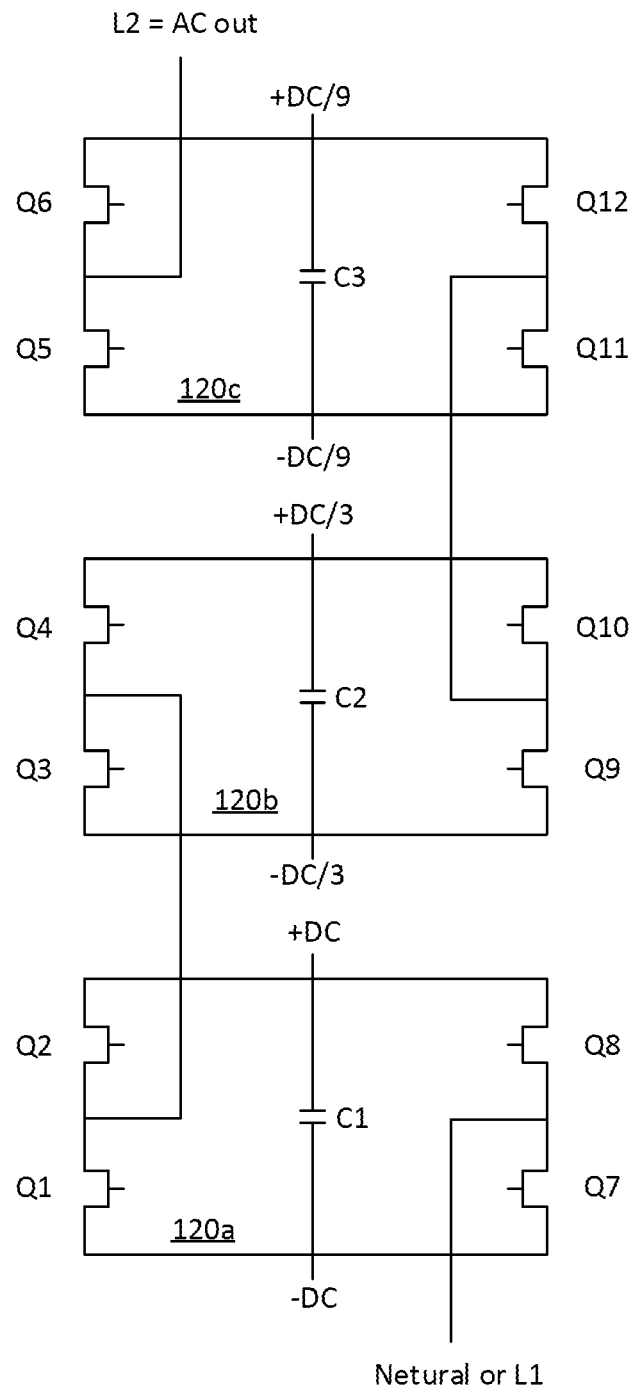
FIG. 28 shows three of the H-bridge switching configurations of FIGS. 1 and 10.

FIG. 28 shows the series-connected H-bridge circuits of FIG. 1 arranged vertically, instead of horizontally. That is, FIG. 28 is essentially FIG. 1 rotated 90 degrees counter-clockwise, with one H-bridge circuit (120d) omitted. The most-significant H-bridge (120a), which commutates the highest voltage step (e.g., 120 volts), but at the lowest frequency (referred to herein as a first frequency, which may for example be the desired AC power output frequency of 60 Hz in the USA) is shown at the bottom. H-bridge circuit (120b) is above it, which commutates an intermediate voltage step (e.g., 40 volts), but at a second frequency higher than the first frequency, as shown in FIG. 4 (e.g., the rate at which the second most significant ternary digit changes in a ternary numerical sample representation of the desired AC waveform). Finally, H-bridge circuit (120c) is at the top, which commutates an even lower voltage step in a sequence having a third frequency higher than the second frequency, as also shown in FIG. 4 (e.g., the rate at which the third most significant ternary digit changes in a ternary numerical sample representation of the desired AC waveform).

Any number of series-connected H-bridges can be used, for example four as in FIG. 1, three as in FIG. 28, or even just two, depending on the granularity of the multi-level approximation desired. The most significant waveform steps are provided by an H-bridge circuit (120a) in which one pair of transistors switches at the same frequency as the sign of the output waveform changes (e.g., the desired power line frequency). When a binary representation of the waveform is employed, in which the H-bridge creates only two levels, the other pair of transistors of the same H-bridge may switch in synchronism. However, when three levels are used in the ternary case, although each transistor may still switch on and off at the power line frequency, the third level is created by switching the second pair of transistors at different times than the first pair of transistors. When only two H-bridge circuits are used, the second H-bridge implements finer steps by switching when the least significant digit changes, which is more often than the most significant digit. The switching of 1, 2, 3 and 4 H-bridge circuits to generate an approximation to a sinewave AC output is shown in FIG. 4.

As those of skill in the art will readily appreciate, the relative switching frequencies of these transistors will vary depending on the output waveform being constructed. For example, in approximating an AC output waveform other than a sine wave, the first, second, and/or third switching frequencies may the same or different.

The DC-to-AC inverter is thus a "multilevel" inverter—meaning that it generates an AC output waveform (see FIG. 12) by sequentially outputting, at different times, voltage levels that nominally differ by an integer multiple of a predetermined voltage step size.

As discussed above, with such a reduced number of H-bridge circuits as two or three in total, the steps may be undesirably coarse, and so may be interpolated by jittering one or more of the H-bridges at a higher rate, and then filtering the AC output by a low-pass LC filter to prevent the export of high frequency interference. This still results in lower switching losses and lower high-frequency ripple than switching a single H-bridge, because the voltage steps that are switched are smaller in the mean, and switching losses are related to voltage squared times capacitance, as is well known. Known prior-art methods of jittering were mentioned in the Summary section, for example, pulse width modulation or delta-sigma modulation.

It was also mentioned above that any number base can be used, but that ternary, wherein voltages are in power of three ratios to one another, gives less complexity per step than other choices. An algorithm was given above for computing the best timing at which to select a particular step, which is valid for any choice of graduated voltages. When jittering is used for interpolation, the jittering occurs typically between two levels encompassing the desired level, and the mark-space ratio of the jittering between adjacent levels is chosen to give a mean equal to the desired instantaneous output waveform value. Thus, the timing is chosen to select a pair of adjacent levels between which to jitter when the desired waveform value first falls between them. It is also known from the prior art of delta-sigma modulation that 3-level jittering, using any form of bit density modulation, such as PWM or delta-sigma, can result in lower ripple by pushing the ripple spectrum out to higher frequencies, where the following low pass filter is more effective at removing it—sometimes referred to in the art as noise shaping.

As mentioned above, switching patterns can either be generated in real time with suitable hardware, such as a digital signal processor, or precomputed, stored and played back as required. In the latter case, efficient use of memory is to store the precomputed times during a power line frequency cycle at which each of the levels is to be selected.

In FIG. 28, each individual transistor has been labeled Q1 though Q12, and the capacitors labeled C1-C3, and this nomenclature is retained through FIGS. 28-32 to ease verification that no change to the connections between components is made between FIGS. 1, 28, 29, 30, 31, and 32 and thus the circuits are all the same. Accordingly, FIGS. 28-32 introduce no new matter to the present disclosure, but merely re-draw the circuit of FIG. 1 in different ways.

Figure 29:
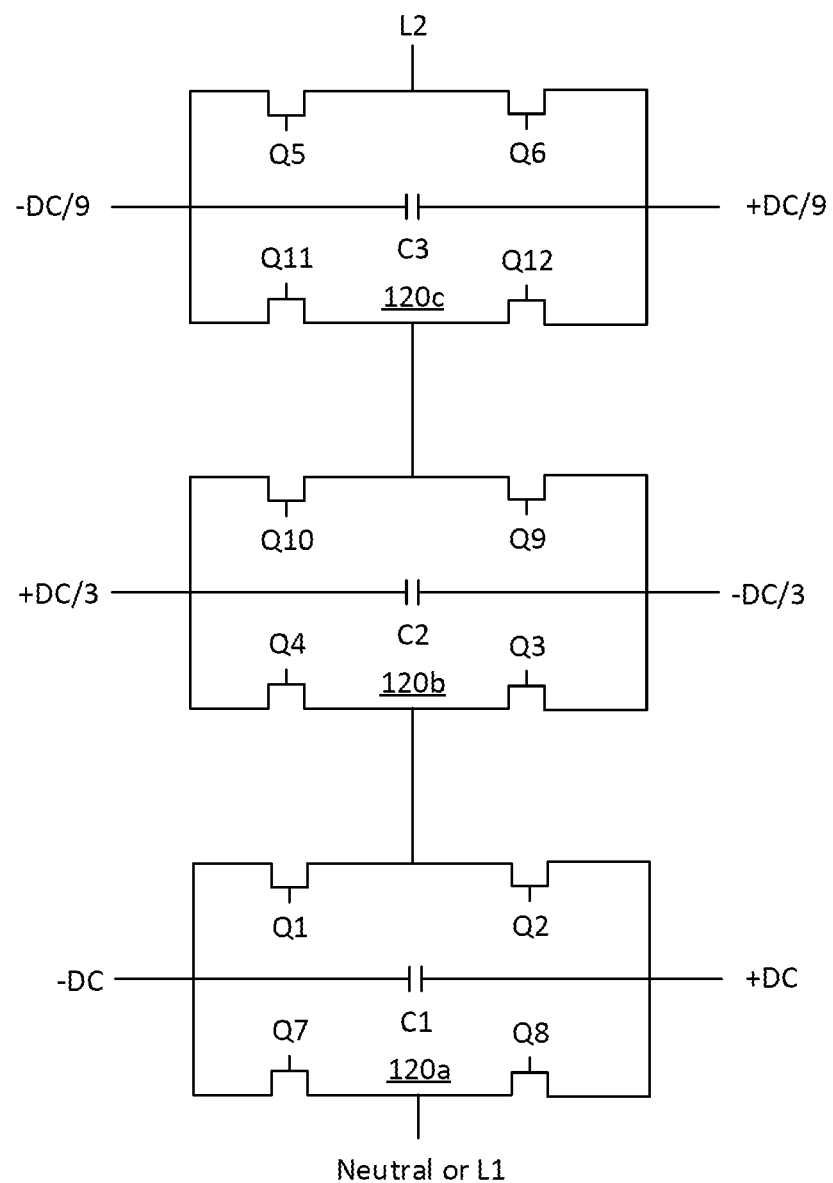
FIG. 29 shows the H-bridge circuits of FIG. 28 rotated, but with the same topology and interconnection.

In FIG. 29, the H-bridge circuits 120a, 120b, 120c are rotated relative to FIG. 28, while preserving the vertical stacking, as opposed to the horizontal arrangement of FIG. 1. In particular, H-bridge circuits (120a) and (120c) are rotated 90 degrees clockwise, while the H-bridge circuit (120b) is rotated 90 degrees counter-clockwise. The capacitors labeled C1-C3 in both FIGS. 28 and 29 are the reservoir capacitors that hold the respective graduated DC voltages in their desired ratios as current flows in and out of them.

Figure 30:
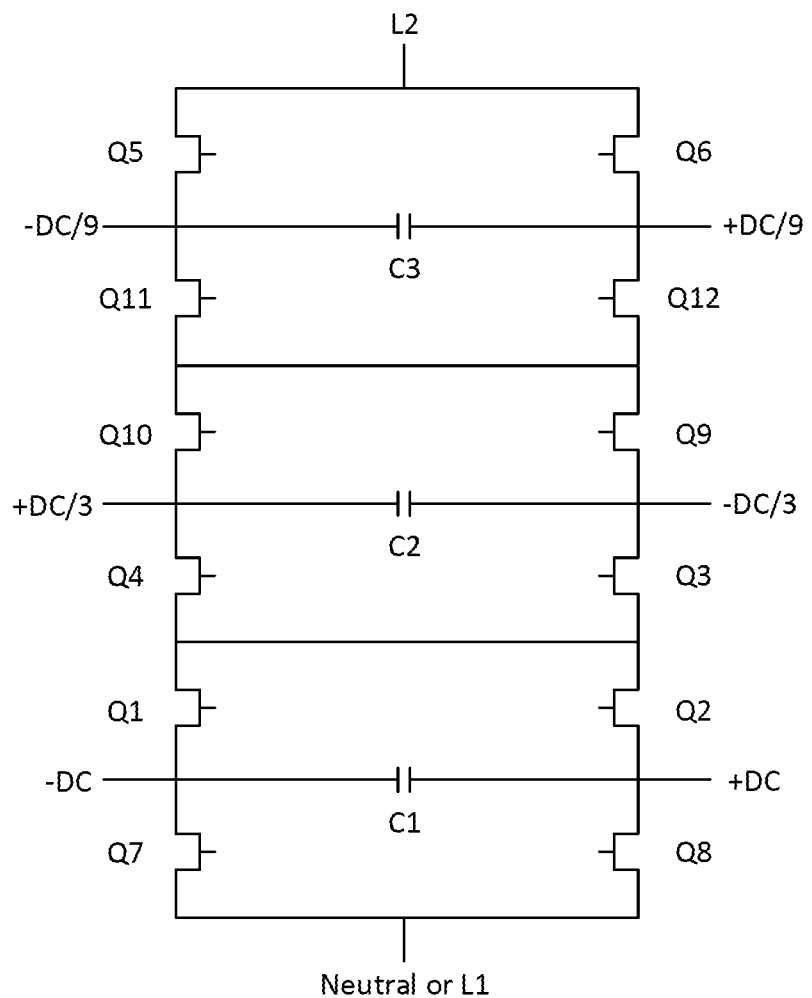
FIG. 30 shows the switches of FIGS. 28, 29 redrawn with intervening nodes collapsed
Figure 31:
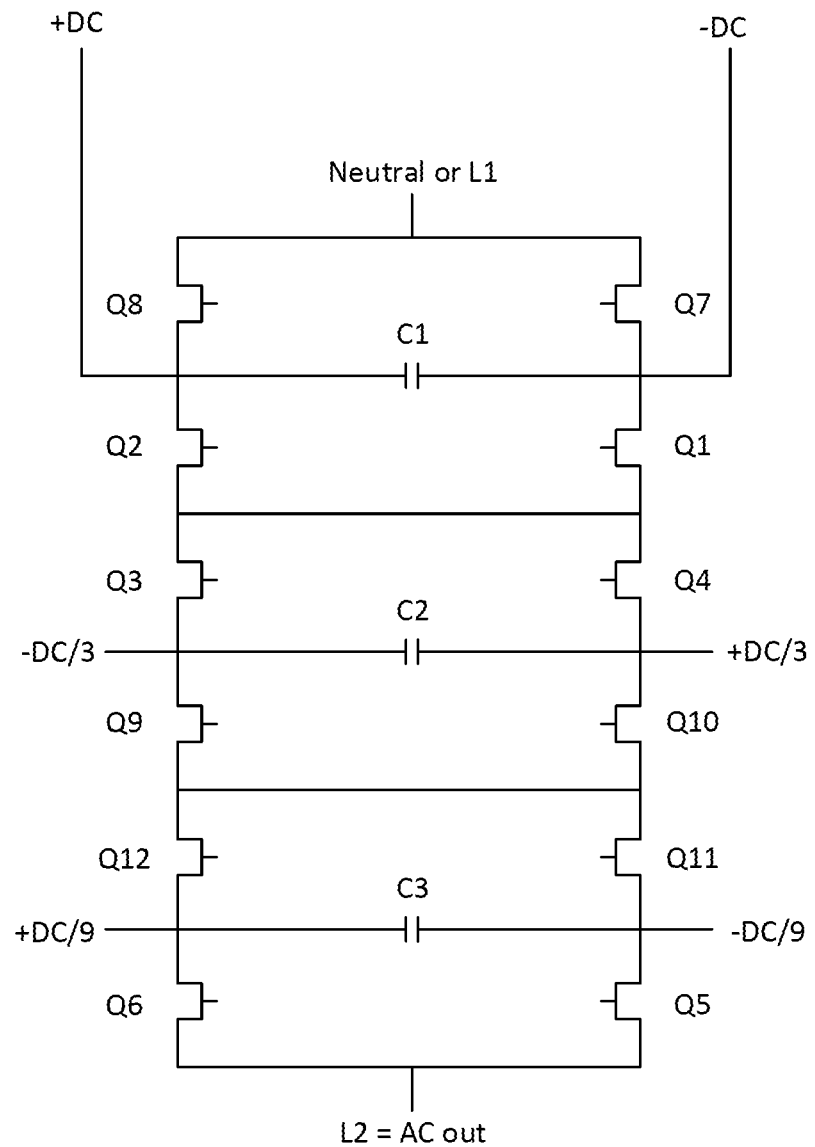
FIG. 31 shows the circuit of FIG. 30 reflected both horizontally and vertically.

FIGS. 30 and 31 illustrate further rearrangements of FIG. 1. FIG. 30 is merely a redrawing of FIG. 29, in which the nodes connecting each H-bridge circuit to the next have been collapsed, and with the MOSFETs Q1 to Q12 moved to the sides—the connectivity between all components is exactly the same as that depicted FIGS. 1, 28, and 29. FIG. 31 displays both a top-to-bottom and left-to-right flipping, or mirror-image, of the configuration of FIG. 30; the component connections are the same.

Figure 32:
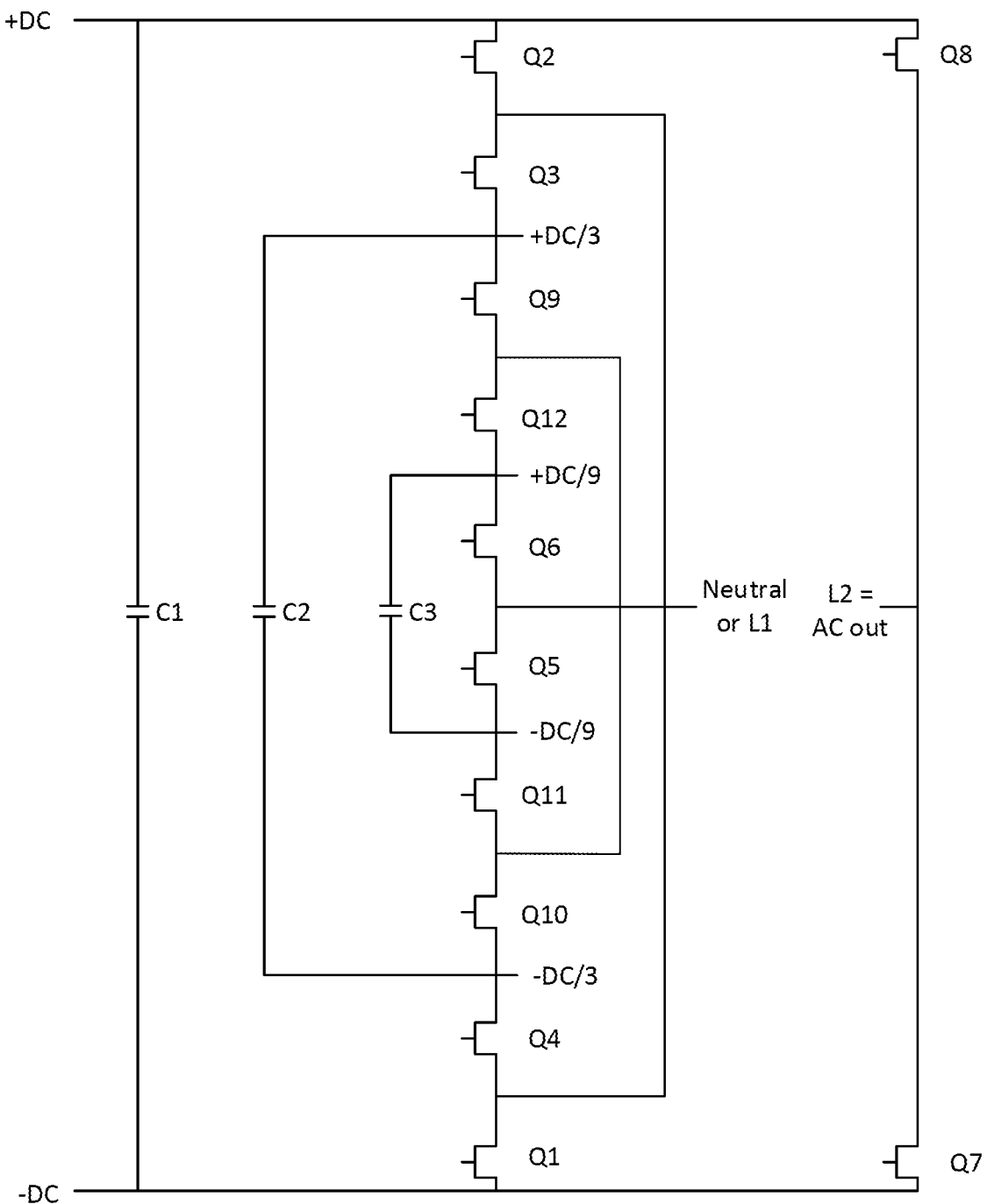
FIG. 32 shows the circuits of FIGS. 28-31 redrawn as series-connected banks of transistors with nested capacitors.

FIG. 32 is a further re-drawing of the circuits of FIGS. 1, 28, 29, 30, and 31. FIG. 32 is obtained from FIG. 31 by taking the bank of series transistors on the right (comprising Q7, Q1, Q4, Q10, Q11 and Q5), turning it upside-down, and placing it underneath the left-hand bank of transistors (Q8, Q2, Q3, Q9, Q12 and Q6) in FIG. 31, to form a first bank of series-connected transistors, and then moving the resulting top and bottom transistors Q8 and Q7 to the right-hand side to form a second bank of series-connected transistors. It may be seen that capacitors C1, C2 and C3 now appear connected in a fashion which can be described as "nested" between selected points in the series connection of transistor switches of the first bank of FIG. 32, wherein the term "nested" signifies a structure resembling nested parentheses, in which lines do not cross. It is emphasized once again that the connectivity and topology of FIG. 32 is exactly the same as originally disclosed in FIG. 1—the transistors Q1-Q12 have merely be re-drawn into first and second banks of series-connected transistors, with the reservoir capacitors C1-C3 shown connected in a nested fashion to the appropriate points in the first bank of transistors.

It may be realized that Q7 and Q8 are the transistors of H-bridge circuit (120a) that switch at 60 Hz, while the other transistors (Q1, Q2, Q3, Q4, Q5, Q6, Q9, Q10, Q11 and Q12) switch more often—that is, at a higher on/off rate depending on the voltage step-sizes implemented—and yet develop a 60 Hz step-approximation to a sinewave at their output (L2 of FIG. 32).

As described above, this bank of series-connected switches generates a periodic waveform having a first frequency. The inverter generates this waveform by switching, at different times and at one or more frequencies including at least a second frequency, each of the plurality of transistors connected in series in the first bank of the multi-level inverter. The second frequency is greater than the first frequency.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, comprising:
generating a periodic waveform having a first frequency by switching, at different times and at one or more frequencies including at least a second frequency, each of a plurality of transistors connected in series in a first bank of a multilevel inverter, wherein the second frequency is greater than the first frequency;
wherein the multilevel inverter generates the periodic waveform by jittering between lower and upper voltage values to approximate output voltages intermediate to the lower and upper voltage values, successively for each of a plurality of different levels defined by the lower and upper voltage values, wherein the lower and upper voltage values in each level nominally differ by a predetermined voltage step size.

2. The method of claim 1 wherein each of the plurality of series-connected transistors in the first switch bank is switched on and off in a sequence having the same repetition rate and at respective predetermined times.

3. The method of claim 1 further comprising switching transistors of a second bank of series connected transistors on and off at the first frequency.

4. A multilevel DC to AC inverter operative to convert power from a DC source to an AC output power waveform approximating a sinewave and having a first frequency, comprising:
a first bank of transistor switches connected in series across the DC source, the transistor switches being connected to a controller adapted to switch the transistors at different times and at one or more frequencies including at least a second frequency higher than the first frequency;
wherein the multilevel inverter generates the periodic waveform by jittering between lower and upper voltage values to approximate output voltages intermediate to the lower and upper voltage values, successively for each of a plurality of different levels defined by the lower and upper voltage values, wherein the lower and upper voltage values in each level nominally differ by a predetermined voltage step size.

5. The multilevel DC to AC inverter of claim 4, further comprising:
a second bank of transistor switches connected to the controller, which is further adapted to switch the second bank of transistors at the first frequency.

6. The multilevel DC to AC inverter of claim 4, further comprising:
reservoir capacitors connected in a nested fashion between the first and last of the series-connected transistor switches, and between selected transistor switches other than the first and last of said series-connected transistor switches of at least one bank of series-connected transistor switches.

7. The multilevel DC to AC inverter of claim 6, wherein the reservoir capacitors are operative to be charged during operation to a predetermined set of graduated DC voltages.

8. The multilevel DC to AC inverter of claim 7, wherein the predetermined set of graduated DC voltages bear integer ratios to one another.

9. The multilevel DC to AC inverter of claim 7, wherein the predetermined set of graduated DC voltages are in ratios one to another equal to powers of an integer.

10. The multilevel DC to AC inverter of claim 7, further comprising:
an electrical circuit adapted to generate the predetermined set of graduated DC voltages; and
a start-up circuit operative to charge the reservoir capacitors to respective ones of the set of graduated voltages upon inverter start-up.

11. The multilevel DC to AC inverter of claim 10, wherein the electrical circuit is a high-frequency DC-to-DC converter.

12. The multilevel DC to AC inverter of claim 10, wherein the start-up circuit is operative to limit inrush current during capacitor charging.

13. A DC to AC inverter operative to convert DC input power presented to DC input terminals at a first voltage to a desired AC output power waveform of a desired root mean square voltage or current at AC output terminals, comprising:
a multilevel generator adapted to generate, from the DC input power presented at the DC input terminals at the first voltage, a coarse multilevel approximation to the desired AC output power waveform;
a jittering controller adapted to jitter between adjacent levels of the coarse multilevel approximation in order to produce, in the mean, waveform values intermediate between the levels of the coarse multilevel approximation, wherein the voltage levels of the coarse multilevel approximation nominally differ by a predetermined voltage step size; and
a low pass filter adapted to filter out the jittering in order to provide a smooth output waveform conforming to the desired AC output power waveform at the AC output terminals.

14. The DC to AC inverter of claim 13 wherein the desired AC output power waveform is a sine wave.

15. The DC to AC inverter of claim 13 wherein the multilevel generator comprises:
one or more capacitors, each maintained at a respective floating voltage;
a plurality of semiconductor switches associated with the capacitors; and
a multilevel controller operative to control the semiconductor switches at successive times to select among the capacitors to selectively contribute their respective voltages to produce different levels of the coarse multilevel approximation.

16. The DC to AC inverter of claim 13 wherein the jittering controller uses one of pulse width modulation, bit density modulation, and delta-sigma modulation to jitter between adjacent levels of the coarse multilevel approximation.

17. The DC to AC inverter of claim 13 wherein the low pass filter comprises a series inductor and a shunt capacitor.

* * * * *

UNITED STATES PATENT AND TRADEMARK OFFICE
CERTIFICATE OF CORRECTION

| | |
|---|---|
| PATENT NO. | : 11,791,711 B2 |
| APPLICATION NO. | : 16/559326 |
| DATED | : October 17, 2023 |
| INVENTOR(S) | : Paul Wilkinson Dent |

It is certified that error appears in the above-identified patent and that said Letters Patent is hereby corrected as shown below:

On the Title Page

In Title:
Delete "Safety Shut-Down System for a Solar Energy Installation", and insert --Multi-Level DC to AC Inverter Having Switch Banks--, therefor.

In the Specification

Column 1, Lines 1-2, delete "Safety Shut-Down System for a Solar Energy Installation", and insert --Multi-Level DC to AC Inverter Having Switch Banks--, therefor.

Signed and Sealed this
Twenty-first Day of November, 2023

Katherine Kelly Vidal
*Director of the United States Patent and Trademark Office*